US008682623B1

(12) United States Patent
Domijan, Jr. et al.

(10) Patent No.: US 8,682,623 B1
(45) Date of Patent: *Mar. 25, 2014

(54) ELECTRIC POWER DISTRIBUTION INTERRUPTION RISK ASSESSMENT CALCULATOR

(75) Inventors: Alexander Domijan, Jr., Wesley Chapel, FL (US); Arif Islam, Wellington, FL (US)

(73) Assignee: University of South Florida, Tampa, FL (US)

( * ) Notice: Subject to any disclaimer, the term of this patent is extended or adjusted under 35 U.S.C. 154(b) by 356 days.

This patent is subject to a terminal disclaimer.

(21) Appl. No.: 13/080,360

(22) Filed: Apr. 5, 2011

Related U.S. Application Data

(63) Continuation-in-part of application No. 12/108,975, filed on Apr. 24, 2008, now Pat. No. 7,920,997.

(60) Provisional application No. 60/913,689, filed on Apr. 24, 2007.

(51) Int. Cl.
*G06F 17/50* (2006.01)
*G06F 3/00* (2006.01)

(52) U.S. Cl.
USPC ............... 703/2; 703/17; 702/3; 706/21

(58) Field of Classification Search
USPC ............... 703/2, 5, 17; 702/3; 706/21
See application file for complete search history.

(56) References Cited

U.S. PATENT DOCUMENTS

| 6,952,648 | B1 | 10/2005 | Menard et al. |
| 7,010,437 | B2 | 3/2006 | Lubkeman et al. |
| 7,069,258 | B1 | 6/2006 | Bothwell |
| 2004/0167731 | A1 | 8/2004 | Wang et al. |
| 2005/0195982 | A1 | 9/2005 | Olive |

OTHER PUBLICATIONS

Domijan et al., Analysis of Rain, Wind and Temperature Effects on Power Distribution Outages, PowerCON 2003, Special Theme: Blackout, Dec. 10-12, 2003.
Richards et al., Electrical Behavior of Contaminated Distribution Insulators Exposed to Natural Wetting, IEEE Transactions on Power Delivery, Apr. 2003, vol. 18, No. 2, pp. 551-558.
Bouford, The Need to Segment Abnormal Events from the Calculation of Reliability Indices, prepared for the Summer Power Meeting 2002, Chicago, IL, USA.
Xu et al., Analysis of Tree-Caused Faults in Power Distribution Systems, Proceedings of the 35th North American Power Symposium, University of Missouri-Rolla in Rolla, Missouri, Oct. 20-21, 2003.

(Continued)

*Primary Examiner* — Thai Phan
(74) *Attorney, Agent, or Firm* — Molly L. Sauter; Smith & Hopen, P.A.

(57) ABSTRACT

A method for predicting electrical power distribution interruptions based on common, immediate weather conditions. Daily, hourly, and bi-hourly weather data are used to predict the number of interruptions. Common weather conditions include, but are not limited to, rain, wind, temperature, lightning, humidity, barometric pressure, snow, and ice. The method includes compiling common weather data including a plurality of weather variables and the number of historical interruptions for a historical period, establishing model equations for the average value of the weather variables, combining the model equations for each of the weather variables into a composite model, and performing a regression analysis using the composite model to establish interruption prediction values. A computer program product for enabling said method and a computer system adapted to carry out said method are also included.

24 Claims, 68 Drawing Sheets

(56) References Cited

OTHER PUBLICATIONS

Warren, Overview of 1366-2001 the Full Use Guide on Electric Power Distribution Reliability Indices, prepared for the Summer Power Meeting 2002, Chicago, IL, USA.

Surface Weather Observation Stations, http://www.faa.gov/air_traffic/weather/asos/?state=FL, accessed Jan. 21, 2011, pp. 1-4.

Mansoor et al., Quantifying Reliability and Service Quality, Utility Automation & Engineering T&D, Sep. 2004.

Williams et al., Bad Weather vs. Power Reliability Progress Florida Seeks to Normalize Reliability Indices, Utility Automation & Engineering T&D., Sep. 2004, [online] Available: http://uaelp.pennnet.com/Articles/Article_Display.cfm?Section=CURRI&ARTICLE_ID=214084&VERSION_NUM=1&p=22, accessed Jan. 21, 2011.

Christie, Statistical Classification of Major Event Days in Distribution System Reliability, IEEE Transactions on Power Delivery, Oct. 2003, vol. 18, No. 4, pp. 1336-1341.

Williams, Major Reliability Events—Self-Defining?, IEEE Power Engineering Society Summer Meeting, 2002, vol. 2, pp. 654-656.

Brown et al., Distribution System Reliability Assessment: Momentary Interruptions and Storms, IEEE Transactions on Power Delivery, Oct. 1997, vol. 12, No. 4, pp. 1569-1575.

Coelho et al., Reliability Diagnosis of Distribution System Under Adverse Weather Conditions, IEEE Bologna PowerTech Conference, Jun. 23-26, 2003, vol. 4, pp. 1-5.

Billinton et al., Predictive Reliability Assessment of Distribution Systems Including Extreme Adverse Weather, IEEE Canadian Conference on Electrical and Computer Engineering, May 2001, vol. 2, pp. 719-724.

Orille et al., Fuzzy Logic Techniques to Limit Lightning Surges in a Power Transformer, IEEE Bologna PowerTech Conference, Jun. 23-26, 2003, vol. 2, pp. 1-6.

Higashiyama et al., Heavy Salt Deposition onto a Distribution Line by a Seasonal Wind in Winter, IEEE Power Engineering Society Summer Meeting, Jul. 2002, vol. 2, pp. 882-887.

Savadjiev et al., Modeling of Icing and Ice Shedding on Overhead Power Lines Based on Statistical Analysis of Meteorological Data, IEEE Transactions on Power Delivery, Apr. 2004, vol. 19, No. 2, pp. 715-721.

McDaniel et al., Lightning and Distribution Reliability—A Comparison of Three Utilities, IEEE Transmission and Distribution Conference and Exposition, Sep. 7-12, 2003, vol. 3, pp. 1077-1079.

Domijan et al., Effects of Normal Weather Conditions on Interruptions in Distribution Systems, International Journal of Power and Energy Systems, 2005, vol. 25, No. 1, pp. 54-62.

Matavalam, Power Distribution Reliability as a Function of Weather, 2004, University of Florida, Entire Document, Retrieved from URL: <http://etd.fcla.edu/UF/UFE0006668/matavalam)r.pdf>.

Domijan et al., Modeling the Effect of Weather Parameters on Power Distribution Interruptions, 2004, University of Florida, Entire Document.

International Search Report for International Application No. PCT/US2008/005253 dated Jul. 7, 2008.

| N | %P N or Fewer | %P N or more |
|---|---|---|
| 1 | 0.79 | 100.00 |
| 2 | 3.15 | 99.21 |
| 3 | 8.66 | 96.85 |
| 4 | 13.39 | 91.34 |
| 5 | 24.41 | 86.61 |
| 6 | 33.86 | 75.59 |
| 7 | 48.82 | 66.14 |
| 8 | 58.27 | 51.18 |
| 9 | 69.29 | 41.73 |
| 10 | 78.74 | 30.71 |
| 11 | 84.25 | 21.26 |
| 12 | 89.76 | 15.75 |
| 13 | 94.49 | 10.24 |
| 14 | 96.85 | 5.51 |
| 15 | 98.43 | 3.15 |
| 20 | 100 | 1.58 |

| Call Sign | Call sign for the reporting airport |
|---|---|
| Date | Date |
| MaxTemp | Maximum temperature for that day |
| MinTemp | Minimum temperature for that day |
| AvgTemp | Average temperature for the day |
| DepNorm | Departure from normal |
| AvgDew | Average dew point |
| AvgWet | Average rainfall for that day |
| HeatDays | Days cooler than some specified temperature when customers are likely to use heaters |
| CoolDays | Days warmer than some specified temperature when customers are likely to use AC's |
| SigWeath | Weather station identifiers |
| Rain | Amount of rain in inches for that day |
| AvgStPR | Average atmospheric pressure for that day |
| AvgSeaPR | Average sea pressure for that day |
| ResWdS | Average resultant wind speed for that day |
| ResWdD | Average resultant wind direction for that day |
| AvgWdS | Average wind speed for that day |
| 5SMaxS | Maximum sustained wind speed for 5 seconds for that day |
| 5SMaxD | The direction of the maximum sustained wind speed for 5 seconds for that day |
| 2MMaxS | Maximum sustained wind speed for 2 minutes for that day |
| 2MMaxD | The direction of the maximum sustained wind speed for 2 minutes for that day |
| Lightning Strikes | Total number of lightning strikes that day |
| Without Exclusions | Total number of outages for that day |
| With Exclusions | Total number of outages minus the total number of outages caused by allowable exceptions for that day |
| Weather.With Exclusions | Total number of weather outages for that day |
| Weather.Exclusions Only | Total number of directly correlated weather related outages minus the number of directly correlated weather related outages caused by allowable exceptions for that day |
| Outages.(Blank) | Total outages caused by unknown reasons for that day |
| Outages.Accident | Total number of outages caused by accidents for that day |
| Outages.Animal | Total number of outages caused by animals for that day |
| Outages.Corrosion/Decay | Total outages caused by corrosion and decay for that day |
| Outages.Dummy CFR | Total number of dummy tickets for that day |
| Outages.Equipment Failure | Total number of outages caused by equipment failures for that day |
| Outages.Improper Process | Total number of outages caused by improper process for that day |
| Outages.Other | Total number of outages caused by other reasons for that day |
| Outages.Request | Outages caused by customer request |
| Outages.Transmission | Total number of transmission outages for that day |
| Outages.Unknown | Total number of outages caused by unknown reasons for that day |
| Outages.Vegetation | Total number of outages caused by vegetation for that day |
| Outages.Weather | Total number of outages caused by weather for that day |

FIG. 10A

Nwx versus AvgTemp, Rain, 2MMaxS, LS ...   ALL THREE YEARS

```
The equation is
Nwx = - 7.27 + 0.108 AvgTemp + 3.34 Rain + 0.429 2MMaxS + 0.0362 LS Predictor      Coef    SE Coef        T       P
Constant     -7.274      1.743    -4.17   0.000
AvgTemp     0.10781    0.02076     5.19   0.000
Rain         3.3354     0.3644     9.15   0.000
2MMaxS      0.42938    0.03697    11.61   0.000
LS         0.036178   0.002912    12.42   0.000

S = 4.94416   R-Sq = 41.8%   R-Sq(adj) = 41.6%

Analysis of Variance

Source            DF        SS       MS        F       P
Regression         4   18676.7   4669.2   191.01   0.000
Residual Error  1062   25960.3     24.4
Total           1066   44637.0
```

FIG. 10B

Nwx versus AvgTemp, Rain, 2MMaxS, LS ... 2001 and 2002

```
The equation is
Nwx = - 8.81 + 0.136*'AvgTemp' + 2.71*'Rain' + 0.378*'2MMaxS' +
0.0510*'LS'

Predictor      Coef     SE Coef        T       P
Constant     -8.813       2.147    -4.10   0.000
AvgTemp     0.13634     0.02578     5.29   0.000
Rain         2.7096      0.4169     6.50   0.000
2MMaxS      0.37760     0.04264     8.86   0.000
LS         0.050977    0.005828     8.75   0.000

S = 4.78320   R-Sq = 36.2%   R-Sq(adj) = 35.8%

Analysis of Variance

Source            DF          SS       MS       F       P
Regression         4      9125.8   2281.4   99.72   0.000
Residual Error   704     16106.8     22.9
Total            708     25232.6
```

FIG. 10C

Nwx versus Raw

```
The equation is
Nwx = 2.41 + 0.818 Raw

Predictor      Coef    SE Coef        T       P
Constant     2.4061     0.5626     4.28   0.000
Raw         0.81813    0.04663    17.54   0.000

S = 5.33992    R-Sq = 46.4%    R-Sq(adj) = 46.2%

Analysis of Variance

Source             DF        SS        MS        F       P
Regression          1    8777.6    8777.6   307.83   0.000
Residual Error    356   10151.3      28.5
Total             357   18928.9

MTB > Regress 'Nwx' 1      'Modeled';
SUBC>   Constant;
SUBC>   Brief 1.
```

FIG. 10D

Regression Analysis: Nwx versus Modeled

```
The regression equation is
Nwx = 1.69 + 0.872 Modeled2

Predictor     Coef   SE Coef       T       P
Constant    1.6915    0.5594    3.02   0.003
Modeled2   0.87181   0.04606   18.93   0.000

S = 5.14776    R-Sq = 50.2%    R-Sq(adj) = 50.0%

Analysis of Variance

Source            DF       SS       MS        F       P
Regression         1   9495.1   9495.1   358.31   0.000
Residual Error   356   9433.8     26.5
Total            357  18928.9
```

Desired Output and Actual Network Output

FIG. 12

| Training | +1 Standard Deviation | -1 Standard Deviation |
|---|---|---|
| 0.200839491 | 0.452120651 | -0.05044369 |
| 0.041425453 | 0.04844291 | 0.034407996 |
| 0.040420116 | 0.045773005 | 0.035067227 |
| 0.041056513 | 0.04851658 | 0.033596445 |
| 0.041043043 | 0.046484463 | 0.033601623 |
| 0.040257958 | 0.047139479 | 0.033376438 |
| 0.038947365 | 0.045042619 | 0.032852111 |
| 0.037359291 | 0.042640415 | 0.032078167 |
| 0.035714424 | 0.04037766 | 0.031051188 |
| 0.034221337 | 0.038603469 | 0.029836206 |
| 0.033066298 | 0.037367939 | 0.028744637 |
| 0.0323442 | 0.036577211 | 0.02611119 |
| 0.031963177 | 0.036046929 | 0.027877426 |
| 0.031691769 | 0.035790069 | 0.027603471 |
| 0.031394418 | 0.035722801 | 0.027066035 |
| 0.031112531 | 0.03575832 | 0.026466741 |
| 0.030900871 | 0.035785294 | 0.026016447 |
| 0.030743851 | 0.035773381 | 0.025714321 |
| 0.030602726 | 0.035732799 | 0.025472854 |
| 0.030459448 | 0.035678019 | 0.025238877 |
| 0.030314226 | 0.035616037 | 0.025012414 |
| 0.030180261 | 0.035548595 | 0.024811967 |
| 0.030060674 | 0.035477641 | 0.024643706 |
| 0.029951227 | 0.035406839 | 0.024495615 |
| 0.029846104 | 0.035338622 | 0.024353586 |
| 0.029743342 | 0.03527234 | 0.024214345 |
| 0.029643779 | 0.035205557 | 0.024082001 |
| 0.029547765 | 0.03513671 | 0.023958619 |
| 0.029454213 | 0.035065478 | 0.023842946 |
| 0.029361906 | 0.034992194 | 0.023731616 |
| 0.029270398 | 0.034916987 | 0.023623809 |
| 0.029179836 | 0.034839799 | 0.023519872 |
| 0.029090336 | 0.034760627 | 0.023420044 |
| 0.029001792 | 0.034679653 | 0.02332393 |
| 0.028913923 | 0.034596977 | 0.023230869 |
| 0.028826633 | 0.034512716 | 0.023140551 |
| 0.028739683 | 0.034426824 | 0.023052943 |
| 0.028653616 | 0.034339179 | 0.022968053 |
| 0.028567764 | 0.034249808 | 0.022885721 |
| 0.028482244 | 0.034158711 | 0.022805777 |
| 0.02839696 | 0.03406577 | 0.02272815 |
| 0.028311873 | 0.033970875 | 0.022662772 |
| 0.028226924 | 0.033874275 | 0.022579573 |
| 0.0281421 | 0.033775651 | 0.022508549 |
| 0.028057331 | 0.033675071 | 0.022439692 |
| 0.027972595 | 0.033572515 | 0.022372675 |
| 0.027987863 | 0.03346798 | 0.022307746 |
| 0.027803126 | 0.033361454 | 0.022244798 |
| 0.027716389 | 0.033253018 | 0.02218376 |
| 0.027633641 | 0.033142633 | 0.022124648 |
| 0.027548897 | 0.033030421 | 0.022067373 |
| 0.027464197 | 0.032916469 | 0.022011925 |
| 0.027379577 | 0.032800854 | 0.0219593 |
| 0.027295063 | 0.032683745 | 0.021906381 |
| 0.027210738 | 0.032565302 | 0.021856174 |
| 0.027126642 | 0.032445682 | 0.021807602 |
| 0.027042878 | 0.032325121 | 0.021760635 |
| 0.026959486 | 0.032203793 | 0.021715179 |
| 0.026876562 | 0.032081938 | 0.021671186 |
| 0.026794214 | 0.03195983 | 0.021628598 |
| 0.026712509 | 0.031837686 | 0.021587332 |
| 0.026631515 | 0.031715695 | 0.021547335 |
| 0.026551352 | 0.031594169 | 0.021508535 |
| 0.026472071 | 0.031473278 | 0.021470863 |
| 0.026393724 | 0.031353201 | 0.021434247 |
| 0.026316366 | 0.031234135 | 0.021398637 |
| 0.026240115 | 0.031116254 | 0.021363977 |
| 0.026164946 | 0.030999664 | 0.021330227 |
| 0.026090904 | 0.030884508 | 0.021297301 |
| 0.026018002 | 0.030770818 | 0.021265187 |
| 0.025946286 | 0.030658719 | 0.021233852 |
| 0.025875722 | 0.030548179 | 0.021203266 |
| 0.025806307 | 0.030439262 | 0.021173353 |
| 0.025736042 | 0.030331953 | 0.021144132 |
| 0.0256709 | 0.030226226 | 0.021115575 |
| 0.025604846 | 0.030122038 | 0.021087654 |
| 0.025539853 | 0.030019349 | 0.021060357 |
| 0.025475894 | 0.029918109 | 0.021033678 |
| 0.025412932 | 0.029818258 | 0.021007606 |
| 0.025350913 | 0.029719699 | 0.020982126 |
| 0.025289813 | 0.029622382 | 0.020957245 |
| 0.025229579 | 0.029526234 | 0.020932925 |
| 0.025170177 | 0.029431154 | 0.020909199 |
| 0.025111578 | 0.029337122 | 0.020886035 |
| 0.025053722 | 0.029244025 | 0.020863419 |
| 0.024996592 | 0.029151796 | 0.020841386 |
| 0.024940131 | 0.029060371 | 0.020819891 |
| 0.024884336 | 0.028969709 | 0.020798963 |
| 0.024829148 | 0.028879724 | 0.020778572 |
| 0.024774548 | 0.028790365 | 0.020758731 |
| 0.024720512 | 0.028701612 | 0.020739412 |
| 0.024667003 | 0.028613382 | 0.020720624 |
| 0.024614007 | 0.028525647 | 0.020702367 |
| 0.024561493 | 0.028438395 | 0.020684592 |
| 0.024509464 | 0.028351578 | 0.02066735 |
| 0.024457879 | 0.028265151 | 0.020650606 |
| 0.024406733 | 0.02817911 | 0.020634356 |
| 0.024355999 | 0.028093406 | 0.020618591 |
| 0.024305674 | 0.028008052 | 0.020603296 |
| 0.024255741 | 0.027922993 | 0.020588489 |
| 0.024206179 | 0.027838226 | 0.02057413 |
| 0.024156992 | 0.027753744 | 0.02056024 |
| 0.024108167 | 0.027669582 | 0.020546792 |

FIG. 12 (continued)

| | | | | | |
|---|---|---|---|---|---|
| 0.02465973 | 0.027585671 | 0.020533789 | 0.021964661 | 0.023658259 | 0.020271062 |
| 0.024011621 | 0.02750203 | 0.020521213 | 0.021935371 | 0.02360098 | 0.020269762 |
| 0.023963846 | 0.027418624 | 0.020509067 | 0.021906522 | 0.023544597 | 0.020268446 |
| 0.023916411 | 0.027335494 | 0.020497328 | 0.021878093 | 0.023489081 | 0.020267106 |
| 0.023869306 | 0.027252597 | 0.020486016 | 0.021850093 | 0.023434443 | 0.020265743 |
| 0.023822535 | 0.027169976 | 0.020475095 | 0.021822505 | 0.023380663 | 0.020264346 |
| 0.023776083 | 0.027087593 | 0.020464573 | 0.021795321 | 0.023327731 | 0.020262912 |
| 0.023729951 | 0.027005471 | 0.020454432 | 0.021768539 | 0.023275618 | 0.02026146 |
| 0.023684131 | 0.026923564 | 0.020444698 | 0.021742145 | 0.023224327 | 0.020259963 |
| 0.023638643 | 0.026841959 | 0.020435327 | 0.021716158 | 0.023173853 | 0.020258463 |
| 0.023593434 | 0.026760569 | 0.0204263 | 0.021690527 | 0.023124162 | 0.020256892 |
| 0.023548565 | 0.026679475 | 0.020417655 | 0.021665256 | 0.023075219 | 0.020255294 |
| 0.023503995 | 0.026598618 | 0.020409371 | 0.021640357 | 0.023027035 | 0.020253679 |
| 0.023459733 | 0.026518056 | 0.02040141 | 0.021615818 | 0.022979597 | 0.020252036 |
| 0.023415769 | 0.026437744 | 0.020393794 | 0.02159162 | 0.022932898 | 0.020250342 |
| 0.023372113 | 0.026357713 | 0.020386513 | 0.021567748 | 0.02268667 | 0.020248625 |
| 0.02332877 | 0.026277992 | 0.020379548 | 0.021544198 | 0.02284153 | 0.020246865 |
| 0.023285722 | 0.026198521 | 0.020372924 | 0.021520978 | 0.022796896 | 0.020245061 |
| 0.023242993 | 0.026119383 | 0.020366603 | 0.021498056 | 0.022752873 | 0.020243239 |
| 0.023200562 | 0.026040551 | 0.020360572 | 0.021475449 | 0.022709536 | 0.020241362 |
| 0.023159439 | 0.025962039 | 0.020354838 | 0.021453138 | 0.022666817 | 0.02023946 |
| 0.023118629 | 0.025883859 | 0.020349399 | 0.021431108 | 0.022624704 | 0.020237511 |
| 0.023075117 | 0.025805998 | 0.020344237 | 0.021409379 | 0.022583228 | 0.020235528 |
| 0.023033924 | 0.025728496 | 0.020339351 | 0.021387918 | 0.022542329 | 0.020233507 |
| 0.022993043 | 0.025651359 | 0.020334727 | 0.021366725 | 0.022502025 | 0.020231426 |
| 0.02295248 | 0.025574607 | 0.020330352 | 0.021345817 | 0.022462326 | 0.020229307 |
| 0.022912233 | 0.025498234 | 0.020326233 | 0.02132516 | 0.022423171 | 0.020227149 |
| 0.022872309 | 0.025422283 | 0.020322335 | 0.021304766 | 0.022384602 | 0.02022493 |
| 0.02283272 | 0.025346748 | 0.020318693 | 0.021284627 | 0.022346602 | 0.020222653 |
| 0.022793449 | 0.025271652 | 0.020315247 | 0.021264734 | 0.022309139 | 0.020220329 |
| 0.022754525 | 0.025197832 | 0.020312016 | 0.0212451 | 0.022272234 | 0.020217965 |
| 0.022715929 | 0.025122875 | 0.020308983 | 0.021225699 | 0.022235682 | 0.020215516 |
| 0.02267768 | 0.025049229 | 0.020306132 | 0.021206539 | 0.022200047 | 0.02021303 |
| 0.022639765 | 0.024976108 | 0.020303462 | 0.021187618 | 0.022164789 | 0.020210447 |
| 0.022602254 | 0.024903541 | 0.020300967 | 0.021168921 | 0.022130009 | 0.020207833 |
| 0.022565073 | 0.024831524 | 0.020298622 | 0.02115046 | 0.022095798 | 0.020205121 |
| 0.022528259 | 0.024760093 | 0.020296425 | 0.021132228 | 0.022062097 | 0.02020236 |
| 0.022491826 | 0.024689285 | 0.020294366 | 0.021114225 | 0.022028935 | 0.020199516 |
| 0.022455775 | 0.024619134 | 0.020292417 | 0.021096439 | 0.021996279 | 0.020196599 |
| 0.022420107 | 0.024549624 | 0.02029059 | 0.021078878 | 0.021964138 | 0.020193617 |
| 0.022384846 | 0.024480825 | 0.020288867 | 0.021061526 | 0.021932525 | 0.020190527 |
| 0.02234998 | 0.024412729 | 0.020287231 | 0.021044393 | 0.021901405 | 0.020187381 |
| 0.022315524 | 0.024345364 | 0.020285684 | 0.021027468 | 0.021870802 | 0.020184133 |
| 0.02228148 | 0.024278766 | 0.020284194 | 0.02101076 | 0.02184071 | 0.020180811 |
| 0.022247852 | 0.024212945 | 0.020282758 | 0.020994258 | 0.021811111 | 0.020177406 |
| 0.022214652 | 0.024147911 | 0.020281394 | 0.020977962 | 0.021782028 | 0.020173896 |
| 0.022181867 | 0.024083701 | 0.020280034 | 0.020961864 | 0.021753437 | 0.02017029 |
| 0.022149529 | 0.024020335 | 0.020278723 | 0.020945966 | 0.021725346 | 0.020166586 |
| 0.022117627 | 0.023957816 | 0.020277436 | 0.020930276 | 0.021697742 | 0.02016281 |
| 0.022086158 | 0.023896139 | 0.020276177 | 0.02091478 | 0.021670641 | 0.020158919 |
| 0.022055128 | 0.023835346 | 0.02027491 | 0.020899476 | 0.021644006 | 0.020154945 |
| 0.022024538 | 0.023775439 | 0.020273636 | 0.020884362 | 0.021617859 | 0.020150866 |
| 0.021994384 | 0.023716405 | 0.020272363 | 0.020869444 | 0.021592203 | 0.020146685 |

FIG. 12 (continued)

| | | | | | |
|---|---|---|---|---|---|
| 0.020854718 | 0.021567041 | 0.020142395 | 0.020291676 | 0.020779587 | 0.019803766 |
| 0.020840178 | 0.021542343 | 0.020138013 | 0.020284197 | 0.020771838 | 0.019796556 |
| 0.020825823 | 0.021518119 | 0.020133526 | 0.020276795 | 0.020764216 | 0.019789375 |
| 0.020811645 | 0.021494354 | 0.020128936 | 0.020269476 | 0.020756732 | 0.01978222 |
| 0.020797657 | 0.02147106 | 0.020124254 | 0.020262231 | 0.020749395 | 0.019775086 |
| 0.020783837 | 0.021448235 | 0.020119436 | 0.020255078 | 0.020742197 | 0.019767959 |
| 0.020770201 | 0.02142586 | 0.020114542 | 0.020247993 | 0.020735125 | 0.019760862 |
| 0.020756737 | 0.02140394 | 0.020109534 | 0.020240989 | 0.020728175 | 0.019753803 |
| 0.020743442 | 0.021382446 | 0.020104436 | 0.02023406 | 0.020721354 | 0.019746766 |
| 0.020730327 | 0.021361416 | 0.020099239 | 0.020227208 | 0.020714645 | 0.019739771 |
| 0.02071738 | 0.021340835 | 0.020093925 | 0.020220421 | 0.020708039 | 0.019732802 |
| 0.020704585 | 0.021320664 | 0.020088507 | 0.020213701 | 0.020701558 | 0.019725844 |
| 0.020691977 | 0.021300937 | 0.020083016 | 0.020207053 | 0.020695171 | 0.019718936 |
| 0.020679521 | 0.021281642 | 0.0200774 | 0.020200461 | 0.02068889 | 0.019712072 |
| 0.020667221 | 0.021262741 | 0.020071701 | 0.020193975 | 0.020682712 | 0.019705239 |
| 0.020655083 | 0.021244256 | 0.020065909 | 0.020187535 | 0.020676635 | 0.019698435 |
| 0.020643106 | 0.021226189 | 0.020060024 | 0.02018116 | 0.020670645 | 0.019691673 |
| 0.020631277 | 0.021208507 | 0.020054046 | 0.020174842 | 0.020664748 | 0.019684936 |
| 0.020619605 | 0.021191232 | 0.020047979 | 0.02016859 | 0.020658932 | 0.019678246 |
| 0.020608087 | 0.021174339 | 0.020041834 | 0.020162394 | 0.020653198 | 0.01967159 |
| 0.020596708 | 0.021157812 | 0.020035603 | 0.020156262 | 0.020647546 | 0.019664979 |
| 0.020585491 | 0.021141686 | 0.020029297 | 0.020150156 | 0.020641979 | 0.019658393 |
| 0.020574403 | 0.02112591 | 0.020022895 | 0.020144179 | 0.020636494 | 0.019651865 |
| 0.020563456 | 0.021110479 | 0.020016433 | 0.020138219 | 0.020631079 | 0.019645359 |
| 0.020552661 | 0.021095419 | 0.020009902 | 0.020132311 | 0.020625729 | 0.019638893 |
| 0.020542001 | 0.02108071 | 0.020003293 | 0.020126478 | 0.020620464 | 0.019632492 |
| 0.020531477 | 0.021066328 | 0.019996625 | 0.020120676 | 0.020615232 | 0.01962612 |
| 0.020521079 | 0.021052278 | 0.01998988 | 0.020114943 | 0.020610106 | 0.01961978 |
| 0.020510817 | 0.021038551 | 0.019983083 | 0.020108251 | 0.020605025 | 0.019613476 |
| 0.020500695 | 0.021025151 | 0.019976239 | 0.02010361 | 0.020600006 | 0.019607226 |
| 0.020490695 | 0.021012053 | 0.019969338 | 0.020098022 | 0.020595042 | 0.019601002 |
| 0.020480815 | 0.020999242 | 0.019962389 | 0.020092484 | 0.020590144 | 0.019594825 |
| 0.02047062 | 0.020986737 | 0.019955387 | 0.020086993 | 0.020585288 | 0.019588698 |
| 0.020461441 | 0.020974522 | 0.019948361 | 0.020081551 | 0.020580504 | 0.019582597 |
| 0.020451938 | 0.020962586 | 0.019941291 | 0.020076146 | 0.020575757 | 0.019576535 |
| 0.020442542 | 0.020950918 | 0.019934166 | 0.020070804 | 0.02057107 | 0.019570538 |
| 0.020433273 | 0.020939515 | 0.01992703 | 0.020065503 | 0.020566457 | 0.019564546 |
| 0.020424121 | 0.020928383 | 0.019919858 | 0.020060231 | 0.02056186 | 0.019558602 |
| 0.020415065 | 0.02091747 | 0.01991266 | 0.020055018 | 0.020557311 | 0.019552726 |
| 0.020406131 | 0.020906812 | 0.01990545 | 0.020049847 | 0.02055263 | 0.019546864 |
| 0.020397308 | 0.020896415 | 0.019898201 | 0.020044709 | 0.020548384 | 0.019541034 |
| 0.020388591 | 0.020886226 | 0.019890955 | 0.020039612 | 0.020543965 | 0.019535259 |
| 0.020379972 | 0.020876253 | 0.019883692 | 0.020034564 | 0.020539602 | 0.019529525 |
| 0.02037147 | 0.020866518 | 0.019876422 | 0.02002965 | 0.02053528 | 0.019523819 |
| 0.020363058 | 0.020856974 | 0.019869142 | 0.020024585 | 0.020531018 | 0.019518151 |
| 0.020354748 | 0.020847631 | 0.019861866 | 0.020019643 | 0.020526751 | 0.019512535 |
| 0.020346542 | 0.020838517 | 0.019854566 | 0.020014753 | 0.020522554 | 0.019506952 |
| 0.020338429 | 0.020829563 | 0.019847295 | 0.020009884 | 0.020518372 | 0.019501396 |
| 0.020330404 | 0.020820813 | 0.019839995 | 0.020005065 | 0.020514236 | 0.019495873 |
| 0.02032249 | 0.020812229 | 0.01983275 | 0.020000263 | 0.020510133 | 0.019490394 |
| 0.020314649 | 0.020803816 | 0.019825481 | 0.019995525 | 0.020506089 | 0.019484961 |
| 0.020306902 | 0.020795583 | 0.019818221 | 0.019990801 | 0.020502053 | 0.019479546 |
| 0.020299245 | 0.020787503 | 0.019810967 | 0.019986124 | 0.020498047 | 0.019474201 |

FIG. 12 (continued)

| | | | | | |
|---|---|---|---|---|---|
| 0.019771242 | 0.020314836 | 0.019227648 | 0.019771242 | 0.020314836 | 0.019227648 |
| 0.01976779 | 0.020311862 | 0.019223718 | 0.01976779 | 0.020311862 | 0.019223718 |
| 0.019764358 | 0.020308899 | 0.019219817 | 0.019764358 | 0.020308899 | 0.019219817 |
| 0.019760932 | 0.020305929 | 0.019215934 | 0.019760932 | 0.020305929 | 0.019215934 |
| 0.019757529 | 0.020302995 | 0.019212063 | 0.019757529 | 0.020302995 | 0.019212063 |
| 0.019754135 | 0.020300058 | 0.019208213 | 0.019754135 | 0.020300058 | 0.019208213 |
| 0.019750748 | 0.020297117 | 0.01920438 | 0.019750748 | 0.020297117 | 0.01920438 |
| 0.01974739 | 0.020294216 | 0.019200564 | 0.01974739 | 0.020294216 | 0.019200564 |
| 0.019744025 | 0.020291292 | 0.019196758 | 0.019744025 | 0.020291292 | 0.019196758 |
| 0.019740687 | 0.020288398 | 0.019192976 | 0.019740687 | 0.020288398 | 0.019192976 |
| 0.019737355 | 0.020285512 | 0.019189196 | 0.019737355 | 0.020285512 | 0.019189196 |
| 0.019734044 | 0.020262632 | 0.019185455 | 0.019734044 | 0.020262632 | 0.019185455 |
| 0.019730749 | 0.020279756 | 0.019181741 | 0.019730749 | 0.020279756 | 0.019181741 |
| 0.019727458 | 0.020276904 | 0.019178012 | 0.019727458 | 0.020276904 | 0.019178012 |
| 0.019724162 | 0.020274053 | 0.019174312 | 0.019724162 | 0.020274053 | 0.019174312 |
| 0.019720907 | 0.020271201 | 0.019170613 | 0.019720907 | 0.020271201 | 0.019170613 |
| 0.019717647 | 0.02026834 | 0.019166954 | 0.019717647 | 0.02026834 | 0.019166954 |
| 0.019714416 | 0.020265529 | 0.019163303 | 0.019714416 | 0.020265529 | 0.019163303 |
| 0.019711178 | 0.020262691 | 0.019159666 | 0.019711178 | 0.020262691 | 0.019159666 |
| 0.019707965 | 0.020259885 | 0.019156045 | 0.019707965 | 0.020259885 | 0.019156045 |
| 0.019704753 | 0.020257071 | 0.019152434 | 0.019704753 | 0.020257071 | 0.019152434 |
| 0.019701552 | 0.020254276 | 0.019148827 | 0.019701552 | 0.020254276 | 0.019148827 |
| 0.019698366 | 0.020251482 | 0.019145249 | 0.019698366 | 0.020251482 | 0.019145249 |
| 0.019695196 | 0.020248707 | 0.019141684 | 0.019695196 | 0.020248707 | 0.019141684 |
| 0.01969204 | 0.020245939 | 0.019138142 | 0.01969204 | 0.020245939 | 0.019138142 |
| 0.019688883 | 0.020243174 | 0.019134593 | 0.019688883 | 0.020243174 | 0.019134593 |
| 0.019685738 | 0.02024041 | 0.019131066 | 0.019685738 | 0.02024041 | 0.019131066 |
| 0.019682604 | 0.020237637 | 0.019127571 | 0.019682604 | 0.020237637 | 0.019127571 |
| 0.019679479 | 0.020234897 | 0.019124061 | 0.019679479 | 0.020234897 | 0.019124061 |
| 0.01967637 | 0.02023216 | 0.01912058 | 0.01967637 | 0.02023216 | 0.01912058 |
| 0.019673269 | 0.020229424 | 0.019117113 | 0.019673269 | 0.020229424 | 0.019117113 |
| 0.019670172 | 0.020226686 | 0.019113658 | 0.019670172 | 0.020226686 | 0.019113658 |
| 0.019667096 | 0.02022397 | 0.019110221 | 0.019667096 | 0.02022397 | 0.019110221 |
| 0.019664402 | 0.020221248 | 0.019106792 | 0.019664402 | 0.020221248 | 0.019106792 |
| 0.019660955 | 0.020218531 | 0.019103376 | 0.019660955 | 0.020218531 | 0.019103376 |
| 0.019657895 | 0.020215834 | 0.019099956 | 0.019657895 | 0.020215834 | 0.019099956 |
| 0.019654856 | 0.020213132 | 0.019096581 | 0.019654856 | 0.020213132 | 0.019096581 |
| 0.019651815 | 0.020210447 | 0.019093184 | 0.019651815 | 0.020210447 | 0.019093184 |
| 0.019648798 | 0.020207757 | 0.019089839 | 0.019648798 | 0.020207757 | 0.019089839 |
| 0.019645783 | 0.02020508 | 0.019086487 | 0.019645783 | 0.02020508 | 0.019086487 |
| 0.019642761 | 0.020202395 | 0.019083127 | 0.019642761 | 0.020202395 | 0.019083127 |
| 0.019639777 | 0.020199733 | 0.019079821 | 0.019639777 | 0.020199733 | 0.019079821 |
| 0.019636782 | 0.020197062 | 0.019076502 | 0.019636782 | 0.020197062 | 0.019076502 |
| 0.019633804 | 0.020194418 | 0.019073189 | 0.019633804 | 0.020194418 | 0.019073189 |
| 0.019630818 | 0.020191756 | 0.01906988 | 0.019630818 | 0.020191756 | 0.01906988 |
| 0.019627857 | 0.020189103 | 0.019066611 | 0.019627857 | 0.020189103 | 0.019066611 |
| 0.019624903 | 0.020186461 | 0.019063344 | 0.019624903 | 0.020186461 | 0.019063344 |
| 0.019621963 | 0.020183848 | 0.019060077 | 0.019621963 | 0.020183848 | 0.019060077 |
| 0.019619021 | 0.020181202 | 0.01905684 | 0.019619021 | 0.020181202 | 0.01905684 |
| 0.01961608 | 0.020178565 | 0.019053596 | 0.01961608 | 0.020178565 | 0.019053596 |
| 0.019613156 | 0.020175949 | 0.019050364 | 0.019613156 | 0.020175949 | 0.019050364 |
| 0.019610246 | 0.020173338 | 0.019047154 | 0.019610246 | 0.020173338 | 0.019047154 |
| 0.019607344 | 0.020170741 | 0.019043947 | 0.019607344 | 0.020170741 | 0.019043947 |

FIG. 12 (continued)

| | | | | | |
|---|---|---|---|---|---|
| 0.019604434 | 0.020168124 | 0.019040744 | 0.019460295 | 0.020035089 | 0.018885481 |
| 0.019601547 | 0.020165511 | 0.019037583 | 0.019457716 | 0.020032647 | 0.018882786 |
| 0.019598655 | 0.020162905 | 0.019034405 | 0.01945516 | 0.020030221 | 0.018880099 |
| 0.019595768 | 0.020160321 | 0.019031255 | 0.019452617 | 0.020027811 | 0.018877424 |
| 0.019592912 | 0.020157723 | 0.019028101 | 0.019450068 | 0.020025379 | 0.018874758 |
| 0.019590054 | 0.020155145 | 0.019024964 | 0.019447516 | 0.020022941 | 0.018872091 |
| 0.01958719 | 0.020152551 | 0.019021828 | 0.019444983 | 0.020020527 | 0.018869439 |
| 0.019584353 | 0.02014998 | 0.019018725 | 0.019442445 | 0.020018102 | 0.018866787 |
| 0.019581514 | 0.020147417 | 0.019015611 | 0.01943992 | 0.020015686 | 0.018864153 |
| 0.019578678 | 0.020144838 | 0.019012518 | 0.019437391 | 0.020013268 | 0.018861515 |
| 0.019575849 | 0.020142263 | 0.019009436 | 0.019434877 | 0.020010854 | 0.018858901 |
| 0.019573031 | 0.020139713 | 0.019006349 | 0.019432365 | 0.020008445 | 0.018856285 |
| 0.019570228 | 0.020137166 | 0.019003289 | 0.019429851 | 0.020006025 | 0.018853676 |
| 0.019567415 | 0.020134599 | 0.019000231 | 0.019427347 | 0.020003615 | 0.01885108 |
| 0.019564614 | 0.020132046 | 0.018997181 | 0.019424848 | 0.0200012 | 0.018848495 |
| 0.019561828 | 0.020129515 | 0.018994142 | 0.019422351 | 0.019998804 | 0.018845898 |
| 0.019559043 | 0.020126957 | 0.018991128 | 0.019419856 | 0.019996397 | 0.018843315 |
| 0.019556263 | 0.02012442 | 0.018988106 | 0.01941737 | 0.019993994 | 0.018840746 |
| 0.019553494 | 0.020121893 | 0.018985095 | 0.019414891 | 0.019991601 | 0.018838182 |
| 0.01955073 | 0.020119365 | 0.018982096 | 0.019412416 | 0.019989198 | 0.018835634 |
| 0.019547972 | 0.02011683 | 0.018979114 | 0.019409939 | 0.019986797 | 0.018833081 |
| 0.019545212 | 0.020114304 | 0.01897612 | 0.019407475 | 0.019984402 | 0.018830547 |
| 0.019542469 | 0.020111786 | 0.018973152 | 0.01940501 | 0.019982006 | 0.018828014 |
| 0.019539733 | 0.020109279 | 0.018970187 | 0.019402544 | 0.019979618 | 0.018825469 |
| 0.019537004 | 0.020106764 | 0.018967245 | 0.019400101 | 0.019977236 | 0.018822966 |
| 0.019534277 | 0.020104248 | 0.018964307 | 0.019397642 | 0.019974827 | 0.018820458 |
| 0.019531549 | 0.020101736 | 0.018961362 | 0.019395209 | 0.019972462 | 0.018817956 |
| 0.019528841 | 0.020099244 | 0.018958438 | 0.019392754 | 0.019970053 | 0.018815456 |
| 0.019526128 | 0.020096723 | 0.018955534 | 0.019390327 | 0.019967687 | 0.018812966 |
| 0.019523423 | 0.020094228 | 0.018952618 | 0.019387888 | 0.019965295 | 0.018810482 |
| 0.019520737 | 0.020091736 | 0.018949738 | 0.019385463 | 0.019962919 | 0.018808006 |
| 0.019518044 | 0.020089255 | 0.018946833 | 0.019383035 | 0.019960539 | 0.018805531 |
| 0.01951536 | 0.020086759 | 0.018943962 | 0.01938062 | 0.01995616 | 0.018803081 |
| 0.019512683 | 0.020084273 | 0.018941093 | 0.019378198 | 0.019955768 | 0.018800627 |
| 0.019510007 | 0.020081785 | 0.018938228 | 0.019375795 | 0.019953404 | 0.018798187 |
| 0.019507345 | 0.020079312 | 0.018935377 | 0.019373382 | 0.019951027 | 0.018795737 |
| 0.01950468 | 0.020076931 | 0.018932529 | 0.019370987 | 0.019948671 | 0.018793303 |
| 0.019502027 | 0.020074363 | 0.018929691 | 0.01936858 | 0.019946285 | 0.018790876 |
| 0.019499376 | 0.020071881 | 0.018926872 | 0.019366189 | 0.019943918 | 0.01879846 |
| 0.019496735 | 0.020069407 | 0.018924062 | 0.019363606 | 0.019941564 | 0.018786047 |
| 0.019494097 | 0.020066939 | 0.018921255 | 0.019361422 | 0.019939189 | 0.018783655 |
| 0.019491466 | 0.020064487 | 0.018918446 | 0.019359032 | 0.019936823 | 0.01878124 |
| 0.019488833 | 0.020062014 | 0.018915653 | 0.019356655 | 0.019934463 | 0.018778847 |
| 0.019486212 | 0.020059555 | 0.01891287 | 0.019354285 | 0.019932104 | 0.018776466 |
| 0.019483599 | 0.020057097 | 0.018910101 | 0.019351915 | 0.019929742 | 0.018774087 |
| 0.019480991 | 0.020054651 | 0.018907331 | 0.019349552 | 0.019927381 | 0.018771723 |
| 0.01947838 | 0.020052189 | 0.018904571 | 0.019347188 | 0.019925022 | 0.018769353 |
| 0.019475785 | 0.020049744 | 0.018901827 | 0.019344833 | 0.019922671 | 0.018766995 |
| 0.019473175 | 0.020047285 | 0.018899064 | 0.019342473 | 0.019920306 | 0.018764641 |
| 0.019470592 | 0.020044849 | 0.018896336 | 0.019340121 | 0.019917945 | 0.018762297 |
| 0.019468008 | 0.020042404 | 0.018893612 | 0.01933778 | 0.019915602 | 0.018759958 |
| 0.019465435 | 0.020039973 | 0.018890897 | 0.019335446 | 0.019913254 | 0.018757639 |
| 0.019462857 | 0.020037532 | 0.018888181 | 0.01933311 | 0.019910905 | 0.018755315 |

FIG. 12 (continued)

| | | | | | |
|---|---|---|---|---|---|
| 0.019330767 | 0.01990854 | 0.018752994 | 0.019212291 | 0.019765804 | 0.018638777 |
| 0.019328446 | 0.019906204 | 0.018750698 | 0.019210147 | 0.019763528 | 0.018636765 |
| 0.019326113 | 0.019903857 | 0.018748369 | 0.01920801 | 0.019761249 | 0.018634771 |
| 0.019323797 | 0.019901519 | 0.018746074 | 0.019205873 | 0.019778955 | 0.018632791 |
| 0.019321471 | 0.019899162 | 0.018743791 | 0.019203742 | 0.019776683 | 0.0186308 |
| 0.019319161 | 0.019896822 | 0.018741501 | 0.019201607 | 0.019774404 | 0.018628809 |
| 0.019316853 | 0.019894491 | 0.018739214 | 0.019199483 | 0.019772133 | 0.018626834 |
| 0.019314546 | 0.019892146 | 0.018736945 | 0.019197352 | 0.019769841 | 0.018624864 |
| 0.01931224 | 0.019889804 | 0.018734677 | 0.019195231 | 0.019767571 | 0.01862289 |
| 0.01930994 | 0.019887464 | 0.018732417 | 0.019193104 | 0.01976529 | 0.018620918 |
| 0.019307644 | 0.019885127 | 0.018730162 | 0.019190993 | 0.019763028 | 0.018618958 |
| 0.019305359 | 0.019882798 | 0.01872792 | 0.019188879 | 0.019760751 | 0.018617007 |
| 0.019303072 | 0.019880471 | 0.018725672 | 0.019186772 | 0.019758489 | 0.018615056 |
| 0.019300784 | 0.019878126 | 0.018723442 | 0.019184659 | 0.019756214 | 0.018613104 |
| 0.019298511 | 0.019875811 | 0.018721211 | 0.019182558 | 0.019753946 | 0.01861117 |
| 0.019296224 | 0.019873466 | 0.018718982 | 0.019180453 | 0.019751685 | 0.018609221 |
| 0.019293955 | 0.019871147 | 0.018716763 | 0.019178362 | 0.019749432 | 0.018607292 |
| 0.019291668 | 0.019868814 | 0.018714563 | 0.019176264 | 0.019747167 | 0.018605361 |
| 0.01928942 | 0.019866497 | 0.018712342 | 0.019174169 | 0.019744896 | 0.018603441 |
| 0.019287155 | 0.019864175 | 0.018710155 | 0.01917208 | 0.01974263 | 0.018601531 |
| 0.019284902 | 0.019861849 | 0.018707954 | 0.019170001 | 0.019740386 | 0.018599615 |
| 0.019282644 | 0.019859517 | 0.018705771 | 0.019167914 | 0.019738122 | 0.018597705 |
| 0.019280394 | 0.0198572 | 0.018703586 | 0.019165825 | 0.019735848 | 0.018595802 |
| 0.019278144 | 0.019854873 | 0.018701416 | 0.01916375 | 0.019733604 | 0.018593896 |
| 0.019275896 | 0.019852545 | 0.018699246 | 0.01916168 | 0.019731367 | 0.018591993 |
| 0.019273656 | 0.019850228 | 0.018697084 | 0.019159609 | 0.019729104 | 0.018590115 |
| 0.01927142 | 0.019847919 | 0.018694922 | 0.019157543 | 0.019726844 | 0.018588241 |
| 0.019269184 | 0.019845594 | 0.018692774 | 0.019155496 | 0.019724622 | 0.01858635 |
| 0.019266958 | 0.019843285 | 0.018690631 | 0.019153412 | 0.019722354 | 0.018584471 |
| 0.019264732 | 0.019840976 | 0.018688489 | 0.019151348 | 0.019720113 | 0.018582583 |
| 0.019262501 | 0.019838656 | 0.018686346 | 0.019149297 | 0.019717874 | 0.01858072 |
| 0.019260292 | 0.019836367 | 0.018684218 | 0.019147241 | 0.019715622 | 0.018578861 |
| 0.019258073 | 0.01983405 | 0.018682096 | 0.019145196 | 0.019713385 | 0.018577006 |
| 0.019255854 | 0.019831715 | 0.018679993 | 0.019143148 | 0.019711147 | 0.018575149 |
| 0.019253651 | 0.019829427 | 0.018677874 | 0.019141098 | 0.019708911 | 0.018573286 |
| 0.019251443 | 0.019827122 | 0.018675765 | 0.019139054 | 0.01970667 | 0.018571437 |
| 0.019249242 | 0.019824825 | 0.018673659 | 0.019137007 | 0.019704423 | 0.018569592 |
| 0.019247044 | 0.019822507 | 0.018671582 | 0.019134981 | 0.019702201 | 0.018567761 |
| 0.019244834 | 0.019820196 | 0.018669472 | 0.019132942 | 0.01969997 | 0.018565914 |
| 0.01924265 | 0.019817902 | 0.018667397 | 0.019130912 | 0.019697738 | 0.018564086 |
| 0.019240462 | 0.019815597 | 0.018665327 | 0.019128879 | 0.019695503 | 0.018562255 |
| 0.019238273 | 0.01981331 | 0.018663237 | 0.01912686 | 0.019693276 | 0.018560445 |
| 0.019236093 | 0.019811002 | 0.018661185 | 0.019124838 | 0.019691052 | 0.018558625 |
| 0.019233916 | 0.019808715 | 0.018659117 | 0.019122815 | 0.019688834 | 0.018556796 |
| 0.01923174 | 0.019806426 | 0.018657054 | 0.0191208 | 0.019686609 | 0.018554991 |
| 0.019229563 | 0.019804113 | 0.018655012 | 0.019118787 | 0.019684384 | 0.01855319 |
| 0.019227396 | 0.019801828 | 0.018652964 | 0.019116767 | 0.01968216 | 0.018551374 |
| 0.01922523 | 0.019799533 | 0.018650928 | 0.019114768 | 0.019679956 | 0.018549579 |
| 0.019223063 | 0.01979724 | 0.018648886 | 0.019112748 | 0.019677731 | 0.018547765 |
| 0.019220904 | 0.019794952 | 0.018646855 | 0.019110758 | 0.01967553 | 0.018545986 |
| 0.019218745 | 0.019792652 | 0.018644838 | 0.019108754 | 0.019673316 | 0.018544192 |
| 0.019216591 | 0.019790371 | 0.018642811 | 0.019106752 | 0.019671091 | 0.018542413 |
| 0.019214436 | 0.019788081 | 0.018640791 | 0.01910476 | 0.019668879 | 0.018540641 |

| | | | | | |
|---|---|---|---|---|---|
| 0.018740709 | 0.019262765 | 0.018218654 | 0.018669106 | 0.019187512 | 0.0181507 |
| 0.018739294 | 0.019261247 | 0.01821734 | 0.018667825 | 0.019186189 | 0.018149461 |
| 0.018737877 | 0.019259745 | 0.018216008 | 0.018666547 | 0.019184878 | 0.018148216 |
| 0.018736459 | 0.019258222 | 0.018214697 | 0.018665272 | 0.01918356 | 0.018146983 |
| 0.018735046 | 0.019256712 | 0.01821338 | 0.018663996 | 0.019182256 | 0.018145737 |
| 0.018733635 | 0.019255194 | 0.018212076 | 0.018662724 | 0.019180941 | 0.018144507 |
| 0.018732234 | 0.019253712 | 0.018210756 | 0.018661454 | 0.019179646 | 0.018143262 |
| 0.018730829 | 0.019252211 | 0.018209447 | 0.018660182 | 0.019178343 | 0.018142022 |
| 0.01872943 | 0.019250722 | 0.018208137 | 0.018658919 | 0.019177044 | 0.018140793 |
| 0.018728033 | 0.019249237 | 0.018206829 | 0.018657652 | 0.019175749 | 0.018139556 |
| 0.018726636 | 0.019247745 | 0.018205527 | 0.018656397 | 0.019174471 | 0.018138324 |
| 0.018725246 | 0.019246269 | 0.018204223 | 0.018655133 | 0.019173173 | 0.018137092 |
| 0.018723852 | 0.019244786 | 0.018202919 | 0.018653884 | 0.019171902 | 0.018135866 |
| 0.018722465 | 0.019243305 | 0.018201625 | 0.018652636 | 0.019170629 | 0.018134643 |
| 0.018721078 | 0.019241856 | 0.018200301 | 0.018651364 | 0.019169352 | 0.018133416 |
| 0.018719699 | 0.019240385 | 0.018199013 | 0.018650135 | 0.019168072 | 0.018132196 |
| 0.018718315 | 0.019238923 | 0.018197707 | 0.018648892 | 0.019166809 | 0.018130975 |
| 0.018716951 | 0.019237476 | 0.018196427 | 0.018647651 | 0.019165557 | 0.018129746 |
| 0.018715569 | 0.01923602 | 0.018195117 | 0.018646409 | 0.019164287 | 0.018128531 |
| 0.018714207 | 0.019234579 | 0.018193835 | 0.018645168 | 0.019163034 | 0.018127302 |
| 0.018712827 | 0.019233115 | 0.01819254 | 0.01864393 | 0.019161771 | 0.018126089 |
| 0.018711461 | 0.019231675 | 0.018191248 | 0.018642694 | 0.01916051 | 0.018124875 |
| 0.018710102 | 0.019230245 | 0.018189959 | 0.018641464 | 0.019159269 | 0.01812366 |
| 0.018708736 | 0.019228799 | 0.018188674 | 0.018640238 | 0.01915802 | 0.018122455 |
| 0.018707378 | 0.019227373 | 0.018187364 | 0.018639011 | 0.019156785 | 0.018121236 |
| 0.018706024 | 0.019225955 | 0.018186092 | 0.018637796 | 0.019155548 | 0.018120023 |
| 0.018704667 | 0.019224519 | 0.018184815 | 0.01863657 | 0.019154328 | 0.018118812 |
| 0.018703323 | 0.019223114 | 0.018183533 | 0.018635345 | 0.019153081 | 0.018117609 |
| 0.018701966 | 0.019221685 | 0.018182247 | 0.018634122 | 0.019151843 | 0.018116401 |
| 0.018700623 | 0.019220274 | 0.018180973 | 0.018632914 | 0.019150635 | 0.018115193 |
| 0.01869929 | 0.019218879 | 0.0181797 | 0.018631697 | 0.019149398 | 0.018113996 |
| 0.018697945 | 0.019217469 | 0.018178422 | 0.01863049 | 0.01914818 | 0.018112799 |
| 0.018696613 | 0.019216077 | 0.018177149 | 0.018629279 | 0.019146978 | 0.01811156 |
| 0.018695267 | 0.01921467 | 0.018175864 | 0.018628074 | 0.019145761 | 0.018110387 |
| 0.018693941 | 0.01921328 | 0.018174601 | 0.018626872 | 0.019144557 | 0.018109188 |
| 0.018692612 | 0.019211891 | 0.018173333 | 0.018625664 | 0.019143339 | 0.018107985 |
| 0.018691286 | 0.019210514 | 0.018172059 | 0.018624473 | 0.019142152 | 0.018106795 |
| 0.018689955 | 0.01920912 | 0.01817079 | 0.018623283 | 0.019140949 | 0.018105616 |
| 0.018688647 | 0.019207754 | 0.01816954 | 0.018622076 | 0.01913975 | 0.018104401 |
| 0.018687316 | 0.019206372 | 0.01816826 | 0.018620887 | 0.019138566 | 0.018103207 |
| 0.018685998 | 0.019204995 | 0.018167002 | 0.018619698 | 0.019137373 | 0.018102024 |
| 0.018684682 | 0.019203627 | 0.018165736 | 0.018618505 | 0.019136179 | 0.018100832 |
| 0.018683376 | 0.019202278 | 0.018164475 | 0.018617326 | 0.019135001 | 0.018099652 |
| 0.018682064 | 0.019200906 | 0.018163222 | 0.018616142 | 0.01913383 | 0.018098453 |
| 0.018680756 | 0.019199549 | 0.018161962 | 0.018614964 | 0.019132643 | 0.018097285 |
| 0.018679452 | 0.0191982 | 0.018160704 | 0.018613781 | 0.019131463 | 0.018096099 |
| 0.018678147 | 0.019196852 | 0.018159441 | 0.018612603 | 0.019130291 | 0.018094915 |
| 0.01867685 | 0.019195506 | 0.018158193 | 0.018611439 | 0.019129133 | 0.018093744 |
| 0.018675555 | 0.019194164 | 0.018156947 | 0.018610257 | 0.019127958 | 0.018092556 |
| 0.018674249 | 0.019192819 | 0.01815568 | 0.01860909 | 0.019126807 | 0.018091374 |
| 0.01867297 | 0.019191491 | 0.018154446 | 0.018607926 | 0.019125656 | 0.018090195 |
| 0.01867167 | 0.019190152 | 0.018153189 | 0.018606754 | 0.019124487 | 0.018089021 |
| 0.018670391 | 0.019188835 | 0.018151947 | 0.018605592 | 0.019123341 | 0.018087844 |

FIG. 12 (continued)

| | | | | | |
|---|---|---|---|---|---|
| 0.018604434 | 0.019122188 | 0.01808669 | 0.018545818 | 0.019065264 | 0.018026372 |
| 0.018603276 | 0.019121043 | 0.018085509 | 0.018544766 | 0.019064259 | 0.018025272 |
| 0.01860211 | 0.019119884 | 0.018084337 | 0.018543717 | 0.01906326 | 0.018024174 |
| 0.018600959 | 0.019118754 | 0.018083164 | 0.018542657 | 0.019062259 | 0.018023056 |
| 0.018599814 | 0.019117621 | 0.018082006 | 0.018541617 | 0.019061261 | 0.018021972 |
| 0.018598661 | 0.019116498 | 0.018080824 | 0.018540564 | 0.019060264 | 0.018020863 |
| 0.018597508 | 0.019115353 | 0.018079662 | 0.018539524 | 0.019059272 | 0.018019777 |
| 0.018596357 | 0.019114212 | 0.018078502 | 0.018538475 | 0.01905828 | 0.01801867 |
| 0.018595212 | 0.019113088 | 0.018077335 | 0.018537428 | 0.01905729 | 0.018017565 |
| 0.01859408 | 0.019111984 | 0.018076176 | 0.018536396 | 0.019056307 | 0.018016484 |
| 0.018592935 | 0.019110952 | 0.018075018 | 0.018535358 | 0.019055321 | 0.018015395 |
| 0.018591794 | 0.019109725 | 0.018073863 | 0.018534319 | 0.019054342 | 0.018014297 |
| 0.01859066 | 0.019108617 | 0.018072703 | 0.018533284 | 0.01905336 | 0.018013207 |
| 0.018589528 | 0.019107506 | 0.018071549 | 0.018532254 | 0.019052395 | 0.018012114 |
| 0.018588404 | 0.019106399 | 0.01807041 | 0.018531227 | 0.019051421 | 0.018011033 |
| 0.018587272 | 0.019105304 | 0.01806924 | 0.0185302 | 0.019050446 | 0.018009954 |
| 0.018586133 | 0.019104178 | 0.018068087 | 0.018529172 | 0.019049494 | 0.018008851 |
| 0.018585019 | 0.019103103 | 0.018066935 | 0.018528147 | 0.019048509 | 0.018007785 |
| 0.018583893 | 0.019101994 | 0.018065791 | 0.018527118 | 0.019047547 | 0.01800669 |
| 0.018582771 | 0.019100898 | 0.018064643 | 0.018526098 | 0.019046583 | 0.018005612 |
| 0.018581653 | 0.019099805 | 0.018063501 | 0.018525072 | 0.019045617 | 0.018004527 |
| 0.018580539 | 0.019098721 | 0.018062358 | 0.018524062 | 0.019044676 | 0.018003448 |
| 0.018579417 | 0.019097628 | 0.018061206 | 0.018523042 | 0.019043712 | 0.018002373 |
| 0.018578305 | 0.019096544 | 0.018060065 | 0.018522027 | 0.01904276 | 0.018001295 |
| 0.018577198 | 0.019095471 | 0.018058924 | 0.018521011 | 0.019041797 | 0.018000225 |
| 0.018576084 | 0.019094399 | 0.01805777 | 0.018519998 | 0.019040848 | 0.017999148 |
| 0.018574965 | 0.019093324 | 0.018056647 | 0.018518995 | 0.019039917 | 0.017998074 |
| 0.018573875 | 0.01909223 | 0.01805552 | 0.018517985 | 0.019038962 | 0.017997008 |
| 0.018572769 | 0.019091164 | 0.018054375 | 0.018516985 | 0.019038038 | 0.017995932 |
| 0.018571671 | 0.019090113 | 0.01805323 | 0.018515968 | 0.019037086 | 0.017994851 |
| 0.018570571 | 0.019089041 | 0.018052101 | 0.018514965 | 0.019036139 | 0.01799379 |
| 0.01856947 | 0.019087968 | 0.018050972 | 0.018513963 | 0.019035206 | 0.017992721 |
| 0.018568379 | 0.019086911 | 0.018049848 | 0.01851296 | 0.019034275 | 0.017991645 |
| 0.018567267 | 0.019085869 | 0.018048705 | 0.018511975 | 0.019033347 | 0.017990602 |
| 0.018566195 | 0.019084806 | 0.018047584 | 0.018510967 | 0.019032412 | 0.017989521 |
| 0.018565098 | 0.019083743 | 0.018046454 | 0.018509968 | 0.019031481 | 0.017988456 |
| 0.018564022 | 0.019082709 | 0.018045336 | 0.018508981 | 0.01903055 | 0.017987413 |
| 0.018562929 | 0.019081646 | 0.018044212 | 0.018507961 | 0.019029629 | 0.017986333 |
| 0.018561846 | 0.019080612 | 0.01804308 | 0.018506993 | 0.019028703 | 0.017985282 |
| 0.018560768 | 0.01907957 | 0.018041966 | 0.018506009 | 0.019027792 | 0.017984225 |
| 0.018559688 | 0.019078541 | 0.018040835 | 0.018505015 | 0.019026872 | 0.017983159 |
| 0.018558608 | 0.019077499 | 0.018039717 | 0.018504029 | 0.019025952 | 0.017982106 |
| 0.018557536 | 0.019076476 | 0.018038596 | 0.018503044 | 0.019025036 | 0.017981051 |
| 0.01855645 | 0.019075426 | 0.018037474 | 0.01850206 | 0.019024121 | 0.01798 |
| 0.018555387 | 0.019074417 | 0.018036358 | 0.018501084 | 0.019023223 | 0.017978945 |
| 0.018554316 | 0.019073383 | 0.01803525 | 0.0185001 | 0.019022306 | 0.017977895 |
| 0.018553245 | 0.019072353 | 0.018034137 | 0.018499119 | 0.019021399 | 0.01797684 |
| 0.01855218 | 0.019071333 | 0.018033027 | 0.018498147 | 0.019020497 | 0.017975797 |
| 0.018551107 | 0.019070313 | 0.018031902 | 0.018497167 | 0.019019588 | 0.017974745 |
| 0.018550054 | 0.019069302 | 0.018030806 | 0.018496204 | 0.0190187 | 0.017973707 |
| 0.01854899 | 0.019068288 | 0.018029693 | 0.018495224 | 0.019017796 | 0.017972651 |
| 0.018547929 | 0.019067281 | 0.018028577 | 0.018494259 | 0.019016898 | 0.01797162 |
| 0.018546874 | 0.019066262 | 0.018027487 | 0.018493292 | 0.01901601 | 0.017970574 |

FIG. 12 (continued)

| | | | | | |
|---|---|---|---|---|---|
| 0.01849232 | 0.019015118 | 0.017969522 | 0.018443056 | 0.018970322 | 0.01791579 |
| 0.018491351 | 0.019014227 | 0.017968476 | 0.018442147 | 0.018969499 | 0.017914795 |
| 0.018490393 | 0.019013345 | 0.017967441 | 0.018441262 | 0.018968704 | 0.017913821 |
| 0.018489425 | 0.019012451 | 0.017966398 | 0.018440372 | 0.018967901 | 0.017912843 |
| 0.018488461 | 0.019011568 | 0.017965354 | 0.018439487 | 0.018967108 | 0.017911867 |
| 0.018487502 | 0.019010685 | 0.017964319 | 0.018438594 | 0.018966309 | 0.017910879 |
| 0.018486543 | 0.019009799 | 0.017963286 | 0.018437707 | 0.018965516 | 0.017909897 |
| 0.018485582 | 0.019008909 | 0.017962255 | 0.018436808 | 0.018964697 | 0.017908919 |
| 0.018484625 | 0.019008044 | 0.017961205 | 0.018435934 | 0.018963935 | 0.017907933 |
| 0.018483675 | 0.019007165 | 0.017960184 | 0.018435049 | 0.018963139 | 0.017906959 |
| 0.018482719 | 0.019006291 | 0.017959146 | 0.018434164 | 0.018962351 | 0.017905977 |
| 0.018481779 | 0.019005423 | 0.017958134 | 0.018433291 | 0.018961566 | 0.017905017 |
| 0.018480823 | 0.019004552 | 0.017957094 | 0.018432402 | 0.018960774 | 0.017904031 |
| 0.018479862 | 0.019003691 | 0.017956074 | 0.018431519 | 0.018959977 | 0.017903062 |
| 0.018478928 | 0.019002809 | 0.017955046 | 0.018430647 | 0.018959205 | 0.017902088 |
| 0.018477978 | 0.019001951 | 0.017954005 | 0.018429771 | 0.018958422 | 0.01790112 |
| 0.018477036 | 0.019001092 | 0.01795298 | 0.018428886 | 0.018957634 | 0.017900137 |
| 0.018476098 | 0.019000217 | 0.017951956 | 0.018428014 | 0.018956849 | 0.017899179 |
| 0.018475151 | 0.018999364 | 0.017950938 | 0.018427141 | 0.018956082 | 0.0178982 |
| 0.018474211 | 0.018998499 | 0.017949924 | 0.018426274 | 0.018955305 | 0.017897242 |
| 0.018473273 | 0.018997654 | 0.017948892 | 0.018425404 | 0.018954529 | 0.01789628 |
| 0.018472337 | 0.018996794 | 0.01794788 | 0.018424526 | 0.018953735 | 0.017895317 |
| 0.018471399 | 0.018995938 | 0.017946861 | 0.01842366 | 0.018952965 | 0.017894354 |
| 0.018470467 | 0.01899509 | 0.017945853 | 0.018422794 | 0.018952211 | 0.017893376 |
| 0.018469536 | 0.018994246 | 0.017944827 | 0.018421922 | 0.018951435 | 0.017892408 |
| 0.0184686 | 0.018993391 | 0.017943809 | 0.018421058 | 0.018950663 | 0.017891454 |
| 0.018467569 | 0.018992545 | 0.017942794 | 0.018420196 | 0.018949903 | 0.017890486 |
| 0.018466748 | 0.018991705 | 0.01794179 | 0.018419333 | 0.018949137 | 0.017889529 |
| 0.01846581 | 0.018990853 | 0.017940768 | 0.01841847 | 0.01894836 | 0.017888581 |
| 0.018464864 | 0.01899001 | 0.017939757 | 0.018417609 | 0.018947601 | 0.017887616 |
| 0.018463963 | 0.018989184 | 0.017938742 | 0.01841675 | 0.018946843 | 0.017886657 |
| 0.018463032 | 0.01898833 | 0.017937734 | 0.018415899 | 0.018946076 | 0.017885701 |
| 0.018462115 | 0.018987499 | 0.017936731 | 0.018415036 | 0.01894533 | 0.017884741 |
| 0.018461197 | 0.018986669 | 0.017935725 | 0.018414166 | 0.018944556 | 0.017883776 |
| 0.018460274 | 0.018985843 | 0.017934704 | 0.018413318 | 0.018943801 | 0.017882834 |
| 0.018459361 | 0.018985006 | 0.017933717 | 0.018412463 | 0.018943047 | 0.017881878 |
| 0.018458438 | 0.018984173 | 0.017932704 | 0.018411614 | 0.018942286 | 0.017880942 |
| 0.018457528 | 0.018983344 | 0.017931712 | 0.018410752 | 0.018941528 | 0.017879977 |
| 0.018456608 | 0.018982521 | 0.017930695 | 0.018409907 | 0.018940777 | 0.017879036 |
| 0.018455701 | 0.018981694 | 0.017929708 | 0.018409059 | 0.01894003 | 0.017878098 |
| 0.018454762 | 0.018980868 | 0.017928696 | 0.018408207 | 0.018939277 | 0.017877137 |
| 0.018453877 | 0.018980044 | 0.017927709 | 0.018407357 | 0.018938525 | 0.01787619 |
| 0.018452968 | 0.01897923 | 0.017926707 | 0.018406515 | 0.018937786 | 0.017875245 |
| 0.018452058 | 0.018978408 | 0.017925707 | 0.018405667 | 0.018937038 | 0.017874295 |
| 0.018451151 | 0.018977584 | 0.017924717 | 0.018404819 | 0.018936287 | 0.017873352 |
| 0.01845025 | 0.018976781 | 0.01792372 | 0.018403969 | 0.018935531 | 0.017872407 |
| 0.018449346 | 0.01897597 | 0.017922721 | 0.01840313 | 0.018934796 | 0.017871464 |
| 0.018448438 | 0.018975153 | 0.017921722 | 0.018402285 | 0.018934052 | 0.017870517 |
| 0.018447534 | 0.018974333 | 0.017920735 | 0.01840145 | 0.018933332 | 0.017869579 |
| 0.018446644 | 0.018973531 | 0.017919756 | 0.01840061 | 0.018932578 | 0.017868642 |
| 0.018445743 | 0.018972724 | 0.017918763 | 0.018399771 | 0.018931839 | 0.017867704 |
| 0.018444841 | 0.01897192 | 0.017917762 | 0.018398932 | 0.018931106 | 0.017866759 |
| 0.018443939 | 0.018971096 | 0.017916782 | 0.018398099 | 0.018930364 | 0.017865835 |

FIG. 12 (continued)

| | | | | | |
|---|---|---|---|---|---|
| 0.01839726 | 0.018929633 | 0.017864887 | 0.018354344 | 0.018892149 | 0.01781654 |
| 0.018396424 | 0.018928898 | 0.01786395 | 0.01835355 | 0.018891458 | 0.017815641 |
| 0.018395597 | 0.018928168 | 0.017863026 | 0.01835277 | 0.018890781 | 0.017814759 |
| 0.018394759 | 0.018927424 | 0.017862093 | 0.018351986 | 0.018890103 | 0.017813868 |
| 0.018393928 | 0.018926698 | 0.017861158 | 0.018351211 | 0.018889426 | 0.017812996 |
| 0.018393096 | 0.018925961 | 0.01786023 | 0.018350425 | 0.018888752 | 0.017812096 |
| 0.018392271 | 0.018925253 | 0.017859289 | 0.018349639 | 0.018888063 | 0.017811214 |
| 0.01839144 | 0.018924516 | 0.017858364 | 0.018348859 | 0.018887389 | 0.017810319 |
| 0.018390609 | 0.018923779 | 0.017857439 | 0.018348086 | 0.018886728 | 0.017809444 |
| 0.01838979 | 0.01892306 | 0.01785652 | 0.018347311 | 0.018886053 | 0.017808569 |
| 0.018388966 | 0.018922345 | 0.017855588 | 0.018346521 | 0.018885355 | 0.017807687 |
| 0.018388135 | 0.018921617 | 0.017854652 | 0.01834575 | 0.018884696 | 0.017806803 |
| 0.018387313 | 0.018920889 | 0.017853739 | 0.018344969 | 0.018884025 | 0.017805913 |
| 0.018386489 | 0.018920172 | 0.017852807 | 0.018344197 | 0.018883356 | 0.017805039 |
| 0.018385667 | 0.018919458 | 0.017851881 | 0.018343421 | 0.018882682 | 0.01780416 |
| 0.018384841 | 0.018918721 | 0.017850961 | 0.018342652 | 0.018882022 | 0.017803282 |
| 0.018384023 | 0.018918019 | 0.017850026 | 0.018341868 | 0.018881328 | 0.017802408 |
| 0.018383208 | 0.018917288 | 0.017849128 | 0.018341103 | 0.018880677 | 0.017801529 |
| 0.018382391 | 0.018916582 | 0.0178482 | 0.018340329 | 0.018880006 | 0.017800653 |
| 0.018381574 | 0.01891587 | 0.017847278 | 0.018339561 | 0.018879345 | 0.017799777 |
| 0.018380756 | 0.018915155 | 0.017846356 | 0.018338769 | 0.018878678 | 0.0177989 |
| 0.018379946 | 0.018914441 | 0.017845451 | 0.018338023 | 0.01887801 | 0.017798037 |
| 0.018379128 | 0.018913724 | 0.017844531 | 0.018337253 | 0.01887735 | 0.017797157 |
| 0.018378314 | 0.018913016 | 0.017843612 | 0.018336492 | 0.018876686 | 0.017796297 |
| 0.018377498 | 0.018912304 | 0.017842692 | 0.018335724 | 0.018876024 | 0.017795425 |
| 0.018376694 | 0.0189116 | 0.017841787 | 0.018334952 | 0.018875357 | 0.017794547 |
| 0.018375877 | 0.018910887 | 0.017840867 | 0.018334185 | 0.018874691 | 0.017793679 |
| 0.018375071 | 0.018910181 | 0.017839962 | 0.018333426 | 0.018874038 | 0.017792814 |
| 0.018374261 | 0.018909473 | 0.017839048 | 0.018332661 | 0.018873379 | 0.017791943 |
| 0.018373452 | 0.018908778 | 0.017838125 | 0.0183319 | 0.01887272 | 0.017791079 |
| 0.018372657 | 0.018908089 | 0.017837226 | 0.018331138 | 0.01887206 | 0.017790217 |
| 0.018371845 | 0.01890737 | 0.01783632 | 0.01833038 | 0.018871412 | 0.017789347 |
| 0.018371042 | 0.018906668 | 0.017835416 | 0.018329613 | 0.018870751 | 0.017788474 |
| 0.018370231 | 0.018905964 | 0.017834496 | 0.018328855 | 0.018870097 | 0.017787613 |
| 0.018369433 | 0.018905262 | 0.017833603 | 0.018328099 | 0.018869439 | 0.017786759 |
| 0.018368625 | 0.0189045 7 | 0.01783268 | 0.018327337 | 0.018868789 | 0.017785885 |
| 0.018367819 | 0.018903861 | 0.017831777 | 0.018326577 | 0.01886813 | 0.017785025 |
| 0.018367031 | 0.018903181 | 0.017830881 | 0.018325826 | 0.018867471 | 0.01778418 |
| 0.018366226 | 0.018902471 | 0.01782996 | 0.018325067 | 0.018866829 | 0.017783305 |
| 0.018365431 | 0.018901786 | 0.017829076 | 0.018324315 | 0.018866169 | 0.017782461 |
| 0.018364632 | 0.018901097 | 0.017828167 | 0.018323557 | 0.01886552 | 0.017781593 |
| 0.018363835 | 0.018900402 | 0.017827269 | 0.01832281 | 0.018864874 | 0.017780746 |
| 0.018363037 | 0.018899702 | 0.017826372 | 0.018322056 | 0.018864221 | 0.01777989 |
| 0.018362241 | 0.018899005 | 0.017825478 | 0.018321302 | 0.018863575 | 0.017779028 |
| 0.018361 45 | 0.018898315 | 0.017824586 | 0.018320554 | 0.018862941 | 0.017778166 |
| 0.018360651 | 0.018897624 | 0.017823679 | 0.018319802 | 0.018862284 | 0.017777321 |
| 0.018359 86 | 0.018896931 | 0.017822789 | 0.018319054 | 0.018861634 | 0.017776474 |
| 0.018359069 | 0.01889625 | 0.017821889 | 0.018318302 | 0.018860991 | 0.017775612 |
| 0.018358287 | 0.018895571 | 0.017821004 | 0.018317551 | 0.018860335 | 0.017774767 |
| 0.018357493 | 0.018894879 | 0.017820107 | 0.018316801 | 0.018859689 | 0.017773913 |
| 0.018356705 | 0.018894205 | 0.017819205 | 0.018316053 | 0.018859052 | 0.017773053 |
| 0.018355917 | 0.018893514 | 0.017818319 | 0.018315313 | 0.018858408 | 0.017772219 |
| 0.018355132 | 0.01889283 | 0.017817434 | 0.018314569 | 0.018857772 | 0.017771366 |

FIG. 12 (continued)

| | | | | | |
|---|---|---|---|---|---|
| 0.01831382 | 0.018857134 | 0.017770505 | 0.018275352 | 0.01882403 | 0.017726673 |
| 0.018313082 | 0.018856493 | 0.017769671 | 0.018274644 | 0.018823424 | 0.017725865 |
| 0.018312337 | 0.01865585 | 0.017768824 | 0.018273935 | 0.018822819 | 0.017725052 |
| 0.018311596 | 0.018855209 | 0.017767984 | 0.018273235 | 0.018822218 | 0.017724251 |
| 0.018310857 | 0.018854579 | 0.017767136 | 0.01827252 | 0.018821591 | 0.01772345 |
| 0.018310109 | 0.018853928 | 0.01776629 | 0.018271817 | 0.018820989 | 0.017722645 |
| 0.01830937 | 0.018853298 | 0.017765442 | 0.018271108 | 0.018820382 | 0.017721835 |
| 0.018308633 | 0.018852656 | 0.01776461 | 0.018270406 | 0.01881978 | 0.017721031 |
| 0.018307893 | 0.018852028 | 0.017763757 | 0.018269698 | 0.018819173 | 0.017720223 |
| 0.018307154 | 0.018851388 | 0.017762919 | 0.018269001 | 0.018818574 | 0.017719427 |
| 0.018306422 | 0.018850759 | 0.017762085 | 0.018268292 | 0.018817961 | 0.017718624 |
| 0.018305677 | 0.018850113 | 0.017761242 | 0.018267597 | 0.018817367 | 0.017717827 |
| 0.018304943 | 0.018849488 | 0.017760399 | 0.018266897 | 0.018816766 | 0.017717028 |
| 0.018304211 | 0.018848848 | 0.017759575 | 0.01826619 | 0.018816156 | 0.017716225 |
| 0.018303476 | 0.018848229 | 0.017758723 | 0.018265489 | 0.018815545 | 0.017715432 |
| 0.01830274 | 0.018847592 | 0.017757888 | 0.018264798 | 0.018814947 | 0.017714634 |
| 0.018302007 | 0.018846958 | 0.017757057 | 0.018264092 | 0.018814342 | 0.017713841 |
| 0.018301274 | 0.018846331 | 0.017756217 | 0.018263401 | 0.018813756 | 0.017713046 |
| 0.018300542 | 0.018845707 | 0.017755377 | 0.018262697 | 0.018813139 | 0.017712255 |
| 0.018299812 | 0.018845071 | 0.017754554 | 0.018261991 | 0.018812528 | 0.017711455 |
| 0.018299086 | 0.018844452 | 0.01775372 | 0.018261312 | 0.018811957 | 0.017710666 |
| 0.018298358 | 0.018843611 | 0.017752906 | 0.018260611 | 0.018811344 | 0.017709878 |
| 0.018297626 | 0.01884319 | 0.017752061 | 0.018259909 | 0.018810737 | 0.017709081 |
| 0.018296896 | 0.018842558 | 0.017751233 | 0.018259222 | 0.018810158 | 0.017708287 |
| 0.018296163 | 0.018841939 | 0.017750387 | 0.018258533 | 0.018809569 | 0.017707496 |
| 0.01829544 | 0.018841314 | 0.017749566 | 0.018257833 | 0.018808955 | 0.017706712 |
| 0.018294716 | 0.018840689 | 0.017748744 | 0.018257135 | 0.018808361 | 0.017705909 |
| 0.018293988 | 0.018840054 | 0.017747922 | 0.018256451 | 0.018807766 | 0.017705135 |
| 0.018293262 | 0.018839438 | 0.017747086 | 0.018255751 | 0.018807168 | 0.017704334 |
| 0.018292539 | 0.018838809 | 0.017746269 | 0.018255067 | 0.018806583 | 0.01770355 |
| 0.018291825 | 0.018838207 | 0.017745443 | 0.018254375 | 0.018805985 | 0.017702764 |
| 0.018291093 | 0.018837571 | 0.017744615 | 0.018253685 | 0.018805387 | 0.017701983 |
| 0.018290366 | 0.018836944 | 0.017743789 | 0.018252992 | 0.018804798 | 0.017701187 |
| 0.01828965 | 0.018836333 | 0.017742967 | 0.018252307 | 0.018804204 | 0.017700409 |
| 0.018288929 | 0.018835714 | 0.017742144 | 0.018251618 | 0.018803612 | 0.017699623 |
| 0.018288209 | 0.018835096 | 0.017741323 | 0.018250929 | 0.018803015 | 0.017698843 |
| 0.018287489 | 0.018834466 | 0.017740512 | 0.018250244 | 0.018802425 | 0.017698063 |
| 0.018286766 | 0.018833846 | 0.017739687 | 0.018249562 | 0.018801827 | 0.017697297 |
| 0.018286049 | 0.018833234 | 0.017738863 | 0.018248857 | 0.018801236 | 0.017696498 |
| 0.01828533 | 0.018832616 | 0.017738044 | 0.018248178 | 0.018800643 | 0.017695713 |
| 0.018284615 | 0.018832002 | 0.017737227 | 0.018247498 | 0.018800058 | 0.017694938 |
| 0.018283895 | 0.018831388 | 0.017736404 | 0.018246816 | 0.018799468 | 0.017694164 |
| 0.018283181 | 0.018830766 | 0.017735596 | 0.018246136 | 0.018798873 | 0.017693393 |
| 0.01828246 | 0.018830148 | 0.017734772 | 0.018245449 | 0.018798292 | 0.017692607 |
| 0.01828175 | 0.018829546 | 0.017733953 | 0.018244768 | 0.018797703 | 0.017691832 |
| 0.018281038 | 0.018828924 | 0.017733152 | 0.018244065 | 0.018797117 | 0.017691054 |
| 0.018280326 | 0.018828314 | 0.017732338 | 0.018243409 | 0.01879653 | 0.017690288 |
| 0.018279621 | 0.018827712 | 0.017731529 | 0.018242724 | 0.018795942 | 0.017689505 |
| 0.018278897 | 0.018827081 | 0.017730713 | 0.018242032 | 0.018795348 | 0.017688716 |
| 0.018278191 | 0.018826467 | 0.017729914 | 0.018241365 | 0.018794767 | 0.017687962 |
| 0.01827748 | 0.018825862 | 0.017729098 | 0.018240682 | 0.018794178 | 0.017687187 |
| 0.01827677 | 0.018825248 | 0.017728293 | 0.018240001 | 0.018793594 | 0.017686408 |
| 0.018276064 | 0.018824647 | 0.017727481 | 0.018239326 | 0.018793007 | 0.017685645 |

FIG. 12 (continued)

| | | | | | |
|---|---|---|---|---|---|
| 0.018238651 | 0.018792421 | 0.01768488 | 0.018203503 | 0.018761966 | 0.01764504 |
| 0.018237972 | 0.018791839 | 0.017684105 | 0.018202851 | 0.018761408 | 0.017644293 |
| 0.01823729 | 0.018791242 | 0.017683338 | 0.018202214 | 0.018760855 | 0.017643572 |
| 0.018236616 | 0.018790672 | 0.01768256 | 0.018201562 | 0.018760285 | 0.017642836 |
| 0.018235943 | 0.018790083 | 0.017681803 | 0.018200908 | 0.018759711 | 0.017642105 |
| 0.018235273 | 0.018789512 | 0.017681034 | 0.018200264 | 0.018759154 | 0.017641374 |
| 0.018234594 | 0.018788918 | 0.01768027 | 0.018199618 | 0.018758599 | 0.017640637 |
| 0.018233924 | 0.018788351 | 0.017679498 | 0.018198966 | 0.018758023 | 0.01763991 |
| 0.018233256 | 0.018787771 | 0.017678742 | 0.01819833 | 0.018757476 | 0.017639184 |
| 0.01823258 | 0.018787184 | 0.017677977 | 0.018197683 | 0.018756911 | 0.017638455 |
| 0.018231906 | 0.018786609 | 0.017677203 | 0.018197034 | 0.018756343 | 0.017637726 |
| 0.018231235 | 0.018786024 | 0.017676445 | 0.01819639 | 0.018755784 | 0.017636986 |
| 0.018230559 | 0.018785438 | 0.017675681 | 0.01819575 | 0.018755222 | 0.017636277 |
| 0.018229889 | 0.01878486 | 0.017674918 | 0.018195107 | 0.018754671 | 0.017635543 |
| 0.018229222 | 0.018784272 | 0.017674172 | 0.018194463 | 0.018754104 | 0.017634822 |
| 0.018228555 | 0.0187637 | 0.01767341 | 0.018193822 | 0.018753542 | 0.017634102 |
| 0.018227885 | 0.018783121 | 0.017672648 | 0.018193177 | 0.018752975 | 0.017633379 |
| 0.018227217 | 0.018782543 | 0.017671892 | 0.01819254 | 0.018752427 | 0.017632654 |
| 0.018226547 | 0.018781972 | 0.017671122 | 0.018191899 | 0.018751859 | 0.017631938 |
| 0.018225877 | 0.018781385 | 0.017670368 | 0.018191251 | 0.018751297 | 0.017631204 |
| 0.018225212 | 0.018780806 | 0.017669619 | 0.018190609 | 0.018750741 | 0.017630476 |
| 0.018224547 | 0.018780241 | 0.017668852 | 0.018189974 | 0.018750176 | 0.017629771 |
| 0.018223879 | 0.018779656 | 0.017668102 | 0.01818933 | 0.018749624 | 0.017629036 |
| 0.018223219 | 0.018779079 | 0.017667358 | 0.018188701 | 0.01874907 | 0.017628333 |
| 0.018222558 | 0.018778512 | 0.017666604 | 0.018188056 | 0.0187485 | 0.017627611 |
| 0.018221881 | 0.01877793 | 0.017665833 | 0.018187422 | 0.018747948 | 0.017626896 |
| 0.018221224 | 0.018777366 | 0.017665083 | 0.018186782 | 0.018747389 | 0.017626176 |
| 0.018220561 | 0.018776787 | 0.017664335 | 0.018186146 | 0.018746832 | 0.01762546 |
| 0.0182199 | 0.018776216 | 0.017663584 | 0.018185551 | 0.018746273 | 0.017624747 |
| 0.018219234 | 0.018775639 | 0.01766283 | 0.018184872 | 0.01874572 | 0.017624025 |
| 0.018218576 | 0.018775061 | 0.01766209 | 0.018184241 | 0.018745168 | 0.017623314 |
| 0.018217919 | 0.0187745 | 0.017661337 | 0.018183601 | 0.018744601 | 0.017622602 |
| 0.018217253 | 0.018773917 | 0.01766059 | 0.018182971 | 0.018744055 | 0.017621887 |
| 0.018216598 | 0.018773349 | 0.017659846 | 0.018182337 | 0.018743497 | 0.017621178 |
| 0.018215938 | 0.018772785 | 0.01765909 | 0.018181702 | 0.018742945 | 0.017620458 |
| 0.018215279 | 0.018772212 | 0.017658347 | 0.018181081 | 0.018742405 | 0.017619756 |
| 0.01821462 | 0.018771628 | 0.017657612 | 0.018180439 | 0.018741826 | 0.017619053 |
| 0.018213966 | 0.018771069 | 0.017656864 | 0.018179805 | 0.018741282 | 0.017618328 |
| 0.018213306 | 0.018770495 | 0.017656126 | 0.018179173 | 0.018740723 | 0.017617624 |
| 0.018212647 | 0.01876945 | 0.017655365 | 0.018178542 | 0.018740169 | 0.017616914 |
| 0.018211991 | 0.018769345 | 0.017654637 | 0.018177914 | 0.018739616 | 0.017616211 |
| 0.018211342 | 0.018768785 | 0.017653899 | 0.018177281 | 0.018739064 | 0.017615499 |
| 0.018210661 | 0.018768225 | 0.017653137 | 0.018176652 | 0.01873851 | 0.017614795 |
| 0.018210028 | 0.01876765 | 0.017652406 | 0.018176022 | 0.018737959 | 0.017614086 |
| 0.018209375 | 0.018767083 | 0.017651667 | 0.018175393 | 0.018737409 | 0.017613376 |
| 0.018208715 | 0.018766505 | 0.017650925 | 0.018174762 | 0.018736853 | 0.017612671 |
| 0.018208072 | 0.018765948 | 0.017650195 | 0.018174129 | 0.018736287 | 0.01761197 |
| 0.018207413 | 0.018765369 | 0.017649457 | 0.018173505 | 0.018735756 | 0.017611253 |
| 0.0182076 | 0.018764806 | 0.017648714 | 0.018172894 | 0.0187352 | 0.017610568 |
| 0.018206107 | 0.01876424 | 0.017647974 | 0.018172254 | 0.018734647 | 0.01760986 |
| 0.018205465 | 0.018763688 | 0.017647242 | 0.018171631 | 0.01873411 | 0.017609153 |
| 0.018204804 | 0.018763102 | 0.017646506 | 0.018171005 | 0.018733555 | 0.017608455 |
| 0.018204151 | 0.018762541 | 0.017645762 | 0.018170363 | 0.018733009 | 0.017607757 |

Average MSE with Standard Deviation Boundaries for 3 Runs

| All Runs | Training Minimum | Training Standard Deviation |
|---|---|---|
| Average of Minimum MSEs | 0.018158581 | 0.000564007 |
| Average of Final MSEs | 0.018158581 | 0.000564007 |

| Best Network | Training |
|---|---|
| Run # | 3 |
| Epoch # | 1500 |
| Minimum MSE | 0.017515142 |
| Final MSE | 0.017515142 |

FIG. 14

| Run #1 | Run #2 | Run #3 | Average | Standard Deviation | Average + Standard Deviation | Average - Standard Deviation |
|---|---|---|---|---|---|---|
| 0.03786768 | 0.490225583 | 0.074422181 | 0.200838481 | 0.25128217 | 0.452120651 | -0.050443369 |
| 0.037377385 | 0.037370481 | 0.049528513 | 0.041425453 | 0.007017457 | 0.04844291 | 0.034407996 |
| 0.03662001 | 0.046541877 | 0.038098462 | 0.040420116 | 0.005352889 | 0.045773005 | 0.035067227 |
| 0.035775755 | 0.04959077 | 0.037803013 | 0.041056513 | 0.007460068 | 0.04851658 | 0.033596445 |
| 0.034962431 | 0.049341138 | 0.03882556 | 0.041043043 | 0.00744142 | 0.048484463 | 0.033601623 |
| 0.03424187 | 0.047761593 | 0.038770411 | 0.040257958 | 0.00688152 | 0.047139479 | 0.033376438 |
| 0.033635959 | 0.045602299 | 0.037603837 | 0.038947365 | 0.006095254 | 0.045042619 | 0.032852111 |
| 0.033142719 | 0.043282766 | 0.035652388 | 0.037359291 | 0.005281124 | 0.042640415 | 0.032078167 |
| 0.032748498 | 0.04106946 | 0.033305313 | 0.035714424 | 0.004663236 | 0.04037766 | 0.031051188 |
| 0.032435603 | 0.03921438 | 0.031014029 | 0.034221337 | 0.004382131 | 0.038603469 | 0.029839206 |
| 0.032186553 | 0.03776012 | 0.02925219 | 0.033066288 | 0.004321651 | 0.037387939 | 0.028744637 |
| 0.031966084 | 0.036744893 | 0.028301625 | 0.0323442 | 0.004233011 | 0.036577211 | 0.0281119 |
| 0.031821512 | 0.036117919 | 0.027950101 | 0.031963177 | 0.004085751 | 0.036048929 | 0.027877426 |
| 0.031682752 | 0.035784569 | 0.027607987 | 0.031691769 | 0.004088298 | 0.035780068 | 0.027603471 |
| 0.031562179 | 0.035636481 | 0.026984593 | 0.031394418 | 0.004328383 | 0.035722801 | 0.027066035 |
| 0.031453911 | 0.035578214 | 0.026305467 | 0.031112531 | 0.00464579 | 0.03575832 | 0.026466741 |
| 0.031353708 | 0.035543106 | 0.025805797 | 0.030900871 | 0.004884424 | 0.035785294 | 0.026016447 |
| 0.031258386 | 0.035496335 | 0.025476832 | 0.030743851 | 0.00502953 | 0.035773381 | 0.025714321 |
| 0.0311657 | 0.035428092 | 0.025214387 | 0.030602726 | 0.005130073 | 0.035732799 | 0.025472654 |
| 0.031074028 | 0.035342932 | 0.024958383 | 0.030458448 | 0.005219571 | 0.035678018 | 0.025238877 |
| 0.030982239 | 0.035250373 | 0.024710065 | 0.030314226 | 0.005301812 | 0.035616037 | 0.025012414 |
| 0.030889578 | 0.035158686 | 0.024492579 | 0.030180281 | 0.005368314 | 0.035548595 | 0.024811967 |
| 0.030795494 | 0.035072722 | 0.024313907 | 0.030060674 | 0.005416967 | 0.035477641 | 0.024643708 |
| 0.030699756 | 0.034993924 | 0.02416 | 0.029951227 | 0.005455612 | 0.035406839 | 0.024495615 |
| 0.030602118 | 0.034921452 | 0.024014741 | 0.029846104 | 0.005492518 | 0.035338622 | 0.024353586 |
| 0.030502537 | 0.034853511 | 0.023873979 | 0.029743342 | 0.005528997 | 0.03527234 | 0.024214345 |
| 0.030400958 | 0.034788176 | 0.023742203 | 0.029643779 | 0.005561778 | 0.035205557 | 0.024082001 |
| 0.03029746 | 0.034724023 | 0.023621811 | 0.029547765 | 0.005588946 | 0.03513671 | 0.023958819 |
| 0.030192154 | 0.034659997 | 0.02351049 | 0.029454213 | 0.005611265 | 0.035065478 | 0.023842948 |
| 0.030085124 | 0.034595639 | 0.023404952 | 0.029361905 | 0.005630289 | 0.034992194 | 0.023731616 |
| 0.02997651 | 0.034530722 | 0.023303963 | 0.029270398 | 0.005646589 | 0.034916987 | 0.023623809 |
| 0.029865492 | 0.034465145 | 0.023207869 | 0.029179336 | 0.005659964 | 0.034839799 | 0.023519372 |
| 0.029755145 | 0.034398917 | 0.023116944 | 0.029090336 | 0.005670292 | 0.034760627 | 0.023420044 |
| 0.029642709 | 0.034332 | 0.023030667 | 0.029001792 | 0.005677862 | 0.034679653 | 0.02332393 |
| 0.029529251 | 0.034264274 | 0.022948243 | 0.028913923 | 0.005683055 | 0.034596977 | 0.023230868 |
| 0.029414972 | 0.034195673 | 0.022869255 | 0.028826633 | 0.005686083 | 0.034512716 | 0.023140551 |
| 0.029300001 | 0.03412604 | 0.02279361 | 0.028739683 | 0.005687141 | 0.034426824 | 0.023052943 |
| 0.029184422 | 0.034055162 | 0.022721265 | 0.028653616 | 0.005685563 | 0.034339179 | 0.022968053 |
| 0.029068412 | 0.033982918 | 0.022651963 | 0.028567764 | 0.005682044 | 0.034249808 | 0.022885721 |
| 0.028952068 | 0.033909198 | 0.022585467 | 0.028482244 | 0.005676467 | 0.034158711 | 0.022805777 |
| 0.028835513 | 0.033833757 | 0.022521611 | 0.0283969 | 0.00566881 | 0.03406577 | 0.02272815 |
| 0.02871882 | 0.033756517 | 0.022460284 | 0.028311873 | 0.005659101 | 0.033970975 | 0.022652772 |
| 0.028602093 | 0.033677336 | 0.022401342 | 0.028226924 | 0.005647351 | 0.033874275 | 0.022579573 |
| 0.028485488 | 0.033596102 | 0.022344708 | 0.0281421 | 0.005633551 | 0.033775651 | 0.022508548 |
| 0.028369013 | 0.033512741 | 0.022290239 | 0.028057331 | 0.00561774 | 0.033675071 | 0.022439592 |
| 0.028252834 | 0.033427134 | 0.022237817 | 0.027972595 | 0.00559992 | 0.033572515 | 0.022372675 |
| 0.028137013 | 0.033339232 | 0.022187345 | 0.027887863 | 0.005580117 | 0.03346798 | 0.022307746 |
| 0.028021652 | 0.033248968 | 0.022138758 | 0.027803126 | 0.005558328 | 0.033361454 | 0.022244798 |
| 0.027906885 | 0.033156361 | 0.02209192 | 0.027718389 | 0.005534629 | 0.033253018 | 0.02218376 |
| 0.02779275 | 0.033061355 | 0.022046817 | 0.027633641 | 0.005508992 | 0.033142633 | 0.022124648 |

FIG. 14 (continued)

| | | | | | | |
|---|---|---|---|---|---|---|
| 0.02767936 | 0.032954025 | 0.022003306 | 0.027548897 | 0.005481524 | 0.033030421 | 0.022067373 |
| 0.027566807 | 0.03286444 | 0.021961344 | 0.027464197 | 0.005452272 | 0.032916469 | 0.022011925 |
| 0.027455216 | 0.032762639 | 0.021920877 | 0.027379577 | 0.005421277 | 0.032800854 | 0.0219583 |
| 0.027344596 | 0.032658808 | 0.021881785 | 0.027295063 | 0.005388682 | 0.032683745 | 0.021906381 |
| 0.027235031 | 0.032553114 | 0.021844069 | 0.027210738 | 0.005354564 | 0.032565302 | 0.021856174 |
| 0.027126616 | 0.032445695 | 0.021807615 | 0.027126642 | 0.00531904 | 0.032445682 | 0.021807602 |
| 0.027019387 | 0.032336827 | 0.02177242 | 0.027042878 | 0.005282243 | 0.032325121 | 0.021760635 |
| 0.026913427 | 0.032226671 | 0.02173836 | 0.026959486 | 0.005244307 | 0.032203793 | 0.021715179 |
| 0.026806737 | 0.032115519 | 0.02170543 | 0.026876562 | 0.005205376 | 0.032081938 | 0.021671186 |
| 0.026705394 | 0.032003667 | 0.021673581 | 0.026794214 | 0.005165816 | 0.03195983 | 0.021628598 |
| 0.026603432 | 0.031891353 | 0.021642741 | 0.026712509 | 0.005125177 | 0.031837686 | 0.021587332 |
| 0.026502868 | 0.031778798 | 0.021612879 | 0.026631515 | 0.00508418 | 0.031715695 | 0.021547335 |
| 0.026403759 | 0.031666346 | 0.021583952 | 0.026551352 | 0.005042817 | 0.031594169 | 0.021508535 |
| 0.026306087 | 0.031554203 | 0.021555921 | 0.026472071 | 0.005001207 | 0.031473278 | 0.021470863 |
| 0.026209854 | 0.031442579 | 0.021528739 | 0.026393724 | 0.004959477 | 0.031353201 | 0.021434247 |
| 0.026115092 | 0.031331692 | 0.021502376 | 0.026316386 | 0.004917749 | 0.031234135 | 0.021398637 |
| 0.026021818 | 0.031221736 | 0.021476792 | 0.026240115 | 0.004876138 | 0.031116254 | 0.021363977 |
| 0.025930041 | 0.031112835 | 0.021451961 | 0.026164946 | 0.004834719 | 0.030999664 | 0.021330227 |
| 0.025839742 | 0.031005152 | 0.02142782 | 0.026090904 | 0.004793603 | 0.030884508 | 0.021297301 |
| 0.025750903 | 0.030898735 | 0.021404369 | 0.026018002 | 0.004752815 | 0.030770818 | 0.021265167 |
| 0.025663568 | 0.030793713 | 0.021381576 | 0.025946286 | 0.004712434 | 0.030658719 | 0.021233852 |
| 0.025577844 | 0.030690081 | 0.021359442 | 0.025875722 | 0.004672456 | 0.030548179 | 0.021203266 |
| 0.025493193 | 0.030587876 | 0.021337852 | 0.025806307 | 0.004632955 | 0.030439262 | 0.021173353 |
| 0.025410159 | 0.030487111 | 0.021316858 | 0.025738042 | 0.004593911 | 0.030331953 | 0.021144132 |
| 0.025326517 | 0.030387757 | 0.021296427 | 0.0256709 | 0.004555326 | 0.030226226 | 0.021115575 |
| 0.025246287 | 0.030289751 | 0.0212765 | 0.025604846 | 0.004517192 | 0.030122038 | 0.021087654 |
| 0.025169378 | 0.030193081 | 0.021257099 | 0.025539853 | 0.004479496 | 0.030019349 | 0.021060357 |
| 0.025091849 | 0.030097663 | 0.021238169 | 0.025475894 | 0.004442216 | 0.029918109 | 0.021033678 |
| 0.025015628 | 0.030003453 | 0.021219715 | 0.025412932 | 0.004405326 | 0.029818258 | 0.021007606 |
| 0.024940714 | 0.029910332 | 0.021201693 | 0.025350913 | 0.004368787 | 0.029719699 | 0.020982126 |
| 0.024867065 | 0.029818259 | 0.021184115 | 0.025289813 | 0.004332568 | 0.029622382 | 0.020957245 |
| 0.024794629 | 0.029727167 | 0.021166943 | 0.025229579 | 0.004296655 | 0.029526234 | 0.020932925 |
| 0.024723427 | 0.029636927 | 0.021150175 | 0.025170177 | 0.004260977 | 0.029431154 | 0.020909199 |
| 0.024653438 | 0.029547524 | 0.021133773 | 0.025111578 | 0.004225544 | 0.029337122 | 0.020886035 |
| 0.024584575 | 0.029458854 | 0.021117736 | 0.025053722 | 0.004190303 | 0.029244025 | 0.020863419 |
| 0.024516895 | 0.029370826 | 0.021102056 | 0.024996592 | 0.004155204 | 0.029151796 | 0.020841388 |
| 0.024450304 | 0.029283389 | 0.0210867 | 0.024940131 | 0.00412024 | 0.029060371 | 0.020819891 |
| 0.024384806 | 0.029196505 | 0.021071697 | 0.024884336 | 0.004085373 | 0.028969709 | 0.020798963 |
| 0.02432039 | 0.029110068 | 0.021056985 | 0.024829148 | 0.004050576 | 0.028879724 | 0.020778572 |
| 0.024257025 | 0.029024038 | 0.021042582 | 0.024774548 | 0.004015817 | 0.028790365 | 0.020758731 |
| 0.024194669 | 0.028938401 | 0.021028465 | 0.024720512 | 0.0039811 | 0.028701612 | 0.020739412 |
| 0.024133308 | 0.02885307 | 0.021014631 | 0.024667003 | 0.003946379 | 0.028613382 | 0.020720624 |
| 0.024072943 | 0.028768012 | 0.021001065 | 0.024614007 | 0.00391164 | 0.028525647 | 0.020702367 |
| 0.024013527 | 0.028683225 | 0.020987729 | 0.024561493 | 0.003876902 | 0.028438395 | 0.020684592 |
| 0.023955056 | 0.028598664 | 0.020974671 | 0.024509464 | 0.003842114 | 0.028351578 | 0.02066735 |
| 0.023897503 | 0.028514283 | 0.020961851 | 0.024457879 | 0.003807272 | 0.028265151 | 0.020650606 |
| 0.023840863 | 0.028430078 | 0.020949258 | 0.024406733 | 0.003772377 | 0.02817911 | 0.020634356 |
| 0.023785092 | 0.028346011 | 0.020936891 | 0.024355998 | 0.003737408 | 0.028093406 | 0.020618591 |
| 0.023730196 | 0.028262094 | 0.020924732 | 0.024305674 | 0.003702378 | 0.028008052 | 0.020603296 |
| 0.023676161 | 0.028178271 | 0.020912791 | 0.024255741 | 0.003667252 | 0.027922993 | 0.020588489 |
| 0.023622943 | 0.028094551 | 0.020901039 | 0.024206178 | 0.003632048 | 0.027838226 | 0.02057413 |
| 0.023570592 | 0.028010912 | 0.020889472 | 0.024156992 | 0.003596752 | 0.027753744 | 0.02056024 |
| 0.023519034 | 0.027927421 | 0.020878106 | 0.024108187 | 0.003561395 | 0.027669582 | 0.020546792 |

FIG. 14 (continued)

| | | | | | | |
|---|---|---|---|---|---|---|
| 0.023468276 | 0.027843995 | 0.020866919 | 0.02405973 | 0.003525941 | 0.027585671 | 0.020533789 |
| 0.0234183 | 0.027760662 | 0.020855902 | 0.024011621 | 0.003490409 | 0.02750203 | 0.020521213 |
| 0.023369104 | 0.027677385 | 0.020845048 | 0.023963846 | 0.003454779 | 0.027418624 | 0.020509067 |
| 0.023320656 | 0.02759422 | 0.020834357 | 0.023916411 | 0.003419083 | 0.027335494 | 0.020497328 |
| 0.023272982 | 0.027511112 | 0.020823825 | 0.023869306 | 0.003383291 | 0.027252597 | 0.020486016 |
| 0.023226051 | 0.02742812 | 0.020813435 | 0.023822535 | 0.003347441 | 0.027169976 | 0.020475095 |
| 0.023179857 | 0.027345203 | 0.020803189 | 0.023776063 | 0.00331151 | 0.027087593 | 0.020464573 |
| 0.023134375 | 0.027262395 | 0.020793084 | 0.023729951 | 0.00327552 | 0.027005471 | 0.020454432 |
| 0.023089634 | 0.027179638 | 0.020783121 | 0.023684131 | 0.003239433 | 0.026923564 | 0.020444698 |
| 0.023045585 | 0.027097046 | 0.020773299 | 0.023636643 | 0.003203316 | 0.026841959 | 0.020435327 |
| 0.023002218 | 0.027014516 | 0.020763569 | 0.023593434 | 0.003167134 | 0.026760569 | 0.0204263 |
| 0.022959597 | 0.026932131 | 0.020753965 | 0.023548565 | 0.00313091 | 0.026679475 | 0.020417655 |
| 0.022917619 | 0.026949857 | 0.020744508 | 0.023503995 | 0.003094624 | 0.026598618 | 0.020409371 |
| 0.022876336 | 0.026767736 | 0.020735137 | 0.023459733 | 0.003058322 | 0.026518056 | 0.020401411 |
| 0.022835711 | 0.026685728 | 0.020725869 | 0.023415769 | 0.003021975 | 0.026437744 | 0.020393794 |
| 0.022795735 | 0.026603879 | 0.020716725 | 0.023372113 | 0.0029856 | 0.026357713 | 0.020386513 |
| 0.022756426 | 0.026522214 | 0.020707671 | 0.02332877 | 0.002949222 | 0.026277992 | 0.020379548 |
| 0.022717789 | 0.026440661 | 0.020698717 | 0.023285722 | 0.002912798 | 0.026198521 | 0.020372924 |
| 0.022679762 | 0.026359333 | 0.020689866 | 0.023242993 | 0.00267639 | 0.026119383 | 0.020366603 |
| 0.022642391 | 0.026278196 | 0.020681098 | 0.023200562 | 0.00263999 | 0.02604055 | 0.020360572 |
| 0.022605656 | 0.026197257 | 0.020672403 | 0.023158439 | 0.002803601 | 0.025962039 | 0.020354838 |
| 0.022569537 | 0.026116543 | 0.020663807 | 0.023116629 | 0.00276723 | 0.025883858 | 0.020349399 |
| 0.02253402 | 0.026036041 | 0.020655291 | 0.023075117 | 0.00273088 | 0.025805998 | 0.020344237 |
| 0.022499124 | 0.025955794 | 0.020646853 | 0.023033924 | 0.002694573 | 0.025728496 | 0.020339351 |
| 0.022464825 | 0.025875812 | 0.020638492 | 0.022993043 | 0.002658316 | 0.025651359 | 0.020334727 |
| 0.02243112 | 0.025796121 | 0.020630198 | 0.02295248 | 0.002622128 | 0.025574607 | 0.020330352 |
| 0.022397999 | 0.025716716 | 0.020621985 | 0.022912233 | 0.002586001 | 0.025498234 | 0.020326233 |
| 0.022365468 | 0.025637642 | 0.020613817 | 0.022872309 | 0.002549974 | 0.025422283 | 0.020322335 |
| 0.022333506 | 0.025558902 | 0.020605752 | 0.02283272 | 0.002514027 | 0.025346748 | 0.020318693 |
| 0.022302108 | 0.025480518 | 0.020597722 | 0.022793449 | 0.002478202 | 0.025271652 | 0.020315247 |
| 0.022271274 | 0.025402537 | 0.020589765 | 0.022754525 | 0.002442507 | 0.025197032 | 0.020312018 |
| 0.022240994 | 0.025324939 | 0.020581853 | 0.022715929 | 0.002406946 | 0.025122875 | 0.020308963 |
| 0.022221244 | 0.025247792 | 0.020574005 | 0.02267768 | 0.002371548 | 0.025049229 | 0.020306132 |
| 0.022182057 | 0.025171097 | 0.020566201 | 0.022639785 | 0.002336323 | 0.024976106 | 0.020303462 |
| 0.0221534 | 0.0250949 | 0.020558462 | 0.022602254 | 0.002301287 | 0.024903541 | 0.020300967 |
| 0.022125242 | 0.025019202 | 0.020550774 | 0.022565073 | 0.002266451 | 0.024831524 | 0.020298622 |
| 0.022097621 | 0.024944032 | 0.020543125 | 0.022528259 | 0.002231834 | 0.024760093 | 0.020296425 |
| 0.022070508 | 0.02486944 | 0.020535529 | 0.022491826 | 0.00219746 | 0.024689285 | 0.020294366 |
| 0.022043889 | 0.024795467 | 0.02052797 | 0.022455775 | 0.002163359 | 0.024619134 | 0.020292417 |
| 0.022017743 | 0.024722103 | 0.020520475 | 0.022420107 | 0.002129517 | 0.024549624 | 0.02029059 |
| 0.021992119 | 0.02464941 | 0.020513009 | 0.022384846 | 0.002095979 | 0.024480825 | 0.020288867 |
| 0.02196697 | 0.02457739 | 0.020505579 | 0.02234998 | 0.002062749 | 0.024412579 | 0.020287231 |
| 0.021942273 | 0.024506086 | 0.020498212 | 0.022315524 | 0.0020298 | 0.024345364 | 0.020285684 |
| 0.02191806 | 0.024435522 | 0.020490857 | 0.02228148 | 0.001997286 | 0.024278766 | 0.020284194 |
| 0.021894284 | 0.024365727 | 0.020483544 | 0.022247852 | 0.001965094 | 0.024212945 | 0.020282758 |
| 0.021870976 | 0.024296701 | 0.02047626 | 0.022214652 | 0.001933259 | 0.024147911 | 0.020281394 |
| 0.021848073 | 0.0242285 | 0.020469029 | 0.022181867 | 0.001901834 | 0.024083701 | 0.020280034 |
| 0.021825634 | 0.024161134 | 0.020461818 | 0.022149529 | 0.001870806 | 0.024020335 | 0.020278723 |
| 0.021803627 | 0.024094613 | 0.020454641 | 0.022117627 | 0.001840189 | 0.023957816 | 0.020277438 |
| 0.021782031 | 0.024028936 | 0.020447506 | 0.022086158 | 0.001809981 | 0.023696139 | 0.020276177 |
| 0.021760827 | 0.023964157 | 0.0204404 | 0.022055128 | 0.001780218 | 0.023835346 | 0.02027491 |
| 0.021740044 | 0.023900265 | 0.020433305 | 0.022024538 | 0.001750901 | 0.023775439 | 0.020273636 |
| 0.021719638 | 0.023837261 | 0.020426253 | 0.021994384 | 0.001722021 | 0.023716405 | 0.020272363 |

FIG. 14 (continued)

| | | | | | | |
|---|---|---|---|---|---|---|
| 0.021699617 | 0.023775155 | 0.02041921 | 0.021964661 | 0.001693599 | 0.023658259 | 0.020271062 |
| 0.021679997 | 0.023713918 | 0.020412197 | 0.021935371 | 0.001665609 | 0.02360098 | 0.020269762 |
| 0.02166074 | 0.0236536 | 0.020405225 | 0.021906522 | 0.001638076 | 0.023544597 | 0.020268446 |
| 0.021641856 | 0.023594156 | 0.020398268 | 0.021878093 | 0.001610967 | 0.023489081 | 0.020267106 |
| 0.021623338 | 0.023535604 | 0.020391338 | 0.021850093 | 0.00158435 | 0.023434443 | 0.020265743 |
| 0.021605164 | 0.023477923 | 0.020384427 | 0.021822505 | 0.001558158 | 0.023380663 | 0.020264346 |
| 0.021587335 | 0.023421101 | 0.020377528 | 0.021795321 | 0.001532409 | 0.023327731 | 0.020262912 |
| 0.021569829 | 0.023365116 | 0.020370672 | 0.021768539 | 0.001507079 | 0.023275618 | 0.02026146 |
| 0.021552674 | 0.023309952 | 0.02036381 | 0.021742145 | 0.001482162 | 0.023224327 | 0.020259963 |
| 0.021535844 | 0.023255622 | 0.020357009 | 0.021716158 | 0.001457695 | 0.023173853 | 0.020258463 |
| 0.021519313 | 0.02320208 | 0.020350188 | 0.021690527 | 0.001433635 | 0.023124162 | 0.020256892 |
| 0.021503102 | 0.023149285 | 0.020343382 | 0.021665256 | 0.001409962 | 0.023075219 | 0.020255294 |
| 0.021487195 | 0.023097258 | 0.020336619 | 0.021640357 | 0.001386678 | 0.023027035 | 0.020253679 |
| 0.02147159 | 0.023045979 | 0.020329883 | 0.021615818 | 0.00136378 | 0.022979597 | 0.020252038 |
| 0.021456281 | 0.022995437 | 0.020323142 | 0.02159162 | 0.001341278 | 0.022932898 | 0.020250342 |
| 0.021441249 | 0.022945562 | 0.020316431 | 0.021567748 | 0.001319122 | 0.02288687 | 0.020248625 |
| 0.021426484 | 0.022896376 | 0.020309733 | 0.021544198 | 0.001297333 | 0.02284153 | 0.020246865 |
| 0.021412019 | 0.022847882 | 0.020303035 | 0.021520978 | 0.001275917 | 0.022796896 | 0.020245061 |
| 0.021397807 | 0.022799991 | 0.020296371 | 0.021498056 | 0.001254817 | 0.022752873 | 0.020243239 |
| 0.021383841 | 0.022752789 | 0.020289719 | 0.021475449 | 0.001234087 | 0.022709536 | 0.020241362 |
| 0.021370163 | 0.022706175 | 0.020283077 | 0.021453138 | 0.001213678 | 0.022666817 | 0.02023946 |
| 0.021356711 | 0.022660162 | 0.02027645 | 0.021431108 | 0.001193597 | 0.022624704 | 0.020237511 |
| 0.021343514 | 0.022614773 | 0.020269847 | 0.021409378 | 0.00117385 | 0.022583228 | 0.020235528 |
| 0.021330543 | 0.022569947 | 0.020263264 | 0.021387918 | 0.001154411 | 0.022542329 | 0.020233507 |
| 0.02131781 | 0.022525692 | 0.020256674 | 0.021366725 | 0.0011353 | 0.022502025 | 0.020231426 |
| 0.021305313 | 0.022482026 | 0.02025011 | 0.021345817 | 0.001116509 | 0.022462326 | 0.020229307 |
| 0.021293037 | 0.02243868 | 0.020243563 | 0.02132516 | 0.001098011 | 0.022423171 | 0.020227149 |
| 0.02128097 | 0.022396304 | 0.020237025 | 0.021304766 | 0.001079836 | 0.022384602 | 0.02022493 |
| 0.021269133 | 0.022354264 | 0.020230485 | 0.021284627 | 0.001061974 | 0.022346602 | 0.020222653 |
| 0.021257479 | 0.022312747 | 0.020223975 | 0.021264734 | 0.001044405 | 0.022309139 | 0.020220329 |
| 0.021246051 | 0.022271758 | 0.020217489 | 0.0212451 | 0.001027135 | 0.022272234 | 0.020217965 |
| 0.021234799 | 0.022231301 | 0.020210996 | 0.021225699 | 0.001010183 | 0.022235882 | 0.020215516 |
| 0.021223754 | 0.022191327 | 0.020204535 | 0.021206539 | 0.000993508 | 0.022200047 | 0.02021303 |
| 0.021212898 | 0.022151904 | 0.020198053 | 0.021187618 | 0.000977171 | 0.022164789 | 0.020210447 |
| 0.02120221 | 0.022112932 | 0.020191621 | 0.021168921 | 0.000961046 | 0.022130009 | 0.020207833 |
| 0.02119172 | 0.022074493 | 0.020185167 | 0.02115046 | 0.000945338 | 0.022095798 | 0.020205121 |
| 0.021181399 | 0.022036536 | 0.02017875 | 0.021132228 | 0.000929868 | 0.022062097 | 0.02020236 |
| 0.021171255 | 0.021999085 | 0.020172335 | 0.021114225 | 0.000914709 | 0.022028935 | 0.020199516 |
| 0.021161269 | 0.02196211 | 0.020165937 | 0.021096439 | 0.00089984 | 0.021996279 | 0.020196599 |
| 0.021151463 | 0.021925611 | 0.020159559 | 0.021076878 | 0.000885261 | 0.021964138 | 0.020193617 |
| 0.021141801 | 0.021889608 | 0.020153189 | 0.021061526 | 0.000870999 | 0.021932525 | 0.020190527 |
| 0.0211323 | 0.021854063 | 0.020146815 | 0.021044393 | 0.000857012 | 0.021901405 | 0.020187361 |
| 0.021122957 | 0.021818994 | 0.020140452 | 0.021027468 | 0.000843335 | 0.021870802 | 0.020184133 |
| 0.021113757 | 0.021784404 | 0.020134119 | 0.02101076 | 0.000829995 | 0.021840711 | 0.020180811 |
| 0.021104693 | 0.021750275 | 0.020127807 | 0.020994258 | 0.000816852 | 0.021811111 | 0.020177406 |
| 0.021095796 | 0.021716615 | 0.020121485 | 0.020977952 | 0.000804066 | 0.021782028 | 0.020173896 |
| 0.021087004 | 0.021683414 | 0.020115174 | 0.020961864 | 0.000791573 | 0.021753437 | 0.02017029 |
| 0.021078359 | 0.02165067 | 0.020108869 | 0.020945966 | 0.00077938 | 0.021725346 | 0.020166586 |
| 0.021069854 | 0.021618374 | 0.0201026 | 0.020930278 | 0.000767466 | 0.021697742 | 0.02016281 |
| 0.021061484 | 0.021586535 | 0.020096321 | 0.02091478 | 0.000755861 | 0.021670641 | 0.020158919 |
| 0.02105321 | 0.021555139 | 0.020090079 | 0.020899476 | 0.000744531 | 0.021644006 | 0.020154945 |
| 0.02104507 | 0.02152418 | 0.020083837 | 0.020884362 | 0.000733496 | 0.021617859 | 0.020150866 |
| 0.021037046 | 0.021493677 | 0.020077609 | 0.020869444 | 0.000722759 | 0.021592203 | 0.020146685 |

| | | | | | | |
|---|---|---|---|---|---|---|
| 0.020205392 | 0.019520482 | 0.019087428 | 0.019604434 | 0.00056369 | 0.020168124 | 0.019040744 |
| 0.020202735 | 0.019517712 | 0.019084193 | 0.019601547 | 0.000563964 | 0.020165511 | 0.019037583 |
| 0.020200089 | 0.019514933 | 0.019080944 | 0.019598655 | 0.00056425 | 0.020162905 | 0.019034405 |
| 0.020197464 | 0.019512177 | 0.019077724 | 0.019595788 | 0.000564533 | 0.020160321 | 0.019031255 |
| 0.020194823 | 0.019509418 | 0.019074496 | 0.019592912 | 0.000564811 | 0.020157723 | 0.019028101 |
| 0.020192198 | 0.019506684 | 0.019071281 | 0.019590054 | 0.00056509 | 0.020155145 | 0.019024964 |
| 0.020189563 | 0.019503932 | 0.019068073 | 0.01958719 | 0.000565361 | 0.020152551 | 0.019021828 |
| 0.020186944 | 0.019501226 | 0.019064888 | 0.019584353 | 0.000565628 | 0.02014998 | 0.019018725 |
| 0.020184327 | 0.019498531 | 0.019061685 | 0.019581514 | 0.000565903 | 0.020147417 | 0.019015611 |
| 0.020181702 | 0.019495817 | 0.019058514 | 0.019578678 | 0.00056616 | 0.020144836 | 0.019012518 |
| 0.020179078 | 0.01949312 | 0.01905535 | 0.019575849 | 0.000566414 | 0.020142263 | 0.019009436 |
| 0.020176478 | 0.019490436 | 0.01905218 | 0.019573031 | 0.000566682 | 0.020139713 | 0.019006349 |
| 0.020173879 | 0.01948777 | 0.019049034 | 0.019570228 | 0.000566938 | 0.020137166 | 0.019003269 |
| 0.02017126 | 0.019485096 | 0.019045889 | 0.019567415 | 0.000567184 | 0.020134599 | 0.019000231 |
| 0.020168656 | 0.01948243 | 0.019042755 | 0.019564614 | 0.000567432 | 0.020132046 | 0.018997181 |
| 0.020166066 | 0.019479804 | 0.019039616 | 0.019561828 | 0.000567687 | 0.020129515 | 0.018994142 |
| 0.020163452 | 0.019477164 | 0.019036511 | 0.019559043 | 0.000567915 | 0.020126957 | 0.018991128 |
| 0.020160856 | 0.01947454 | 0.019033393 | 0.019556263 | 0.000568157 | 0.02012442 | 0.018988106 |
| 0.020158278 | 0.019471906 | 0.019030297 | 0.019553494 | 0.000568399 | 0.020121893 | 0.018985095 |
| 0.020155683 | 0.019469317 | 0.01902719 | 0.01955073 | 0.000568634 | 0.020119365 | 0.018982096 |
| 0.020153092 | 0.019466707 | 0.019024117 | 0.019547972 | 0.000568858 | 0.02011683 | 0.018979114 |
| 0.020150507 | 0.019464102 | 0.019021027 | 0.019545212 | 0.000569092 | 0.020114304 | 0.01897612 |
| 0.020147925 | 0.019461527 | 0.019017955 | 0.019542469 | 0.000569317 | 0.020111786 | 0.018973152 |
| 0.020145357 | 0.019458951 | 0.019014891 | 0.019539733 | 0.000569546 | 0.020109279 | 0.018970187 |
| 0.020142775 | 0.019456396 | 0.019011842 | 0.019537004 | 0.000569759 | 0.020106764 | 0.018967245 |
| 0.020140197 | 0.019453831 | 0.019008804 | 0.019534277 | 0.00056997 | 0.020104248 | 0.018964307 |
| 0.020137619 | 0.019451274 | 0.019005753 | 0.019531549 | 0.000570187 | 0.020101736 | 0.018961362 |
| 0.02013506 | 0.01944874 | 0.019002723 | 0.019528841 | 0.000570403 | 0.020099244 | 0.018958438 |
| 0.020132465 | 0.019446218 | 0.018999701 | 0.019526128 | 0.000570594 | 0.020096723 | 0.018955534 |
| 0.020129902 | 0.019443689 | 0.018996676 | 0.019523423 | 0.000570805 | 0.020094228 | 0.018952618 |
| 0.020127345 | 0.019441174 | 0.018993692 | 0.019520737 | 0.000570999 | 0.020091736 | 0.018949738 |
| 0.020124791 | 0.019438669 | 0.018990671 | 0.019518044 | 0.000571211 | 0.020089255 | 0.018946833 |
| 0.020122226 | 0.019436164 | 0.018987691 | 0.01951536 | 0.000571399 | 0.020086759 | 0.018943962 |
| 0.020119665 | 0.019433879 | 0.018984705 | 0.019512683 | 0.00057159 | 0.020084273 | 0.018941093 |
| 0.020117106 | 0.019431187 | 0.018981727 | 0.019510007 | 0.000571779 | 0.020081785 | 0.018938228 |
| 0.020114562 | 0.01942871 | 0.018978763 | 0.019507345 | 0.000571968 | 0.020079312 | 0.018935377 |
| 0.020112002 | 0.019426243 | 0.018975794 | 0.01950468 | 0.000572151 | 0.020076831 | 0.018932529 |
| 0.020109458 | 0.019423787 | 0.018972836 | 0.019502027 | 0.000572336 | 0.020074363 | 0.018929691 |
| 0.020106899 | 0.019421333 | 0.018969897 | 0.019499376 | 0.000572504 | 0.020071881 | 0.018926872 |
| 0.020104349 | 0.019418888 | 0.018966967 | 0.019496735 | 0.000572673 | 0.020069407 | 0.018924062 |
| 0.020101799 | 0.019416459 | 0.018964034 | 0.019494097 | 0.000572842 | 0.020066939 | 0.018921255 |
| 0.020099267 | 0.01941403 | 0.018961102 | 0.019491466 | 0.000573021 | 0.020064487 | 0.018918446 |
| 0.020096716 | 0.019411597 | 0.018958187 | 0.019488833 | 0.000573181 | 0.020062014 | 0.018915653 |
| 0.020094173 | 0.019409189 | 0.018955275 | 0.019486212 | 0.000573342 | 0.020059555 | 0.01891287 |
| 0.020091634 | 0.019406782 | 0.018952381 | 0.019483599 | 0.000573498 | 0.020057097 | 0.018910101 |
| 0.020089103 | 0.019404389 | 0.018949481 | 0.019480991 | 0.00057366 | 0.020054651 | 0.018907331 |
| 0.020086557 | 0.019401994 | 0.01894659 | 0.01947838 | 0.000573809 | 0.020052189 | 0.018904571 |
| 0.020084023 | 0.019399621 | 0.018943712 | 0.019475785 | 0.000573958 | 0.020049744 | 0.018901827 |
| 0.020081477 | 0.019397231 | 0.018940816 | 0.019473175 | 0.00057411 | 0.020047285 | 0.018899064 |
| 0.020078953 | 0.019394667 | 0.018937955 | 0.019470592 | 0.000574256 | 0.020044848 | 0.018896336 |
| 0.020076426 | 0.019392496 | 0.018935103 | 0.019468008 | 0.000574396 | 0.020042404 | 0.018893612 |
| 0.020073906 | 0.019390147 | 0.018932253 | 0.019465435 | 0.000574538 | 0.020039973 | 0.018890897 |
| 0.020071374 | 0.019387797 | 0.0189294 | 0.019462857 | 0.000574676 | 0.020037532 | 0.018888181 |

FIG. 14 (continued)

| | | | | | | |
|---|---|---|---|---|---|---|
| 0.020068841 | 0.019385451 | 0.018926563 | 0.019460285 | 0.000574804 | 0.020035089 | 0.018885481 |
| 0.020066306 | 0.019383116 | 0.018923728 | 0.019457716 | 0.000574931 | 0.020032647 | 0.018882786 |
| 0.020063784 | 0.019380799 | 0.018920897 | 0.01945516 | 0.000575061 | 0.020030221 | 0.018880099 |
| 0.020061282 | 0.019378485 | 0.018918084 | 0.019452617 | 0.000575193 | 0.020027811 | 0.018877424 |
| 0.020058751 | 0.019376187 | 0.018915268 | 0.019450068 | 0.000575311 | 0.020025379 | 0.018874758 |
| 0.020056223 | 0.019373858 | 0.018912466 | 0.019447516 | 0.000575425 | 0.020022941 | 0.018872091 |
| 0.020053709 | 0.019371575 | 0.018909665 | 0.019444983 | 0.000575544 | 0.020020527 | 0.018869439 |
| 0.020051185 | 0.019369284 | 0.018906865 | 0.019442445 | 0.000575657 | 0.020018102 | 0.018866787 |
| 0.020048672 | 0.019367 | 0.018904086 | 0.01943992 | 0.000575767 | 0.020015686 | 0.018864153 |
| 0.020046156 | 0.019364716 | 0.018901302 | 0.019437391 | 0.000575877 | 0.020013268 | 0.018861515 |
| 0.020043638 | 0.019362461 | 0.018898534 | 0.019434877 | 0.000575976 | 0.020010854 | 0.018858901 |
| 0.020041129 | 0.019360196 | 0.018895769 | 0.019432365 | 0.00057608 | 0.020008445 | 0.018856285 |
| 0.020038608 | 0.019357931 | 0.018893013 | 0.019429851 | 0.000576174 | 0.020006025 | 0.018853676 |
| 0.020036094 | 0.019355686 | 0.018890262 | 0.019427347 | 0.000576268 | 0.020003615 | 0.01885108 |
| 0.020033574 | 0.019353447 | 0.018887522 | 0.019424848 | 0.000576353 | 0.0200012 | 0.018848495 |
| 0.020031072 | 0.019351212 | 0.018884769 | 0.019422351 | 0.000576453 | 0.019998804 | 0.018845896 |
| 0.020028554 | 0.01934899 | 0.018882023 | 0.019419856 | 0.000576541 | 0.019996397 | 0.018843315 |
| 0.020026047 | 0.019346761 | 0.018879302 | 0.01941737 | 0.000576624 | 0.019993994 | 0.018840746 |
| 0.020023549 | 0.01934454 | 0.018876584 | 0.019414891 | 0.00057671 | 0.019991601 | 0.018838182 |
| 0.020021031 | 0.019342348 | 0.018873869 | 0.019412416 | 0.000576782 | 0.019989198 | 0.018835634 |
| 0.020018522 | 0.019340137 | 0.018871158 | 0.019409939 | 0.000576858 | 0.019986797 | 0.018833081 |
| 0.020016015 | 0.019337948 | 0.018868461 | 0.019407475 | 0.000576927 | 0.019984402 | 0.018830547 |
| 0.020013506 | 0.01933576 | 0.018865764 | 0.01940501 | 0.000576996 | 0.019982006 | 0.018828014 |
| 0.020011008 | 0.019333564 | 0.01886306 | 0.019402544 | 0.000577074 | 0.019979618 | 0.018825469 |
| 0.020008508 | 0.019331407 | 0.018860387 | 0.019400101 | 0.000577135 | 0.019977236 | 0.018822966 |
| 0.020005986 | 0.019329226 | 0.018857716 | 0.019397642 | 0.000577184 | 0.019974827 | 0.018820458 |
| 0.020003501 | 0.019327085 | 0.018855041 | 0.019395209 | 0.000577253 | 0.019972462 | 0.018817956 |
| 0.020000977 | 0.01932491 | 0.018852375 | 0.019392754 | 0.000577299 | 0.019970053 | 0.018815456 |
| 0.019998491 | 0.019322777 | 0.018849712 | 0.019390327 | 0.000577361 | 0.019967687 | 0.018812966 |
| 0.01999598 | 0.019320628 | 0.018847056 | 0.019387888 | 0.000577407 | 0.019965295 | 0.018810482 |
| 0.019993478 | 0.019318506 | 0.018844403 | 0.019385463 | 0.000577456 | 0.019962919 | 0.018808006 |
| 0.019990973 | 0.019316383 | 0.018841749 | 0.019383035 | 0.000577504 | 0.019960539 | 0.018805531 |
| 0.019988479 | 0.019314246 | 0.018839136 | 0.01938062 | 0.000577539 | 0.01995816 | 0.018803081 |
| 0.019985961 | 0.01931213 | 0.018836502 | 0.019378198 | 0.00057757 | 0.019955766 | 0.018800627 |
| 0.019983472 | 0.019310029 | 0.018833885 | 0.019375795 | 0.000577609 | 0.019953404 | 0.018798187 |
| 0.019980971 | 0.019307917 | 0.018831259 | 0.019373382 | 0.000577645 | 0.019951027 | 0.018795737 |
| 0.019978488 | 0.019305827 | 0.018828645 | 0.019370987 | 0.000577684 | 0.019948671 | 0.018793303 |
| 0.01997597 | 0.019303739 | 0.018826032 | 0.01936858 | 0.000577704 | 0.019946285 | 0.018790876 |
| 0.019973477 | 0.019301651 | 0.018823439 | 0.019366189 | 0.000577729 | 0.019943918 | 0.01878846 |
| 0.019970993 | 0.019299582 | 0.018820843 | 0.019363806 | 0.000577758 | 0.019941564 | 0.018786047 |
| 0.019968482 | 0.019297525 | 0.018818259 | 0.019361422 | 0.000577767 | 0.019939189 | 0.018783655 |
| 0.01996599 | 0.019295437 | 0.018815666 | 0.019359032 | 0.000577791 | 0.019936823 | 0.01878124 |
| 0.019963494 | 0.019293386 | 0.018813085 | 0.019356655 | 0.000577808 | 0.019934463 | 0.018778847 |
| 0.019960999 | 0.019291339 | 0.018810516 | 0.019354285 | 0.000577819 | 0.019932104 | 0.018776466 |
| 0.019958504 | 0.019289291 | 0.018807949 | 0.019351915 | 0.000577828 | 0.019929742 | 0.018774087 |
| 0.019956006 | 0.019287255 | 0.018805396 | 0.019349552 | 0.000577829 | 0.019927381 | 0.018771723 |
| 0.019953506 | 0.019285226 | 0.018802831 | 0.019347188 | 0.000577835 | 0.019925022 | 0.018769353 |
| 0.019951018 | 0.019283198 | 0.018800283 | 0.019344833 | 0.000577838 | 0.019922671 | 0.018766995 |
| 0.01994851 | 0.019281177 | 0.018797733 | 0.019342473 | 0.000577832 | 0.019920306 | 0.018764641 |
| 0.019946009 | 0.01927916 | 0.018795194 | 0.019340121 | 0.000577834 | 0.019917945 | 0.018762297 |
| 0.019943526 | 0.019277152 | 0.018792663 | 0.01933778 | 0.000577822 | 0.019915602 | 0.018759958 |
| 0.019941034 | 0.019275159 | 0.018790146 | 0.019335446 | 0.000577807 | 0.019913254 | 0.018757639 |
| 0.01993854 | 0.019273167 | 0.018787622 | 0.01933311 | 0.000577795 | 0.019910905 | 0.018755315 |

FIG. 14 (continued)

| | | | | | | |
|---|---|---|---|---|---|---|
|0.019936027|0.019271174|0.0187851|0.019330767|0.000577773|0.01990854|0.018752994|
|0.01993355|0.019269187|0.018782601|0.019328446|0.000577758|0.019906204|0.018750688|
|0.019931048|0.01926722|0.018780071|0.019326113|0.000577744|0.019903657|0.018748369|
|0.019928565|0.019265246|0.018777579|0.019323797|0.000577723|0.019901519|0.018746074|
|0.01992606|0.019263269|0.018775085|0.019321471|0.000577691|0.019899162|0.018743781|
|0.019923566|0.019261321|0.018772596|0.019319161|0.000577661|0.019896822|0.018741501|
|0.019921083|0.019259371|0.018770104|0.019316853|0.000577638|0.019894491|0.018739214|
|0.019918581|0.01925743|0.018767625|0.019314546|0.0005776|0.019892146|0.018736945|
|0.019916087|0.019255482|0.018765152|0.01931224|0.000577583|0.019889804|0.018734677|
|0.019913593|0.019253545|0.018762683|0.01930994|0.000577524|0.019887464|0.018732417|
|0.019911099|0.019251615|0.018760219|0.019307644|0.000577482|0.019885127|0.018730162|
|0.019908616|0.019249691|0.01875777|0.019305359|0.000577439|0.019882798|0.01872792|
|0.019906128|0.01924778|0.018755307|0.019303072|0.000577399|0.019880471|0.018725672|
|0.019903619|0.019245876|0.018752858|0.019300794|0.000577342|0.019878126|0.018723442|
|0.019901142|0.019243982|0.018750411|0.019298511|0.0005773|0.019875811|0.018721211|
|0.019898634|0.019242071|0.018747967|0.019296224|0.000577242|0.019873466|0.018718962|
|0.019896155|0.019240174|0.018745536|0.019293955|0.000577192|0.019871147|0.018716763|
|0.019893659|0.019238286|0.01874312|0.019291668|0.000577126|0.019868814|0.018714563|
|0.01989118|0.019236393|0.018740686|0.01928942|0.000577077|0.019866497|0.018712342|
|0.01988868|0.019234549|0.018738254|0.019287165|0.00057701|0.019864175|0.018710155|
|0.019886196|0.019232655|0.018735854|0.019284902|0.000576948|0.019861849|0.018707954|
|0.019883692|0.019230792|0.018733447|0.019282644|0.000576873|0.019859517|0.018705771|
|0.019881206|0.019228933|0.018731043|0.019280394|0.000576806|0.0198572|0.018703588|
|0.019878708|0.019227078|0.018728647|0.019278144|0.000576728|0.019854873|0.018701416|
|0.019876212|0.019225217|0.018726258|0.019275896|0.00057665|0.019852545|0.018699246|
|0.01987372|0.019223381|0.018723868|0.019273656|0.000576572|0.019850228|0.018697084|
|0.019871235|0.019221548|0.018721478|0.01927142|0.000576499|0.019847919|0.018694922|
|0.019868735|0.019219711|0.018719105|0.019269194|0.00057641|0.019845594|0.018692774|
|0.019866247|0.019217899|0.018716728|0.019266958|0.000576327|0.019843285|0.018690631|
|0.01986376|0.019216079|0.018714357|0.019264732|0.000576244|0.019840976|0.019688488|
|0.01986126|0.019214258|0.018711994|0.019262501|0.000576155|0.019838656|0.018686346|
|0.019858792|0.019212458|0.018709626|0.019260292|0.000576075|0.019836367|0.018684218|
|0.019856296|0.019210648|0.018707275|0.019258073|0.000575977|0.01983405|0.018682096|
|0.019853773|0.01920886|0.01870493|0.019255854|0.000575861|0.019831715|0.018679993|
|0.019851305|0.019207066|0.018702582|0.019253651|0.000575777|0.019829427|0.018677874|
|0.019848818|0.01920527|0.018700242|0.019251443|0.000575678|0.019827122|0.018675765|
|0.019846331|0.019203499|0.018697895|0.019249242|0.000575583|0.019824825|0.018673659|
|0.019843826|0.019201728|0.01869558|0.019247044|0.000575483|0.019822507|0.018671582|
|0.019841328|0.019199939|0.018693235|0.019244834|0.000575362|0.019820196|0.018669472|
|0.019838845|0.019198183|0.018690921|0.01924265|0.000575252|0.019817902|0.018667397|
|0.019836346|0.019196434|0.018688606|0.019240462|0.000575135|0.019815597|0.018665327|
|0.01983387|0.019194467|0.01868626|0.019238273|0.000575036|0.01981331|0.018663237|
|0.019831372|0.019192917|0.01868399|0.019236093|0.000574908|0.019811002|0.018661185|
|0.019828891|0.019191178|0.018681679|0.019233916|0.000574799|0.019808715|0.018659117|
|0.019826405|0.019189445|0.018679369|0.01923174|0.000574686|0.019806426|0.018657054|
|0.019823896|0.019187709|0.018677084|0.019229563|0.00057455|0.019804113|0.018655012|
|0.019821413|0.019185985|0.018674791|0.019227396|0.000574432|0.019801828|0.018652964|
|0.019818919|0.019184265|0.018672507|0.01922523|0.000574303|0.019799533|0.018650928|
|0.019816427|0.019182542|0.01867022|0.019223063|0.000574177|0.01979724|0.018648886|
|0.019813942|0.019180823|0.018667946|0.019220904|0.000574048|0.019794952|0.018646855|
|0.019811438|0.019179117|0.018665679|0.019218745|0.000573907|0.019792652|0.018644638|
|0.019808952|0.019177422|0.018663399|0.019216591|0.00057378|0.019790371|0.018642811|
|0.019806463|0.01917571|0.018661136|0.019214436|0.000573645|0.019788081|0.018640791|

| | | | | | | |
|---|---|---|---|---|---|---|
| 0.01954392 | 0.019018067 | 0.018441029 | 0.019001005 | 0.000551643 | 0.019552649 | 0.018449362 |
| 0.019541536 | 0.019016787 | 0.018439157 | 0.01899916 | 0.000551401 | 0.019550561 | 0.018447759 |
| 0.019539172 | 0.019015493 | 0.018437279 | 0.018997315 | 0.000551171 | 0.019548486 | 0.018446144 |
| 0.019536795 | 0.019014196 | 0.018435422 | 0.018995471 | 0.000550925 | 0.019546396 | 0.018444546 |
| 0.019534403 | 0.019012919 | 0.018433549 | 0.018993624 | 0.000550681 | 0.019544305 | 0.018442942 |
| 0.019532045 | 0.019011648 | 0.018431686 | 0.018991793 | 0.000550448 | 0.019542242 | 0.018441345 |
| 0.019529687 | 0.019010358 | 0.018429833 | 0.018989959 | 0.000550211 | 0.01954017 | 0.018439748 |
| 0.01952732 | 0.01900908 | 0.018427972 | 0.018988124 | 0.000549974 | 0.019538097 | 0.01843815 |
| 0.019524936 | 0.019007809 | 0.018426113 | 0.018986286 | 0.000549728 | 0.019536013 | 0.018436558 |
| 0.019522589 | 0.019006532 | 0.018424274 | 0.018984465 | 0.00054949 | 0.019533954 | 0.018434975 |
| 0.019520219 | 0.019005273 | 0.01842241 | 0.018982634 | 0.000549255 | 0.019531889 | 0.018433379 |
| 0.019517872 | 0.019004021 | 0.018420566 | 0.01898082 | 0.000549021 | 0.019529841 | 0.018431799 |
| 0.01951552 | 0.019002734 | 0.018418742 | 0.018978999 | 0.000548774 | 0.019527773 | 0.018430225 |
| 0.019513177 | 0.019001476 | 0.018416887 | 0.01897718 | 0.000548549 | 0.019525729 | 0.018428632 |
| 0.019510813 | 0.019000223 | 0.018415049 | 0.018975362 | 0.000548305 | 0.019523667 | 0.018427057 |
| 0.019508466 | 0.018998962 | 0.018413238 | 0.018973555 | 0.000548056 | 0.019521611 | 0.0184255 |
| 0.019506115 | 0.018997706 | 0.018411392 | 0.018971738 | 0.000547823 | 0.019519561 | 0.018423915 |
| 0.019503769 | 0.018996468 | 0.018409561 | 0.018969933 | 0.000547586 | 0.019517519 | 0.018422347 |
| 0.019501437 | 0.018995214 | 0.018407735 | 0.01896813 | 0.000547352 | 0.019515482 | 0.018420777 |
| 0.019499104 | 0.01899397 | 0.018405924 | 0.018966333 | 0.000547114 | 0.019513447 | 0.018419218 |
| 0.019496774 | 0.018992737 | 0.018404115 | 0.018964542 | 0.000546875 | 0.019511417 | 0.018417667 |
| 0.019494439 | 0.018991485 | 0.018402293 | 0.018962739 | 0.00054664 | 0.019509379 | 0.018416099 |
| 0.019492107 | 0.018990245 | 0.018400475 | 0.018960942 | 0.000546405 | 0.019507347 | 0.018414537 |
| 0.019489786 | 0.018988999 | 0.01839867 | 0.018959152 | 0.00054617 | 0.019505321 | 0.018412982 |
| 0.019487455 | 0.018987749 | 0.018396851 | 0.018957352 | 0.000545937 | 0.019503289 | 0.018411414 |
| 0.019485142 | 0.018986544 | 0.018395063 | 0.018955563 | 0.000545699 | 0.019501282 | 0.018409864 |
| 0.019482831 | 0.018985316 | 0.018393241 | 0.018953796 | 0.000545478 | 0.019499274 | 0.018408318 |
| 0.019480504 | 0.018984089 | 0.018391456 | 0.018952016 | 0.000545232 | 0.019497248 | 0.018406785 |
| 0.0194782 | 0.018982863 | 0.018389652 | 0.018950208 | 0.000545007 | 0.019495245 | 0.018405231 |
| 0.019475887 | 0.018981636 | 0.018387847 | 0.018948456 | 0.000544778 | 0.019493235 | 0.018403678 |
| 0.019473581 | 0.018980416 | 0.018386072 | 0.018946689 | 0.000544538 | 0.019491228 | 0.018402151 |
| 0.01947128 | 0.018979194 | 0.01838426 | 0.018944918 | 0.00054431 | 0.019489228 | 0.018400608 |
| 0.019468961 | 0.018977979 | 0.018382497 | 0.018943146 | 0.000544069 | 0.019487215 | 0.018399077 |
| 0.019466678 | 0.018976772 | 0.018380705 | 0.018941385 | 0.00054385 | 0.019485235 | 0.018397535 |
| 0.019464381 | 0.018975556 | 0.018378936 | 0.018939624 | 0.000543614 | 0.019483238 | 0.01839601 |
| 0.019462086 | 0.018974349 | 0.018377151 | 0.018937862 | 0.000543387 | 0.019481249 | 0.018394475 |
| 0.019459803 | 0.018973123 | 0.018375389 | 0.018936105 | 0.000543154 | 0.019479259 | 0.018392951 |
| 0.019457517 | 0.018971937 | 0.01837361 | 0.018934355 | 0.00054293 | 0.019477285 | 0.018391425 |
| 0.019455237 | 0.01897073 | 0.018371848 | 0.018932605 | 0.0005427 | 0.019475305 | 0.018389905 |
| 0.019452944 | 0.018969534 | 0.018370084 | 0.018930854 | 0.000542465 | 0.019473319 | 0.018388389 |
| 0.019450672 | 0.018968329 | 0.018368317 | 0.018929106 | 0.000542243 | 0.019471346 | 0.018386863 |
| 0.019448401 | 0.018967127 | 0.018366555 | 0.018927361 | 0.000542019 | 0.01946936 | 0.018385343 |
| 0.019446135 | 0.018965948 | 0.018364791 | 0.018925625 | 0.000541796 | 0.019467423 | 0.018383826 |
| 0.019443847 | 0.018964745 | 0.018363034 | 0.018923876 | 0.000541564 | 0.01946544 | 0.018382311 |
| 0.019441606 | 0.018963551 | 0.018361295 | 0.018922151 | 0.000541345 | 0.019463495 | 0.018380806 |
| 0.019439351 | 0.018962378 | 0.018359547 | 0.018920425 | 0.000541123 | 0.019461548 | 0.018379303 |
| 0.019437086 | 0.018961182 | 0.018357802 | 0.01891869 | 0.000540895 | 0.019459585 | 0.018377795 |
| 0.019434825 | 0.018959997 | 0.018356055 | 0.018916959 | 0.000540671 | 0.01945763 | 0.018376288 |
| 0.019432573 | 0.018958811 | 0.018354312 | 0.018915232 | 0.00054045 | 0.019455682 | 0.018374782 |
| 0.019430323 | 0.018957647 | 0.018352576 | 0.018913515 | 0.000540227 | 0.019453742 | 0.018373288 |
| 0.019428097 | 0.018956464 | 0.01835083 | 0.018911797 | 0.00054002 | 0.019451817 | 0.018371776 |
| 0.019425835 | 0.018955277 | 0.018349104 | 0.018910072 | 0.000539787 | 0.01944986 | 0.018370285 |
| 0.019423602 | 0.018954119 | 0.018347366 | 0.018908362 | 0.000539575 | 0.019447937 | 0.018368787 |

| | | | | | | |
|---|---|---|---|---|---|---|
| 0.019206829 | 0.018838694 | 0.018176604 | 0.018740709 | 0.000522055 | 0.019262765 | 0.018218654 |
| 0.019205038 | 0.018837703 | 0.01817514 | 0.018739294 | 0.000521954 | 0.019261247 | 0.01821734 |
| 0.019203257 | 0.018836718 | 0.018173655 | 0.018737877 | 0.000521869 | 0.019259745 | 0.018216008 |
| 0.019201465 | 0.018835714 | 0.018172199 | 0.018736459 | 0.000521762 | 0.019258222 | 0.018214697 |
| 0.019199679 | 0.018834729 | 0.018170731 | 0.018735046 | 0.000521666 | 0.019256712 | 0.01821338 |
| 0.019197889 | 0.018833738 | 0.01816928 | 0.018733635 | 0.000521559 | 0.019255194 | 0.018212076 |
| 0.019196143 | 0.018832741 | 0.018167818 | 0.018732234 | 0.000521478 | 0.019253712 | 0.018210756 |
| 0.019194365 | 0.018831762 | 0.01816636 | 0.018730829 | 0.000521382 | 0.019252211 | 0.018209447 |
| 0.019192612 | 0.018830769 | 0.018164909 | 0.01872943 | 0.000521292 | 0.019250722 | 0.018208137 |
| 0.019190853 | 0.018829793 | 0.018163454 | 0.018728033 | 0.000521204 | 0.019249237 | 0.018206829 |
| 0.019189099 | 0.018828796 | 0.018162012 | 0.018726636 | 0.000521109 | 0.019247745 | 0.018205527 |
| 0.019187344 | 0.018827833 | 0.018160559 | 0.018725246 | 0.000521023 | 0.019246269 | 0.018204223 |
| 0.019185593 | 0.01862685 | 0.018159114 | 0.018723852 | 0.000520933 | 0.019244786 | 0.018202919 |
| 0.019183848 | 0.018825868 | 0.01815768 | 0.018722465 | 0.00052084 | 0.019243305 | 0.018201625 |
| 0.019182131 | 0.01882489 | 0.018156214 | 0.018721078 | 0.000520777 | 0.019241856 | 0.018200301 |
| 0.019180395 | 0.018823916 | 0.018154787 | 0.018719699 | 0.000520686 | 0.019240385 | 0.018199013 |
| 0.019178664 | 0.01882294 | 0.01815334 | 0.018718315 | 0.000520608 | 0.019238923 | 0.018197707 |
| 0.019176958 | 0.018821971 | 0.018151924 | 0.018716951 | 0.000520524 | 0.019237476 | 0.018196427 |
| 0.019175228 | 0.018821007 | 0.018150471 | 0.018715569 | 0.000520451 | 0.01923602 | 0.018195117 |
| 0.01917352 | 0.018820051 | 0.01814905 | 0.018714207 | 0.000520372 | 0.019234579 | 0.018193835 |
| 0.019171799 | 0.018819062 | 0.018147621 | 0.018712827 | 0.000520288 | 0.019233115 | 0.01819254 |
| 0.019170094 | 0.018818097 | 0.018146193 | 0.018711461 | 0.000520213 | 0.019231675 | 0.018191248 |
| 0.019168405 | 0.01881713 | 0.01814477 | 0.018710102 | 0.000520143 | 0.019230245 | 0.018189959 |
| 0.019166697 | 0.018816162 | 0.01814335 | 0.018708736 | 0.000520062 | 0.019228799 | 0.018188674 |
| 0.019165019 | 0.018815186 | 0.018141931 | 0.018707378 | 0.000519994 | 0.019227373 | 0.018187384 |
| 0.019163335 | 0.018814234 | 0.018140502 | 0.018706024 | 0.000519931 | 0.019225955 | 0.018186092 |
| 0.019161634 | 0.018813277 | 0.01813909 | 0.018704667 | 0.000519852 | 0.019224519 | 0.018184815 |
| 0.019159971 | 0.018812323 | 0.018137677 | 0.018703323 | 0.00051979 | 0.019223114 | 0.018183533 |
| 0.019158287 | 0.018811351 | 0.018136261 | 0.018701966 | 0.000519719 | 0.019221665 | 0.018182247 |
| 0.019156614 | 0.018810401 | 0.018134855 | 0.018700623 | 0.00051965 | 0.019220274 | 0.018180973 |
| 0.019154968 | 0.018809447 | 0.018133454 | 0.01869929 | 0.00051959 | 0.019218879 | 0.0181797 |
| 0.019153291 | 0.018808503 | 0.018132042 | 0.018697945 | 0.000519524 | 0.019217469 | 0.018178422 |
| 0.019151649 | 0.018807547 | 0.018130643 | 0.018696613 | 0.000519464 | 0.019216077 | 0.018177149 |
| 0.019149989 | 0.01880658 | 0.018129231 | 0.018695267 | 0.000519403 | 0.01921467 | 0.018175864 |
| 0.019148339 | 0.018805645 | 0.018127836 | 0.018693941 | 0.0005193 | 0.01921328 | 0.018174601 |
| 0.019146694 | 0.018804699 | 0.018126443 | 0.018692612 | 0.000519279 | 0.019211891 | 0.018173333 |
| 0.019145062 | 0.018803755 | 0.018125042 | 0.018691286 | 0.000519227 | 0.019210514 | 0.018172059 |
| 0.01914341 | 0.01880281 | 0.018123645 | 0.018689955 | 0.000519165 | 0.01920912 | 0.01817079 |
| 0.019141795 | 0.018801874 | 0.018122273 | 0.018688647 | 0.000519107 | 0.019207754 | 0.01816954 |
| 0.019140165 | 0.018800912 | 0.01812087 | 0.018687316 | 0.000519056 | 0.019206372 | 0.01816826 |
| 0.019138541 | 0.018799964 | 0.01811949 | 0.018685998 | 0.000518997 | 0.019204995 | 0.018167002 |
| 0.019136921 | 0.018799024 | 0.0181181 | 0.018684682 | 0.000518945 | 0.019203627 | 0.018165736 |
| 0.019135322 | 0.018798091 | 0.018116716 | 0.018683376 | 0.000518902 | 0.019202278 | 0.018164475 |
| 0.0191337 | 0.018797115 | 0.018115342 | 0.018682064 | 0.000518842 | 0.019200906 | 0.018163222 |
| 0.019132096 | 0.018796209 | 0.018113961 | 0.018680756 | 0.000518794 | 0.019199549 | 0.018161962 |
| 0.019130496 | 0.018795278 | 0.018112591 | 0.018679452 | 0.000518748 | 0.01919962 | 0.018160704 |
| 0.019128894 | 0.01879435 | 0.018111195 | 0.018678147 | 0.000518705 | 0.019196852 | 0.018159441 |
| 0.019127309 | 0.018793408 | 0.018109832 | 0.01867685 | 0.000518656 | 0.019195506 | 0.018158193 |
| 0.019125717 | 0.018792484 | 0.018108465 | 0.018675555 | 0.000518608 | 0.019194164 | 0.018156947 |
| 0.01912413 | 0.018791538 | 0.018107081 | 0.018674249 | 0.00051857 | 0.019192819 | 0.01815568 |
| 0.019122558 | 0.018790619 | 0.018105732 | 0.01867297 | 0.000518522 | 0.019191491 | 0.018154448 |
| 0.019120974 | 0.018789681 | 0.018104356 | 0.01867167 | 0.000518482 | 0.019190152 | 0.018153189 |
| 0.01911941 | 0.018788768 | 0.018102996 | 0.018670391 | 0.000518444 | 0.019188835 | 0.018151947 |

FIG. 14 (continued)

| | | | | | | |
|---|---|---|---|---|---|---|
| 0.019117843 | 0.018787642 | 0.018101633 | 0.018669106 | 0.000518406 | 0.019187512 | 0.0181507 |
| 0.019116282 | 0.018786913 | 0.0181CO28 | 0.018667825 | 0.000518364 | 0.019186159 | 0.018149461 |
| 0.019114725 | 0.018785996 | 0.018098919 | 0.018666547 | 0.000518331 | 0.019184878 | 0.018148216 |
| 0.019113164 | 0.01878508 | 0.01809757 | 0.018665272 | 0.000518289 | 0.01918356 | 0.018146983 |
| 0.019111622 | 0.018784154 | 0.018096212 | 0.018663996 | 0.000518259 | 0.019182256 | 0.018145737 |
| 0.019110063 | 0.018783242 | 0.018094867 | 0.018662724 | 0.000518217 | 0.019180941 | 0.018144507 |
| 0.019108528 | 0.018782323 | 0.01809351 | 0.018661454 | 0.000518192 | 0.019179646 | 0.018143262 |
| 0.019106996 | 0.018781403 | 0.018092157 | 0.018660182 | 0.00051816 | 0.019178343 | 0.018142022 |
| 0.019105447 | 0.018780492 | 0.018090818 | 0.018658919 | 0.000518128 | 0.019177044 | 0.018140793 |
| 0.019103929 | 0.018779552 | 0.018089475 | 0.018657652 | 0.000518097 | 0.019175749 | 0.018139556 |
| 0.019102406 | 0.018778658 | 0.018088128 | 0.018656397 | 0.000518074 | 0.019174471 | 0.018138324 |
| 0.019100875 | 0.018777734 | 0.018086789 | 0.018655133 | 0.00051804 | 0.019173173 | 0.018137092 |
| 0.019099357 | 0.018776847 | 0.018085448 | 0.018653864 | 0.000518018 | 0.019171902 | 0.018135866 |
| 0.019097857 | 0.018775931 | 0.01808412 | 0.018652636 | 0.000517993 | 0.019170629 | 0.018134643 |
| 0.019096348 | 0.018775016 | 0.018082786 | 0.018651364 | 0.000517968 | 0.019169352 | 0.018133416 |
| 0.019094832 | 0.018774113 | 0.01808146 | 0.018650135 | 0.000517937 | 0.019168072 | 0.018132198 |
| 0.019093337 | 0.018773209 | 0.01808013 | 0.018648892 | 0.000517917 | 0.019166809 | 0.018130975 |
| 0.019091848 | 0.018772313 | 0.018078793 | 0.018647651 | 0.000517905 | 0.019165557 | 0.018129746 |
| 0.019090343 | 0.018771414 | 0.01807747 | 0.018646409 | 0.000517878 | 0.019164287 | 0.018128531 |
| 0.019088866 | 0.018770499 | 0.018076139 | 0.018645168 | 0.000517866 | 0.019163034 | 0.018127302 |
| 0.019087367 | 0.018769605 | 0.018074816 | 0.01864393 | 0.000517841 | 0.019161771 | 0.018126069 |
| 0.019085877 | 0.018768702 | 0.018073503 | 0.018642694 | 0.000517816 | 0.01916051 | 0.018124878 |
| 0.019084403 | 0.018767809 | 0.01807218 | 0.018641464 | 0.000517804 | 0.019159269 | 0.01812366 |
| 0.019082937 | 0.018766899 | 0.018070877 | 0.018640238 | 0.000517783 | 0.01915802 | 0.018122455 |
| 0.019081464 | 0.018766018 | 0.01806955 | 0.018639011 | 0.000517774 | 0.019156785 | 0.018121236 |
| 0.01908 | 0.018765122 | 0.018068235 | 0.018637786 | 0.000517762 | 0.019155548 | 0.018120023 |
| 0.019078545 | 0.018764246 | 0.018066918 | 0.01863657 | 0.000517758 | 0.019154328 | 0.018118812 |
| 0.019077072 | 0.018763348 | 0.018065615 | 0.018635345 | 0.000517736 | 0.019153061 | 0.018117609 |
| 0.019075613 | 0.018762445 | 0.018064307 | 0.018634122 | 0.000517721 | 0.019151843 | 0.018116401 |
| 0.019074174 | 0.018761573 | 0.018062996 | 0.018632914 | 0.000517721 | 0.019150635 | 0.018115193 |
| 0.019072721 | 0.018760668 | 0.018061703 | 0.018631697 | 0.000517701 | 0.019149398 | 0.018113996 |
| 0.019071279 | 0.018759783 | 0.018060407 | 0.01863049 | 0.00051769 | 0.01914818 | 0.018112799 |
| 0.019069854 | 0.018758895 | 0.018059058 | 0.018629279 | 0.000517699 | 0.019146978 | 0.01811158 |
| 0.019068411 | 0.018758016 | 0.018057795 | 0.018628074 | 0.000517687 | 0.019145761 | 0.018110387 |
| 0.019066988 | 0.018757131 | 0.018056499 | 0.018626872 | 0.000517685 | 0.019144557 | 0.018109188 |
| 0.01906555 | 0.018756239 | 0.018055202 | 0.018625664 | 0.000517675 | 0.019143339 | 0.018107988 |
| 0.019064134 | 0.018755378 | 0.018053908 | 0.018624473 | 0.000517679 | 0.019142152 | 0.018106795 |
| 0.019062717 | 0.018754495 | 0.018052636 | 0.018623263 | 0.000517666 | 0.019140949 | 0.018105616 |
| 0.019061292 | 0.018753614 | 0.018051321 | 0.018622076 | 0.000517675 | 0.01913975 | 0.018104401 |
| 0.019059895 | 0.018752731 | 0.018050034 | 0.018620887 | 0.00051768 | 0.019138566 | 0.018103207 |
| 0.019058485 | 0.018751854 | 0.018048756 | 0.018619698 | 0.000517675 | 0.019137373 | 0.018102024 |
| 0.019057063 | 0.018750988 | 0.018047465 | 0.018618505 | 0.000517674 | 0.019136179 | 0.018100832 |
| 0.01905567 | 0.018750118 | 0.018046191 | 0.018617326 | 0.000517675 | 0.019135001 | 0.018099652 |
| 0.019054286 | 0.018749239 | 0.0180449 | 0.018616142 | 0.000517688 | 0.01913383 | 0.018098453 |
| 0.019052865 | 0.018748367 | 0.018043639 | 0.018614964 | 0.000517679 | 0.019132643 | 0.018097285 |
| 0.019051488 | 0.018747495 | 0.01804236 | 0.018613761 | 0.000517682 | 0.019131463 | 0.018096099 |
| 0.019050103 | 0.018746624 | 0.018041084 | 0.018612603 | 0.000517689 | 0.019130291 | 0.018094915 |
| 0.019048728 | 0.018745769 | 0.018039819 | 0.018611439 | 0.000517695 | 0.019129133 | 0.018093744 |
| 0.01904734 | 0.018744892 | 0.018038539 | 0.018610257 | 0.000517701 | 0.019127958 | 0.018092556 |
| 0.019045973 | 0.018744033 | 0.018037265 | 0.01860909 | 0.000517716 | 0.019126807 | 0.018091374 |
| 0.019044606 | 0.018743178 | 0.018035993 | 0.018607926 | 0.000517731 | 0.019125656 | 0.018090196 |
| 0.019043228 | 0.018742304 | 0.01803473 | 0.018606754 | 0.000517733 | 0.019124487 | 0.018089021 |
| 0.019041868 | 0.018741447 | 0.018033462 | 0.018605592 | 0.000517748 | 0.019123341 | 0.018087844 |

| | | | | | | |
|---|---|---|---|---|---|---|
| 0.018860977 | 0.018617522 | 0.017850669 | 0.018443056 | 0.000527266 | 0.018970322 | 0.01791579 |
| 0.018860001 | 0.01861682 | 0.01784962 | 0.018442147 | 0.000527352 | 0.018969499 | 0.017914795 |
| 0.018859064 | 0.018616127 | 0.017848596 | 0.018441262 | 0.000527442 | 0.018968704 | 0.017913821 |
| 0.018858122 | 0.018615425 | 0.01784757 | 0.018440372 | 0.000527529 | 0.018967901 | 0.017912843 |
| 0.018857183 | 0.018614737 | 0.017846541 | 0.018439487 | 0.000527621 | 0.018967108 | 0.017911867 |
| 0.018856239 | 0.018614041 | 0.017845502 | 0.018438594 | 0.000527715 | 0.018966309 | 0.017910879 |
| 0.01885529 | 0.018613363 | 0.017844466 | 0.018437707 | 0.000527809 | 0.018965516 | 0.017909897 |
| 0.018854341 | 0.018612642 | 0.017843442 | 0.018436808 | 0.000527889 | 0.018964697 | 0.017908919 |
| 0.018853422 | 0.018611979 | 0.017842401 | 0.018435934 | 0.000528001 | 0.018963935 | 0.017907933 |
| 0.018852483 | 0.018611286 | 0.017841376 | 0.018435049 | 0.00052809 | 0.018963139 | 0.017906959 |
| 0.018851552 | 0.018610597 | 0.017840344 | 0.018434164 | 0.000528187 | 0.018962351 | 0.017905977 |
| 0.018850621 | 0.018609921 | 0.017839333 | 0.018433291 | 0.000528275 | 0.018961566 | 0.017905017 |
| 0.018849682 | 0.018609229 | 0.017838296 | 0.018432402 | 0.000528372 | 0.018960774 | 0.017904031 |
| 0.018848751 | 0.018608527 | 0.01783726 | 0.018431519 | 0.000528457 | 0.018959977 | 0.017903062 |
| 0.018847831 | 0.018607855 | 0.017836254 | 0.018430647 | 0.000528558 | 0.018959205 | 0.017902088 |
| 0.018846907 | 0.018607169 | 0.017835237 | 0.018429771 | 0.000528651 | 0.018958422 | 0.01790112 |
| 0.018845968 | 0.018606488 | 0.017834201 | 0.018428866 | 0.000528748 | 0.018957634 | 0.017900137 |
| 0.018845042 | 0.018605806 | 0.017833194 | 0.018428014 | 0.000528835 | 0.018956849 | 0.017899179 |
| 0.018844133 | 0.018605124 | 0.017832166 | 0.018427141 | 0.000528941 | 0.018956082 | 0.0178982 |
| 0.018843215 | 0.018604448 | 0.017831158 | 0.018426274 | 0.000529032 | 0.018955305 | 0.017897242 |
| 0.018842302 | 0.018603763 | 0.017830146 | 0.018425404 | 0.000529124 | 0.018954529 | 0.01789628 |
| 0.018841369 | 0.018603072 | 0.017829137 | 0.018424526 | 0.000529209 | 0.018953735 | 0.017895317 |
| 0.018840453 | 0.018602403 | 0.017828124 | 0.01842366 | 0.000529306 | 0.018952965 | 0.017894354 |
| 0.018839553 | 0.018601734 | 0.017827094 | 0.018422794 | 0.000529418 | 0.018952211 | 0.017893376 |
| 0.018838646 | 0.018601039 | 0.01782608 | 0.018421922 | 0.000529514 | 0.018951435 | 0.017892408 |
| 0.018837729 | 0.018600369 | 0.017825076 | 0.018421058 | 0.000529604 | 0.018950663 | 0.017891454 |
| 0.018836822 | 0.018599704 | 0.017824057 | 0.018420196 | 0.000529708 | 0.018949903 | 0.017890486 |
| 0.018835917 | 0.01859903 | 0.017823052 | 0.018419333 | 0.000529804 | 0.018949137 | 0.017889529 |
| 0.018835003 | 0.018598352 | 0.017822057 | 0.01841847 | 0.000529889 | 0.01894836 | 0.017888561 |
| 0.018834099 | 0.018597685 | 0.017821042 | 0.018417609 | 0.000529992 | 0.018947601 | 0.017887616 |
| 0.018833209 | 0.018597005 | 0.017820036 | 0.01841675 | 0.000530093 | 0.018946843 | 0.017886657 |
| 0.018832296 | 0.01859634 | 0.01781903 | 0.018415889 | 0.000530188 | 0.018946076 | 0.017885701 |
| 0.018831415 | 0.018595669 | 0.017818023 | 0.018415036 | 0.000530295 | 0.01894533 | 0.017884741 |
| 0.018830495 | 0.018594995 | 0.017817007 | 0.018414166 | 0.00053039 | 0.018944556 | 0.017883776 |
| 0.018829608 | 0.018594325 | 0.01781602 | 0.018413318 | 0.000530484 | 0.018943801 | 0.017882834 |
| 0.018828716 | 0.018593656 | 0.017815016 | 0.018412463 | 0.000530585 | 0.018943047 | 0.017881878 |
| 0.018827816 | 0.018592993 | 0.017814033 | 0.018411614 | 0.000530672 | 0.018942286 | 0.017880942 |
| 0.018826919 | 0.018592319 | 0.017813019 | 0.018410752 | 0.000530776 | 0.018941528 | 0.017879977 |
| 0.018826032 | 0.018591655 | 0.017812032 | 0.018409907 | 0.00053087 | 0.018940777 | 0.017879036 |
| 0.018825145 | 0.018590996 | 0.017811036 | 0.018409059 | 0.000530971 | 0.01894003 | 0.017878088 |
| 0.018824259 | 0.018590324 | 0.017810039 | 0.018408207 | 0.00053107 | 0.018939277 | 0.017877137 |
| 0.018823363 | 0.018589666 | 0.017809043 | 0.018407357 | 0.000531167 | 0.018938525 | 0.01787619 |
| 0.01882248 | 0.018589018 | 0.017808046 | 0.018406515 | 0.000531271 | 0.018937786 | 0.017875245 |
| 0.018821603 | 0.018588344 | 0.017807053 | 0.018405667 | 0.000531372 | 0.018937036 | 0.017874295 |
| 0.018820699 | 0.018587699 | 0.017806059 | 0.018404819 | 0.000531468 | 0.018936287 | 0.017873352 |
| 0.018819833 | 0.018586999 | 0.017805075 | 0.018403969 | 0.000531562 | 0.018935531 | 0.017872407 |
| 0.018818958 | 0.018586349 | 0.017804084 | 0.01840313 | 0.000531666 | 0.018934796 | 0.017871464 |
| 0.018818064 | 0.018585704 | 0.017803086 | 0.018402285 | 0.000531768 | 0.018934052 | 0.017870517 |
| 0.018817199 | 0.018585047 | 0.017802102 | 0.01840145 | 0.000531871 | 0.01893332 | 0.017869579 |
| 0.018816315 | 0.018584399 | 0.017801117 | 0.01840061 | 0.000531968 | 0.018932578 | 0.017868642 |
| 0.01881545 | 0.018583728 | 0.017800136 | 0.018399771 | 0.000532068 | 0.018931839 | 0.017867704 |
| 0.018814577 | 0.018583078 | 0.017799143 | 0.018398932 | 0.000532174 | 0.018931106 | 0.017866759 |
| 0.018813698 | 0.018582428 | 0.017798172 | 0.018398099 | 0.000532285 | 0.018930364 | 0.017865835 |

| | | | | | | |
|---|---|---|---|---|---|---|
| 0.018726809 | 0.018516311 | 0.017698338 | 0.01831382 | 0.000543314 | 0.018857134 | 0.017770505 |
| 0.018726042 | 0.01851574 | 0.017697465 | 0.018313082 | 0.000543411 | 0.018856493 | 0.017769671 |
| 0.018725282 | 0.018515149 | 0.01769658 | 0.018312337 | 0.000543513 | 0.01885585 | 0.017768824 |
| 0.018724531 | 0.018514553 | 0.017695704 | 0.018311596 | 0.000543613 | 0.018855209 | 0.017767984 |
| 0.018723765 | 0.018513992 | 0.017694814 | 0.018310857 | 0.000543722 | 0.018854579 | 0.017767136 |
| 0.018723005 | 0.018513387 | 0.017693933 | 0.018310109 | 0.000543819 | 0.018853928 | 0.01776629 |
| 0.018722245 | 0.018512821 | 0.017693045 | 0.01830937 | 0.000543928 | 0.018853298 | 0.017765442 |
| 0.018721491 | 0.01851223 | 0.017692177 | 0.018308633 | 0.000544023 | 0.018852656 | 0.01776461 |
| 0.018720748 | 0.018511644 | 0.017691286 | 0.018307893 | 0.000544136 | 0.018852028 | 0.017763757 |
| 0.01871998 | 0.018511072 | 0.017690409 | 0.018307154 | 0.000544235 | 0.018851388 | 0.017762919 |
| 0.018719226 | 0.018510504 | 0.017689535 | 0.018306422 | 0.000544337 | 0.018850759 | 0.017762095 |
| 0.018718466 | 0.01850991 | 0.017688656 | 0.018305677 | 0.000544436 | 0.018850113 | 0.017761242 |
| 0.018717719 | 0.018509336 | 0.017687775 | 0.018304943 | 0.000544544 | 0.018849488 | 0.017760399 |
| 0.018716965 | 0.018508755 | 0.017686915 | 0.018304211 | 0.000544637 | 0.018848848 | 0.017759575 |
| 0.018716231 | 0.018508172 | 0.017686026 | 0.018303476 | 0.000544753 | 0.018848229 | 0.017758723 |
| 0.018715471 | 0.018507596 | 0.017685153 | 0.01830274 | 0.000544652 | 0.018847592 | 0.017757888 |
| 0.01871472 | 0.018507017 | 0.017684285 | 0.018302007 | 0.000544951 | 0.018846958 | 0.017757057 |
| 0.018713966 | 0.018506451 | 0.017683405 | 0.018301274 | 0.000545057 | 0.018846331 | 0.017756217 |
| 0.018713225 | 0.018505873 | 0.017682528 | 0.018300542 | 0.000545165 | 0.018845707 | 0.017755377 |
| 0.018712463 | 0.018505309 | 0.017681666 | 0.018299812 | 0.000545259 | 0.018845071 | 0.017754554 |
| 0.018711731 | 0.018504731 | 0.017680796 | 0.018299086 | 0.000545366 | 0.018844452 | 0.01775372 |
| 0.018710967 | 0.018504163 | 0.017679945 | 0.018298358 | 0.000545453 | 0.018843811 | 0.017752906 |
| 0.018710241 | 0.018503571 | 0.017679065 | 0.018297626 | 0.000545565 | 0.01884319 | 0.017752061 |
| 0.018709492 | 0.018502994 | 0.017678201 | 0.018296896 | 0.000545662 | 0.018842558 | 0.017751233 |
| 0.018708743 | 0.018502431 | 0.017677315 | 0.018296163 | 0.000545776 | 0.018841939 | 0.017750387 |
| 0.018707998 | 0.018501865 | 0.017676456 | 0.01829544 | 0.000545874 | 0.018841314 | 0.017749566 |
| 0.018707255 | 0.018501297 | 0.017675597 | 0.018294716 | 0.000545973 | 0.018840689 | 0.017748744 |
| 0.018706508 | 0.018500715 | 0.01767474 | 0.018293988 | 0.000546066 | 0.018840054 | 0.017747922 |
| 0.018705772 | 0.018500147 | 0.017673867 | 0.018293262 | 0.000546176 | 0.018839438 | 0.017747086 |
| 0.018705027 | 0.018499576 | 0.017673014 | 0.018292539 | 0.00054627 | 0.018838809 | 0.017746269 |
| 0.01870431 | 0.018499013 | 0.017672151 | 0.018291825 | 0.000546382 | 0.018838207 | 0.017745443 |
| 0.018703556 | 0.018498436 | 0.017671287 | 0.018291093 | 0.000546478 | 0.018837571 | 0.017744615 |
| 0.018702812 | 0.018497862 | 0.017670425 | 0.018290366 | 0.000546578 | 0.018836944 | 0.017743789 |
| 0.018702064 | 0.018497299 | 0.017669566 | 0.01828965 | 0.000546683 | 0.018836333 | 0.017742967 |
| 0.018701345 | 0.018496737 | 0.017668705 | 0.018288929 | 0.000546785 | 0.018835714 | 0.017742144 |
| 0.018700611 | 0.018496169 | 0.017667849 | 0.018288209 | 0.000546886 | 0.018835096 | 0.017741323 |
| 0.01869986 | 0.018495606 | 0.017667001 | 0.018287489 | 0.000546977 | 0.018834466 | 0.017740512 |
| 0.018699126 | 0.018495033 | 0.017666141 | 0.018286768 | 0.000547079 | 0.018833846 | 0.017739687 |
| 0.018698398 | 0.018494468 | 0.01766528 | 0.018286049 | 0.000547186 | 0.018833234 | 0.017738863 |
| 0.018697655 | 0.018493913 | 0.017664423 | 0.01828533 | 0.000547286 | 0.018832616 | 0.017738044 |
| 0.018696932 | 0.018493339 | 0.017663572 | 0.018284615 | 0.000547387 | 0.018832002 | 0.017737227 |
| 0.018696195 | 0.018492779 | 0.017662711 | 0.018283895 | 0.000547491 | 0.018831386 | 0.017736404 |
| 0.018695466 | 0.018492207 | 0.01766187 | 0.018283181 | 0.000547585 | 0.018830766 | 0.017735596 |
| 0.018694727 | 0.018491644 | 0.017661009 | 0.01828246 | 0.000547688 | 0.018830148 | 0.017734772 |
| 0.018694019 | 0.018491074 | 0.017660156 | 0.01828175 | 0.000547796 | 0.018829546 | 0.017733953 |
| 0.018693281 | 0.018490514 | 0.01765932 | 0.018281036 | 0.000547886 | 0.018828924 | 0.017733152 |
| 0.018692547 | 0.018489962 | 0.017658468 | 0.018280326 | 0.000547988 | 0.018828314 | 0.017732338 |
| 0.018691836 | 0.018489402 | 0.017657625 | 0.018279621 | 0.000548092 | 0.018827712 | 0.017731529 |
| 0.018691089 | 0.018488828 | 0.017656773 | 0.018278897 | 0.000548184 | 0.018827081 | 0.017730713 |
| 0.018690364 | 0.018488267 | 0.017655941 | 0.018278191 | 0.000548277 | 0.018826467 | 0.017729914 |
| 0.018689632 | 0.018487722 | 0.017655086 | 0.01827748 | 0.000548382 | 0.018825862 | 0.017729098 |
| 0.01868891 | 0.018487154 | 0.017654248 | 0.01827677 | 0.000548477 | 0.018825248 | 0.017728293 |
| 0.018688189 | 0.018486604 | 0.017653398 | 0.018276064 | 0.000548583 | 0.018824647 | 0.017727481 |

FIG. 14 (continued)

| | | | | | | |
|---|---|---|---|---|---|---|
| 0.018687459 | 0.018486604 | 0.017652556 | 0.018275352 | 0.000548678 | 0.01882403 | 0.017726673 |
| 0.018686736 | 0.018485485 | 0.017651713 | 0.018274644 | 0.000548779 | 0.018823424 | 0.017725865 |
| 0.018686021 | 0.01848492 | 0.017650665 | 0.018273935 | 0.000548883 | 0.018822819 | 0.017725052 |
| 0.018685304 | 0.018484373 | 0.017650029 | 0.018273235 | 0.000548983 | 0.018822218 | 0.017724251 |
| 0.01868456 | 0.018483808 | 0.017649192 | 0.01827252 | 0.000549071 | 0.018821591 | 0.01772345 |
| 0.018683841 | 0.018483257 | 0.017648352 | 0.018271817 | 0.000549172 | 0.018820989 | 0.017722645 |
| 0.018683126 | 0.018482691 | 0.017647509 | 0.018271108 | 0.000549273 | 0.018820382 | 0.017721835 |
| 0.018682407 | 0.018482141 | 0.017646668 | 0.018270406 | 0.000549375 | 0.01881978 | 0.017721031 |
| 0.018681688 | 0.018481579 | 0.017645827 | 0.018269698 | 0.000549475 | 0.018819173 | 0.017720223 |
| 0.018680967 | 0.01848104 | 0.017644994 | 0.018269001 | 0.000549573 | 0.018818574 | 0.017719427 |
| 0.018680247 | 0.018480472 | 0.017644158 | 0.018268292 | 0.000549668 | 0.018817961 | 0.017718624 |
| 0.018679535 | 0.01847993 | 0.017643325 | 0.018267597 | 0.00054977 | 0.018817367 | 0.017717827 |
| 0.018678825 | 0.018479373 | 0.017642492 | 0.018266897 | 0.000549869 | 0.018816766 | 0.017717028 |
| 0.018678091 | 0.018478828 | 0.017641652 | 0.01826619 | 0.000549966 | 0.018816156 | 0.017716225 |
| 0.018677371 | 0.018478269 | 0.017640827 | 0.018265489 | 0.000550056 | 0.018815545 | 0.017715432 |
| 0.018676663 | 0.018477714 | 0.017639995 | 0.01826479 | 0.000550157 | 0.018814947 | 0.017714634 |
| 0.018675942 | 0.018477166 | 0.017639168 | 0.018264092 | 0.000550251 | 0.018814342 | 0.017713841 |
| 0.01867524 | 0.018476626 | 0.017638337 | 0.018263401 | 0.000550355 | 0.018813756 | 0.017713046 |
| 0.018674523 | 0.018476052 | 0.017637515 | 0.018262697 | 0.000550442 | 0.018813139 | 0.017712255 |
| 0.018673794 | 0.018475499 | 0.017636681 | 0.018261991 | 0.000550536 | 0.018812528 | 0.017711455 |
| 0.018673107 | 0.018474972 | 0.017635856 | 0.018261312 | 0.000550646 | 0.018811957 | 0.017710666 |
| 0.018672361 | 0.018474419 | 0.017635034 | 0.018260611 | 0.000550733 | 0.018811344 | 0.017709878 |
| 0.018671671 | 0.018473851 | 0.017634206 | 0.018259909 | 0.000550828 | 0.018810737 | 0.017709081 |
| 0.018670978 | 0.018473312 | 0.017633377 | 0.018259222 | 0.000550936 | 0.018810158 | 0.017708287 |
| 0.01867027 | 0.018472778 | 0.01763255 | 0.018258533 | 0.000551037 | 0.018809569 | 0.017707496 |
| 0.018669538 | 0.01847223 | 0.017631732 | 0.018257833 | 0.000551122 | 0.018808955 | 0.017706712 |
| 0.018668838 | 0.018471671 | 0.017630896 | 0.018257135 | 0.000551226 | 0.018808361 | 0.017705909 |
| 0.018668139 | 0.018471122 | 0.017630091 | 0.018256451 | 0.000551316 | 0.018807766 | 0.017705135 |
| 0.018667422 | 0.018470576 | 0.017629255 | 0.018255751 | 0.000551417 | 0.018807168 | 0.017704334 |
| 0.018666672 | 0.018470045 | 0.017628435 | 0.018255067 | 0.000551517 | 0.018806583 | 0.01770355 |
| 0.018666602 | 0.018469488 | 0.017627617 | 0.018254375 | 0.000551611 | 0.018805986 | 0.017702764 |
| 0.018665308 | 0.018468942 | 0.017626803 | 0.018253685 | 0.000551702 | 0.018805387 | 0.017701963 |
| 0.018664597 | 0.01846841 | 0.017625971 | 0.018252992 | 0.000551806 | 0.018804796 | 0.017701187 |
| 0.018663893 | 0.018467868 | 0.017625161 | 0.018252307 | 0.000551898 | 0.018804204 | 0.017700409 |
| 0.018663196 | 0.018467315 | 0.017624343 | 0.018251618 | 0.000551994 | 0.018803612 | 0.017699623 |
| 0.018662492 | 0.018466765 | 0.017623531 | 0.018250929 | 0.000552086 | 0.018803015 | 0.017698843 |
| 0.01866179 | 0.018466225 | 0.017622717 | 0.018250244 | 0.000552161 | 0.018802425 | 0.017698063 |
| 0.018661084 | 0.018465683 | 0.01762192 | 0.018249562 | 0.000552265 | 0.018801827 | 0.017697297 |
| 0.018660381 | 0.018465133 | 0.017621087 | 0.018248867 | 0.000552369 | 0.018801236 | 0.017696498 |
| 0.018659672 | 0.018464595 | 0.017620267 | 0.018248178 | 0.000552465 | 0.018800643 | 0.017695713 |
| 0.018658975 | 0.018464059 | 0.017619459 | 0.018247498 | 0.00055256 | 0.018800058 | 0.017694938 |
| 0.018658275 | 0.01846352 | 0.017618652 | 0.018246816 | 0.000552652 | 0.018799468 | 0.017694164 |
| 0.01865758 | 0.018462978 | 0.01761785 | 0.018246136 | 0.000552743 | 0.018798879 | 0.017693393 |
| 0.018656878 | 0.01846244 | 0.01761703 | 0.018245449 | 0.000552842 | 0.018798292 | 0.017692607 |
| 0.018656177 | 0.018461904 | 0.017616222 | 0.018244768 | 0.000552936 | 0.018797703 | 0.017691832 |
| 0.018655483 | 0.018461362 | 0.017615411 | 0.018244085 | 0.000553031 | 0.018797117 | 0.017691054 |
| 0.018654788 | 0.018460825 | 0.017614614 | 0.018243409 | 0.000553121 | 0.01879653 | 0.017690288 |
| 0.018654091 | 0.018460281 | 0.017613798 | 0.018242724 | 0.000553219 | 0.018795942 | 0.017689505 |
| 0.018653367 | 0.018459732 | 0.017612977 | 0.018242032 | 0.000553316 | 0.018795348 | 0.017688716 |
| 0.018652698 | 0.018459205 | 0.017612191 | 0.018241365 | 0.000553403 | 0.018794767 | 0.017687962 |
| 0.018652003 | 0.018458659 | 0.017611384 | 0.018240682 | 0.000553496 | 0.018794178 | 0.017687187 |
| 0.018651307 | 0.018458124 | 0.017610572 | 0.018240001 | 0.000553593 | 0.018793594 | 0.017686408 |
| 0.018650608 | 0.018457583 | 0.017609777 | 0.018239326 | 0.000553681 | 0.018793007 | 0.017685645 |

FIG. 14 (continued)

| | | | | | | |
|---|---|---|---|---|---|---|
| 0.01864991 | 0.018457063 | 0.01760898 | 0.018238651 | 0.00055377 | 0.018792421 | 0.01768498 |
| 0.018649215 | 0.01845653 | 0.017608171 | 0.018237972 | 0.000553867 | 0.018791839 | 0.017684105 |
| 0.018648515 | 0.018455982 | 0.017607374 | 0.01823729 | 0.000553952 | 0.018791242 | 0.017683338 |
| 0.018647831 | 0.018455455 | 0.017606562 | 0.018236616 | 0.000554056 | 0.018790672 | 0.01768256 |
| 0.018647134 | 0.018454921 | 0.017605774 | 0.018235943 | 0.00055414 | 0.018790083 | 0.017681803 |
| 0.018646458 | 0.018454388 | 0.017604973 | 0.018235273 | 0.000554239 | 0.018789512 | 0.017681034 |
| 0.018645754 | 0.018453849 | 0.017604178 | 0.018234594 | 0.000554324 | 0.018788918 | 0.01768027 |
| 0.01864507 | 0.018453332 | 0.017603371 | 0.018233924 | 0.000554427 | 0.018788351 | 0.017679498 |
| 0.018644394 | 0.018452788 | 0.017602587 | 0.018233256 | 0.000554514 | 0.018787771 | 0.017678742 |
| 0.018643696 | 0.018452255 | 0.01760179 | 0.01823258 | 0.000554603 | 0.018787184 | 0.017677977 |
| 0.018643018 | 0.018451715 | 0.017600985 | 0.018231906 | 0.000554703 | 0.018786609 | 0.017677203 |
| 0.018642319 | 0.01845119 | 0.017600195 | 0.018231235 | 0.000554789 | 0.018786024 | 0.017676446 |
| 0.01864163 | 0.018450648 | 0.0175994 | 0.018230559 | 0.000554878 | 0.018785438 | 0.017675681 |
| 0.018640939 | 0.018450124 | 0.017598605 | 0.018229889 | 0.000554971 | 0.01878486 | 0.017674918 |
| 0.01864025 | 0.018449586 | 0.01759783 | 0.018229222 | 0.00055505 | 0.018784272 | 0.017674172 |
| 0.018639574 | 0.018449055 | 0.017597036 | 0.018228555 | 0.000555145 | 0.0187837 | 0.01767341 |
| 0.018638887 | 0.018448524 | 0.017596243 | 0.018227885 | 0.000555237 | 0.018783121 | 0.017672648 |
| 0.018638197 | 0.018447999 | 0.017595455 | 0.018227217 | 0.000555325 | 0.018782543 | 0.017671892 |
| 0.018637521 | 0.018447466 | 0.017594654 | 0.018226547 | 0.000555425 | 0.018781972 | 0.017671122 |
| 0.018636823 | 0.018446939 | 0.017593868 | 0.018225877 | 0.000555509 | 0.018781385 | 0.017670368 |
| 0.018636141 | 0.018446406 | 0.017593089 | 0.018225212 | 0.000555594 | 0.018780806 | 0.017669619 |
| 0.018635465 | 0.018445885 | 0.01759229 | 0.018224547 | 0.000555694 | 0.018780241 | 0.017668852 |
| 0.018634776 | 0.01844535 | 0.01759151 | 0.018223879 | 0.000555777 | 0.018779656 | 0.017668102 |
| 0.018634096 | 0.018444823 | 0.017590737 | 0.018223219 | 0.00055586 | 0.018779079 | 0.017667358 |
| 0.018633425 | 0.018444296 | 0.017589953 | 0.018222558 | 0.000555954 | 0.018778512 | 0.017666604 |
| 0.018632721 | 0.018443776 | 0.017589146 | 0.018221881 | 0.000556049 | 0.01877793 | 0.017665833 |
| 0.01863206 | 0.018443245 | 0.017588368 | 0.018221224 | 0.000556142 | 0.018777366 | 0.017665083 |
| 0.018631382 | 0.018442709 | 0.017587591 | 0.018220561 | 0.000556226 | 0.018776787 | 0.017664335 |
| 0.018630693 | 0.0184422 | 0.017586807 | 0.0182199 | 0.000556316 | 0.018776216 | 0.017663584 |
| 0.018630013 | 0.018441668 | 0.017586023 | 0.018219234 | 0.000556405 | 0.018775639 | 0.01766263 |
| 0.018629329 | 0.018441144 | 0.017585253 | 0.018218576 | 0.000556486 | 0.018775061 | 0.01766209 |
| 0.018628661 | 0.018440627 | 0.017584469 | 0.018217919 | 0.000556582 | 0.0187745 | 0.017661337 |
| 0.018627973 | 0.018440094 | 0.017583692 | 0.018217253 | 0.000556663 | 0.018773917 | 0.01766059 |
| 0.018627303 | 0.01843957 | 0.017582919 | 0.018216598 | 0.000556751 | 0.018773349 | 0.017659846 |
| 0.018626632 | 0.018439049 | 0.017582132 | 0.018215938 | 0.000556848 | 0.018772785 | 0.01765909 |
| 0.018625962 | 0.018438516 | 0.01758136 | 0.018215279 | 0.000556933 | 0.018772212 | 0.017658347 |
| 0.018625267 | 0.018437998 | 0.017580595 | 0.01821462 | 0.000557009 | 0.018771628 | 0.017657612 |
| 0.018624602 | 0.018437481 | 0.017579816 | 0.018213966 | 0.000557103 | 0.018771069 | 0.017656864 |
| 0.01862392 | 0.018436946 | 0.017579051 | 0.018213306 | 0.00055718 | 0.018770485 | 0.017656126 |
| 0.018623251 | 0.018436434 | 0.017578257 | 0.018212647 | 0.000557282 | 0.018769930 | 0.017655365 |
| 0.018622564 | 0.018435908 | 0.017577501 | 0.018211991 | 0.000557354 | 0.018769345 | 0.017654637 |
| 0.018621903 | 0.018435389 | 0.017576734 | 0.018211342 | 0.000557443 | 0.018768785 | 0.017653899 |
| 0.018621225 | 0.01843488 | 0.017575938 | 0.018210681 | 0.000557544 | 0.018768225 | 0.017653137 |
| 0.018620556 | 0.018434348 | 0.01757518 | 0.018210028 | 0.000557622 | 0.018767650 | 0.017652406 |
| 0.018619884 | 0.01843383 | 0.017574411 | 0.018209375 | 0.000557708 | 0.018767083 | 0.017651667 |
| 0.018619202 | 0.018433303 | 0.01757364 | 0.018208715 | 0.00055779 | 0.018766505 | 0.017650925 |
| 0.018618539 | 0.018432796 | 0.01757288 | 0.018208072 | 0.000557877 | 0.018765948 | 0.017650195 |
| 0.018617859 | 0.018432267 | 0.017572114 | 0.018207413 | 0.000557956 | 0.018765369 | 0.017649457 |
| 0.018617192 | 0.018431747 | 0.017571341 | 0.01820676 | 0.000558046 | 0.018764808 | 0.017648714 |
| 0.018616525 | 0.018431224 | 0.017570572 | 0.018206107 | 0.000558133 | 0.01876424 | 0.017647974 |
| 0.018615868 | 0.018430717 | 0.01756981 | 0.018205465 | 0.000558223 | 0.018763688 | 0.017647242 |
| 0.018615182 | 0.018430183 | 0.017569046 | 0.018204804 | 0.000558298 | 0.018763102 | 0.017646506 |
| 0.01861451 | 0.018429672 | 0.017568272 | 0.018204151 | 0.000558389 | 0.018762541 | 0.017645762 |

FIG. 14 (continued)

| | | | | | | |
|---|---|---|---|---|---|---|
| 0.01861384 | 0.018429147 | 0.017567523 | 0.018203503 | 0.000558463 | 0.018761986 | 0.01764504 |
| 0.018613178 | 0.018428627 | 0.017566746 | 0.018202851 | 0.000558557 | 0.018761408 | 0.017644293 |
| 0.018612519 | 0.018428126 | 0.017565995 | 0.018202214 | 0.000558641 | 0.018760855 | 0.017643572 |
| 0.01861185 | 0.018427601 | 0.017565234 | 0.018201562 | 0.000558723 | 0.018760285 | 0.017642838 |
| 0.018611174 | 0.018427078 | 0.017564472 | 0.018200908 | 0.000558803 | 0.018759711 | 0.017642105 |
| 0.018610511 | 0.018426569 | 0.017563712 | 0.018200264 | 0.00055889 | 0.018759154 | 0.017641374 |
| 0.01860985 | 0.018426061 | 0.017562944 | 0.018199618 | 0.000558981 | 0.018758599 | 0.017640637 |
| 0.018609196 | 0.018425545 | 0.017562188 | 0.018198966 | 0.000559056 | 0.018758023 | 0.01763991 |
| 0.018608531 | 0.018425023 | 0.017561436 | 0.01819833 | 0.000559146 | 0.018757476 | 0.017639184 |
| 0.018607862 | 0.018424509 | 0.017560678 | 0.018197663 | 0.000559228 | 0.018756911 | 0.017638455 |
| 0.018607196 | 0.018423997 | 0.01755992 | 0.018197034 | 0.000559308 | 0.018756343 | 0.017637726 |
| 0.018606525 | 0.018423485 | 0.017559161 | 0.01819639 | 0.000559394 | 0.018755784 | 0.017636996 |
| 0.018605862 | 0.018422972 | 0.017558414 | 0.01819575 | 0.000559472 | 0.018755222 | 0.017636277 |
| 0.018605206 | 0.018422464 | 0.017557651 | 0.018195107 | 0.000559564 | 0.018754671 | 0.017635543 |
| 0.018604537 | 0.01842195 | 0.017556902 | 0.018194463 | 0.000559641 | 0.018754104 | 0.017634822 |
| 0.018603884 | 0.018421426 | 0.017556155 | 0.018193822 | 0.00055972 | 0.018753542 | 0.017634102 |
| 0.018603215 | 0.01842091 | 0.017555404 | 0.018193177 | 0.000559798 | 0.018752975 | 0.017633379 |
| 0.018602571 | 0.018420398 | 0.017554652 | 0.01819254 | 0.000559886 | 0.018752427 | 0.017632654 |
| 0.018601893 | 0.018419897 | 0.017553907 | 0.018191899 | 0.000559961 | 0.018751859 | 0.017631938 |
| 0.018601241 | 0.018419364 | 0.017553147 | 0.018191251 | 0.00056004 | 0.018751297 | 0.017631204 |
| 0.018600576 | 0.018418862 | 0.017552389 | 0.018190609 | 0.000560133 | 0.018750741 | 0.017630478 |
| 0.018599909 | 0.018418355 | 0.017551657 | 0.018189974 | 0.000560202 | 0.018750176 | 0.017629771 |
| 0.018599257 | 0.018417841 | 0.017550893 | 0.01818933 | 0.000560294 | 0.018749624 | 0.017629036 |
| 0.018598603 | 0.018417338 | 0.017550163 | 0.018188701 | 0.000560368 | 0.01874907 | 0.017628333 |
| 0.018597934 | 0.018416818 | 0.017549414 | 0.018188056 | 0.000560444 | 0.0187485 | 0.017627611 |
| 0.018597281 | 0.018416315 | 0.017548671 | 0.018187422 | 0.000560526 | 0.018747948 | 0.017626896 |
| 0.018596618 | 0.018415807 | 0.017547922 | 0.018186782 | 0.000560607 | 0.018747389 | 0.017626176 |
| 0.018595967 | 0.018415291 | 0.017547181 | 0.018186146 | 0.000560686 | 0.018746832 | 0.01762546 |
| 0.018595304 | 0.018414786 | 0.01754644 | 0.018185551 | 0.000560763 | 0.018746273 | 0.017624747 |
| 0.018594658 | 0.018414268 | 0.017545691 | 0.018184872 | 0.000560848 | 0.01874572 | 0.017624025 |
| 0.018593999 | 0.018413773 | 0.017544951 | 0.018184241 | 0.000560927 | 0.018745168 | 0.017623314 |
| 0.018593332 | 0.018413261 | 0.017544212 | 0.018183601 | 0.000561 | 0.018744601 | 0.017622602 |
| 0.018592689 | 0.018412754 | 0.01754347 | 0.018182971 | 0.000561084 | 0.018744055 | 0.017621887 |
| 0.018592026 | 0.018412253 | 0.017542733 | 0.018182337 | 0.000561159 | 0.018743497 | 0.017621178 |
| 0.018591385 | 0.018411731 | 0.017541988 | 0.018181702 | 0.000561243 | 0.018742945 | 0.017620458 |
| 0.018590733 | 0.018411253 | 0.017541256 | 0.018181081 | 0.000561324 | 0.018742405 | 0.017619756 |
| 0.018590067 | 0.018410722 | 0.017540529 | 0.018180439 | 0.000561386 | 0.018741826 | 0.017619053 |
| 0.018589424 | 0.018410215 | 0.017539777 | 0.018179805 | 0.000561477 | 0.018741282 | 0.017618328 |
| 0.01858877 | 0.018409703 | 0.017539047 | 0.018179173 | 0.000561549 | 0.018740723 | 0.017617624 |
| 0.018588113 | 0.018409204 | 0.017538309 | 0.018178542 | 0.000561628 | 0.018740169 | 0.017616914 |
| 0.018587461 | 0.018408701 | 0.017537579 | 0.018177914 | 0.000561703 | 0.018739616 | 0.017616211 |
| 0.018586814 | 0.018408189 | 0.017536841 | 0.018177261 | 0.000561782 | 0.018739064 | 0.017615499 |
| 0.018586155 | 0.018407693 | 0.017536109 | 0.018176652 | 0.000561857 | 0.01873851 | 0.017614795 |
| 0.018585507 | 0.018407186 | 0.017535374 | 0.018176022 | 0.000561936 | 0.018737959 | 0.017614086 |
| 0.018584855 | 0.018406687 | 0.017534636 | 0.018175393 | 0.000562017 | 0.018737409 | 0.017613376 |
| 0.018584207 | 0.018406173 | 0.017533906 | 0.018174762 | 0.000562091 | 0.018736853 | 0.017612671 |
| 0.018583551 | 0.018405654 | 0.017533181 | 0.018174129 | 0.000562158 | 0.018736287 | 0.01761197 |
| 0.018582914 | 0.018405166 | 0.017532434 | 0.018173505 | 0.000562252 | 0.018735756 | 0.017611253 |
| 0.018582273 | 0.018404651 | 0.017531727 | 0.018172884 | 0.000562316 | 0.0187352 | 0.017610568 |
| 0.018581612 | 0.018404158 | 0.017530991 | 0.018172254 | 0.000562393 | 0.018734647 | 0.01760986 |
| 0.018580973 | 0.018403666 | 0.017530255 | 0.018171631 | 0.000562479 | 0.01873411 | 0.017609153 |
| 0.018580325 | 0.018403158 | 0.017529532 | 0.018171005 | 0.00056255 | 0.018733555 | 0.017608455 |
| 0.018579682 | 0.018402658 | 0.017528808 | 0.018170363 | 0.000562626 | 0.018733009 | 0.017607757 |

FIG. 14 (continued)

| | | | | | | |
|---|---|---|---|---|---|---|
| 0.018579029 | 0.018402165 | 0.01752807 | 0.018169754 | 0.000562707 | 0.018732462 | 0.017607047 |
| 0.018578373 | 0.018401651 | 0.017527355 | 0.018169126 | 0.00056277 | 0.018731897 | 0.017606356 |
| 0.018577736 | 0.018401148 | 0.01752664 | 0.018168508 | 0.000562843 | 0.01873135 | 0.017605665 |
| 0.018577084 | 0.018400641 | 0.017525917 | 0.018167881 | 0.000562913 | 0.018730794 | 0.017604968 |
| 0.018576451 | 0.018400146 | 0.017525179 | 0.018167259 | 0.000563001 | 0.01873026 | 0.017604258 |
| 0.018575797 | 0.018399648 | 0.01752446 | 0.018166635 | 0.000563071 | 0.018729706 | 0.017603565 |
| 0.018575149 | 0.018399142 | 0.017523739 | 0.01816601 | 0.000563141 | 0.018729151 | 0.017602869 |
| 0.018574497 | 0.018398652 | 0.017523019 | 0.018165389 | 0.000563214 | 0.018728603 | 0.017602175 |
| 0.018573869 | 0.018398151 | 0.017522302 | 0.018164774 | 0.000563291 | 0.018728065 | 0.017601482 |
| 0.018573217 | 0.018397655 | 0.017521581 | 0.018164151 | 0.000563363 | 0.018727514 | 0.017600788 |
| 0.018572588 | 0.018397145 | 0.017520858 | 0.01816353 | 0.000563441 | 0.018726971 | 0.017600089 |
| 0.018571934 | 0.01839665 | 0.017520146 | 0.01816291 | 0.000563507 | 0.018726417 | 0.017599403 |
| 0.0185713 | 0.018396139 | 0.017519418 | 0.018162286 | 0.000563586 | 0.018725872 | 0.0175987 |
| 0.018570652 | 0.018395647 | 0.01751871 | 0.01816167 | 0.000563653 | 0.018725323 | 0.017598017 |
| 0.018569997 | 0.018395152 | 0.017517997 | 0.018161048 | 0.000563719 | 0.018724768 | 0.017597329 |
| 0.018569371 | 0.018394662 | 0.017517284 | 0.018160439 | 0.000563797 | 0.018724236 | 0.017596642 |
| 0.01856873 | 0.018394157 | 0.017516561 | 0.018159816 | 0.000563872 | 0.018723688 | 0.017595944 |
| 0.018568086 | 0.018393653 | 0.017515851 | 0.018159196 | 0.000563938 | 0.018723135 | 0.017595258 |
| 0.018567435 | 0.018393166 | 0.017515142 | 0.018158581 | 0.000564006 | 0.018722588 | 0.017594575 |

| Minimum for Run #1 | Minimum for Run #2 | Minimum for Run #3 |
|---|---|---|
| 0.018567435 | 0.018393166 | 0.017515142 |

FIG. 15A

| | A | B | C | D | E |
|---|---|---|---|---|---|
| | Exemplar # | Output1 | Without Exclusions | With Exclusions | Date |
| | 1 | 8.74365425 | 5 | 5 | 2/1/2001 |
| | 2 | 10.3300438 | 8 | 8 | 2/2/2001 |
| | 3 | 8.15869236 | 5 | 5 | 2/3/2001 |
| | 4 | 11.05756 | 12 | 12 | 2/4/2001 |
| | 5 | 10.3818951 | 7 | 7 | 2/5/2001 |
| | 6 | 11.7957258 | 14 | 14 | 2/6/2001 |
| | 7 | 10.172533 | 6 | 6 | 2/7/2001 |
| | 8 | 8.52805233 | 8 | 8 | 2/8/2001 |
| | 9 | 8.61111355 | 12 | 12 | 2/9/2001 |
| | 10 | 9.34218216 | 5 | 5 | 2/10/2001 |
| | 11 | 8.56932545 | 5 | 5 | 2/11/2001 |
| | 12 | 8.67930698 | 9 | 9 | 2/12/2001 |
| | 13 | 9.69525528 | 9 | 9 | 2/13/2001 |
| | 14 | 8.58688259 | 9 | 9 | 2/14/2001 |
| | 15 | 8.83479118 | 9 | 9 | 2/15/2001 |
| | 16 | 8.66476917 | | 7 | 2/16/2001 |
| | 17 | 10.0920296 | 4 | 4 | 2/17/2001 |
| | 18 | 8.72028637 | 3 | 3 | 2/18/2001 |
| | 19 | 7.79959631 | 15 | 15 | 2/19/2001 |
| | 20 | 8.89314938 | 8 | 8 | 2/20/2001 |
| | 21 | 9.27341366 | 3 | 3 | 2/21/2001 |
| | 22 | 8.29059219 | 11 | 11 | 2/22/2001 |
| | 23 | 8.40765476 | 8 | 8 | 2/23/2001 |
| | 24 | 11.0403557 | 23 | 23 | 2/24/2001 |
| | 25 | 10.7825413 | 8 | 8 | 2/25/2001 |
| | 26 | 9.62258244 | 16 | 16 | 2/26/2001 |
| | 27 | 9.78461647 | 7 | 7 | 2/27/2001 |
| | 28 | 10.4237928 | 13 | 13 | 2/28/2001 |
| | 29 | 12.4851465 | 13 | 13 | 3/1/2001 |
| | 30 | 12.052948 | 12 | 12 | 3/2/2001 |
| | 31 | 14.4517241 | 5 | 5 | 3/3/2001 |
| | 32 | 24.4035835 | 14 | 14 | 3/4/2001 |
| | 33 | 31.5893536 | 30 | 30 | 3/5/2001 |
| | 34 | 24.5112019 | 14 | 14 | 3/6/2001 |
| | 35 | 9.14293671 | 6 | 6 | 3/7/2001 |

FIG. 16D

Prediction = 16

| N | %P N or Fewer | %P N or more |
|---|---|---|
| 5 | 2.17 | 100.00 |
| 6 | 4.35 | 97.83 |
| 7 | 6.52 | 95.65 |
| 8 | 8.70 | 93.48 |
| 9 | 13.04 | 91.30 |
| 10 | 15.22 | 86.96 |
| 11 | 21.74 | 84.87 |
| 12 | 26.09 | 78.26 |
| 13 | 34.78 | 73.91 |
| 14 | 45.65 | 65.22 |
| 15 | 47.83 | 54.35 |
| 16 | 58.70 | 52.17 |
| 17 | 60.87 | 52.17 |
| 18 | 71.74 | 39.13 |
| 19 | 78.26 | 28.26 |
| 20 | 82.61 | 21.74 |
| 21 | 86.96 | 17.39 |
| 22 | 91.30 | 13.04 |
| 23 | 95.65 | 8.70 |
| 25 | 97.83 | 4.35 |
| 37 | 100.00 | 2.17 |

FIG. 17
| MA | Date | Max Temp | Min Temp | Avg Temp | Avg Dew | Rain | Avg StPR | 5SMaxS | 2MMaxS | 2MMaxD | Lightning Strikes |
|---|---|---|---|---|---|---|---|---|---|---|---|
| BV | 2/1/2001 | 80 | 62 | 71 | 64 | 0 | 30.05 | 16 | 15 | 5 | 0 |
A
| Exemplar # | Output1 |
|---|---|
| 1 | 14.4517241 |
| 2 | 24.4736214 |
| 3 | 31.9973412 |
| 4 | 25.1667843 |
| 5 | 9.22947407 |
| 6 | 10.6609602 |
| 7 | 9.69117737 |
| 8 | 10.3598309 |
| 9 | 9.25714397 |
| 10 | 11.3376131 |
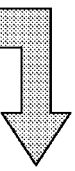
B
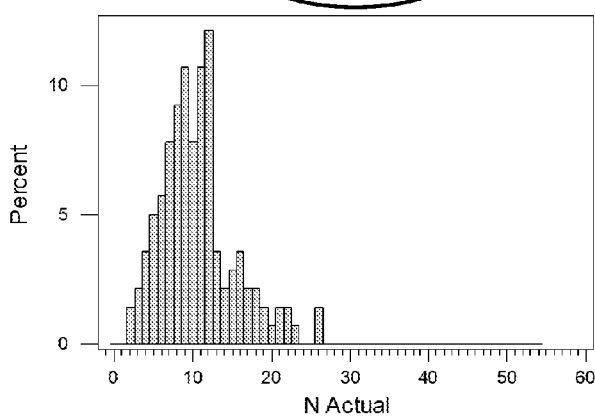
Prediction = 10
C
| N | %P N or Fewer | %P N or more |
|---|---|---|
| 2 | 1.43 | 100.00 |
| 3 | 3.57 | 98.57 |
| 4 | 7.14 | 96.43 |
| 5 | 12.14 | 92.86 |
| 6 | 17.86 | 87.86 |
| 7 | 25.71 | 82.14 |
| 8 | 35.00 | 74.29 |
| 9 | 45.71 | 65.00 |
| 10 | 53.57 | 54.29 |
| 11 | 64.29 | 46.43 |
| 12 | 76.43 | 35.71 |
| 13 | 80.00 | 23.57 |
| 14 | 82.14 | 20.00 |
| 15 | 85.00 | 17.86 |
| 16 | 88.57 | 15.00 |
| 17 | 90.71 | 11.43 |
| 18 | 92.86 | 9.29 |
| 19 | 94.29 | 7.14 |
| 20 | 95.00 | 5.71 |
| 21 | 96.43 | 5.00 |
| 22 | 97.86 | 3.57 |
| 23 | 98.57 | 2.14 |
| 26 | 100.00 | 1.43 |
D

|  | 1 | 2 | 3 | 4 | 5 |
|---|---|---|---|---|---|
| Constant | 0.000 | 0.010 | 0.183 | 0.000 | 0.000 |
| HD | 0.719 | 0.000 | 0.795 | 0.003 | 0.003 |
| $HD^2$ | 0.633 | 0.000 | 0.141 | 0.013 | 0.039 |
| CD | 0.545 | 0.230 | 0.869 | 0.153 | 0.910 |
| $CD^2$ | 0.003 | 0.105 | 0.035 | 0.210 | 0.003 |
| R1 | 0.001 | 0.000 | 0.000 | 0.000 | 0.000 |
| R2 | 0.000 | 0.000 | 0.000 | 0.000 | 0.000 |
| R3 | 0.000 | 0.000 | 0.000 | 0.140 | 0.000 |
| S | 0.000 | 0.083 | 0.459 | 0.000 | 0.004 |
| $S^2$ | 0.000 | 0.057 | 0.079 | 0.000 | 0.008 |
| $S^3$ | 0.003 | 0.210 | 0.000 | 0.002 | 0.075 |
| LS | 0.000 | 0.000 | 0.000 | 0.000 | 0.000 |

ELECTRIC POWER DISTRIBUTION INTERRUPTION RISK ASSESSMENT CALCULATOR

CROSS REFERENCE TO RELATED APPLICATIONS

This application is a continuation-in-part to co-pending U.S. patent application Ser. No. 12/108,975, filed Apr. 24, 2008, the contents of which are herein incorporation by reference, which application claims priority to U.S. Provisional Patent Application 60/913,689, filed Apr. 24, 2007, the contents of which are herein incorporated by reference.

FIELD OF INVENTION

This invention relates to the effects of the weather on electrical power distribution systems. Specifically, the risk of interruption of electrical power distribution caused by common weather conditions.

BACKGROUND

The reliability of power distribution systems is dependent on many variables such as load capacity, customer base, maintenance, and age and type of equipment. However, the variable that is most often responsible for degraded reliability is weather, and common weather conditions are often overlooked in reliability analysis. These conditions include, but are not limited to, rain, wind, temperature, lightning, humidity, barometric pressure, snow, and ice.

Common weather does not include catastrophic events, such as hurricanes or tornados, which exceed reasonable design or operational limits of the electric power system. There are existing methods that define major reliability events, including catastrophic weather events and that exclude the resulting interruptions from the calculation of reliability indices.

Much of the focus of modeling the effects of weather on power distribution systems has remained on extreme weather conditions. There are also existing methods that include weather as a factor in the analysis of specific fault causes. However, methods that use the combined effects of common weather conditions to predict the total number of daily or by shift interruptions are not presently available.

There is a need for methods that can predict daily or by shift power distribution system interruptions based on common weather conditions, and for interruption risk assessment based on immediate weather conditions.

SUMMARY

The present invention includes a method of predicting the total number interruptions in a given region caused by the combined effect of various weather conditions. Research that utilizes daily, by shift, and hourly weather data to predict the number of interruptions in a region has never been done before.

The invention includes a method of predicting the power distribution interruptions in a given region based on common weather conditions and assessing the risk of interruptions based on immediate weather conditions. Using daily and hourly weather data, the method predicts the number of daily or by shift interruptions.

The common weather conditions addressed include, but are not limited to, rain, wind, temperature, lightning, humidity, barometric pressure, snow, and ice. These conditions do not occur simultaneously at any one place, and the range of combinations is great; therefore, the invention was developed to allow broad application.

BRIEF DESCRIPTION OF THE DRAWINGS

For a fuller understanding of the invention, reference should be made to the following detailed description, taken in connection with the accompanying drawings, in which:

FIG. 7 is a partial screen shot of an exemplary 'Data' sheet of an exemplary application of the present invention in Microsoft Excel®.

FIG. 8 is a table of exemplary input variables for use in the predictor method according to an embodiment of the present invention.

FIGS. 10A-10D are charts showing an exemplary set of equations used to develop the breadboard of the predictor method according to an embodiment of the present invention.

Figure 12:
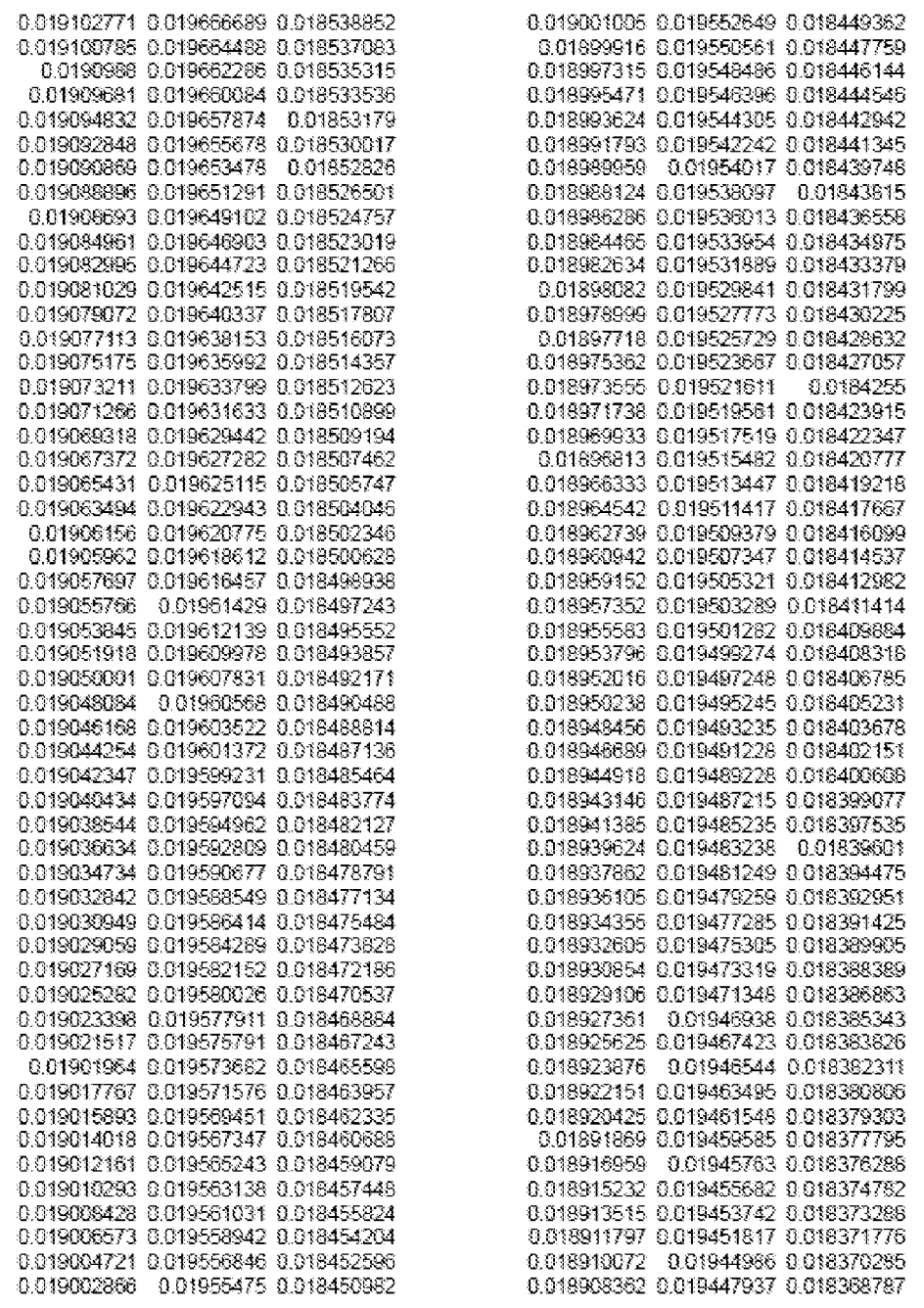
Figure 12:
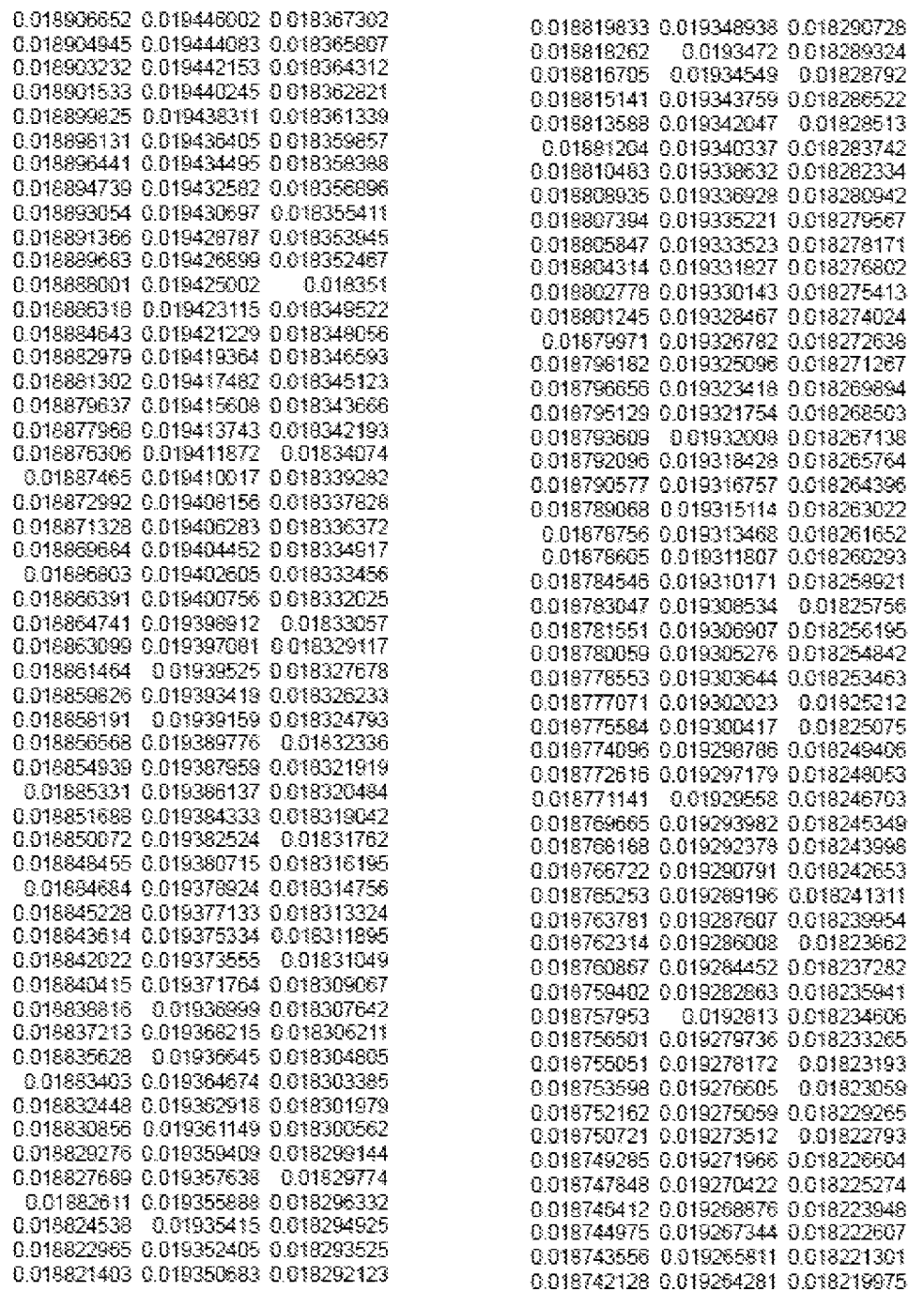
Figure 12:
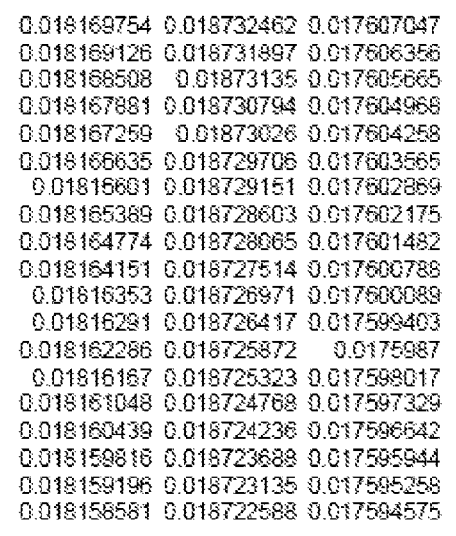
Figure 14:
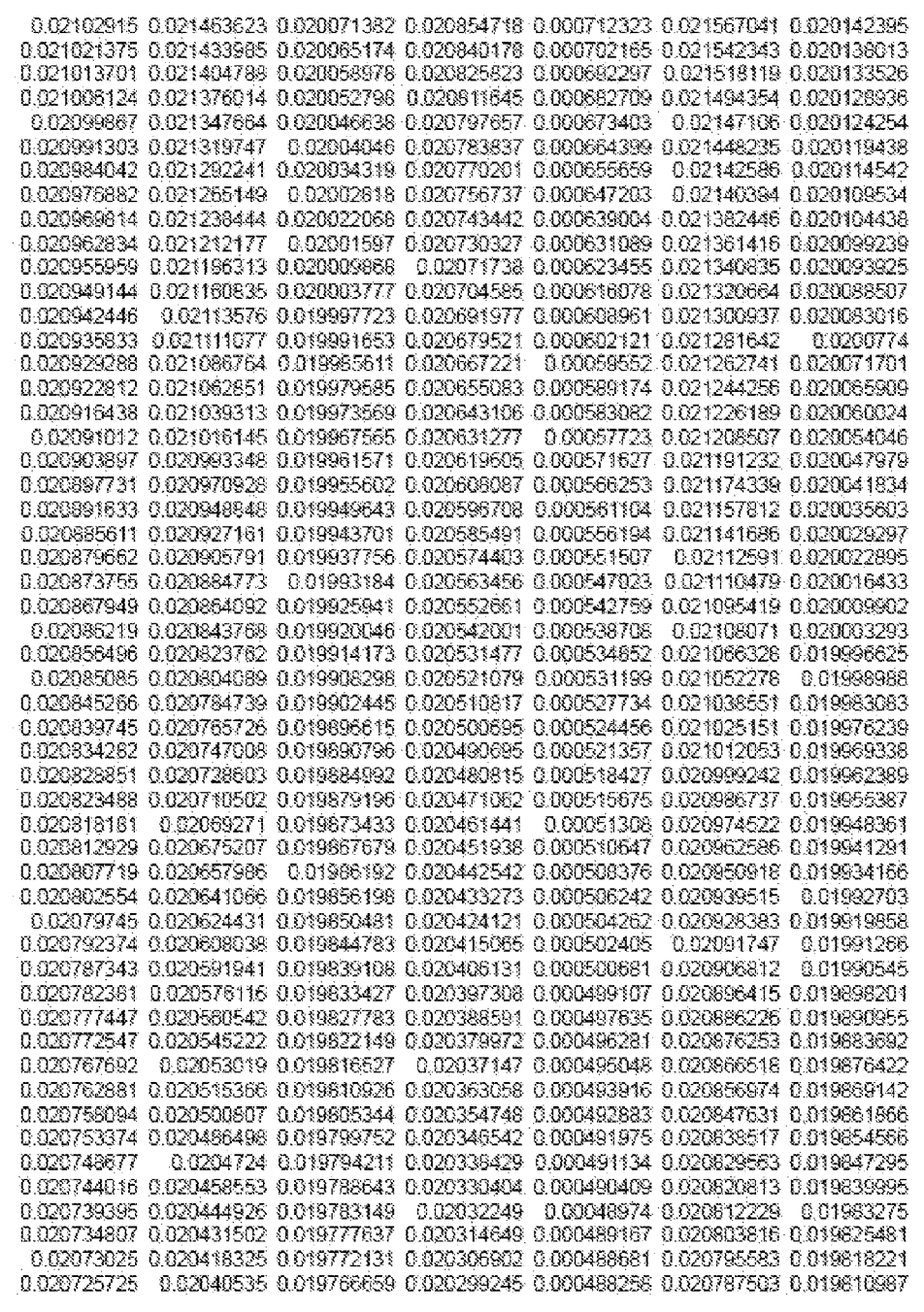
Figure 14:
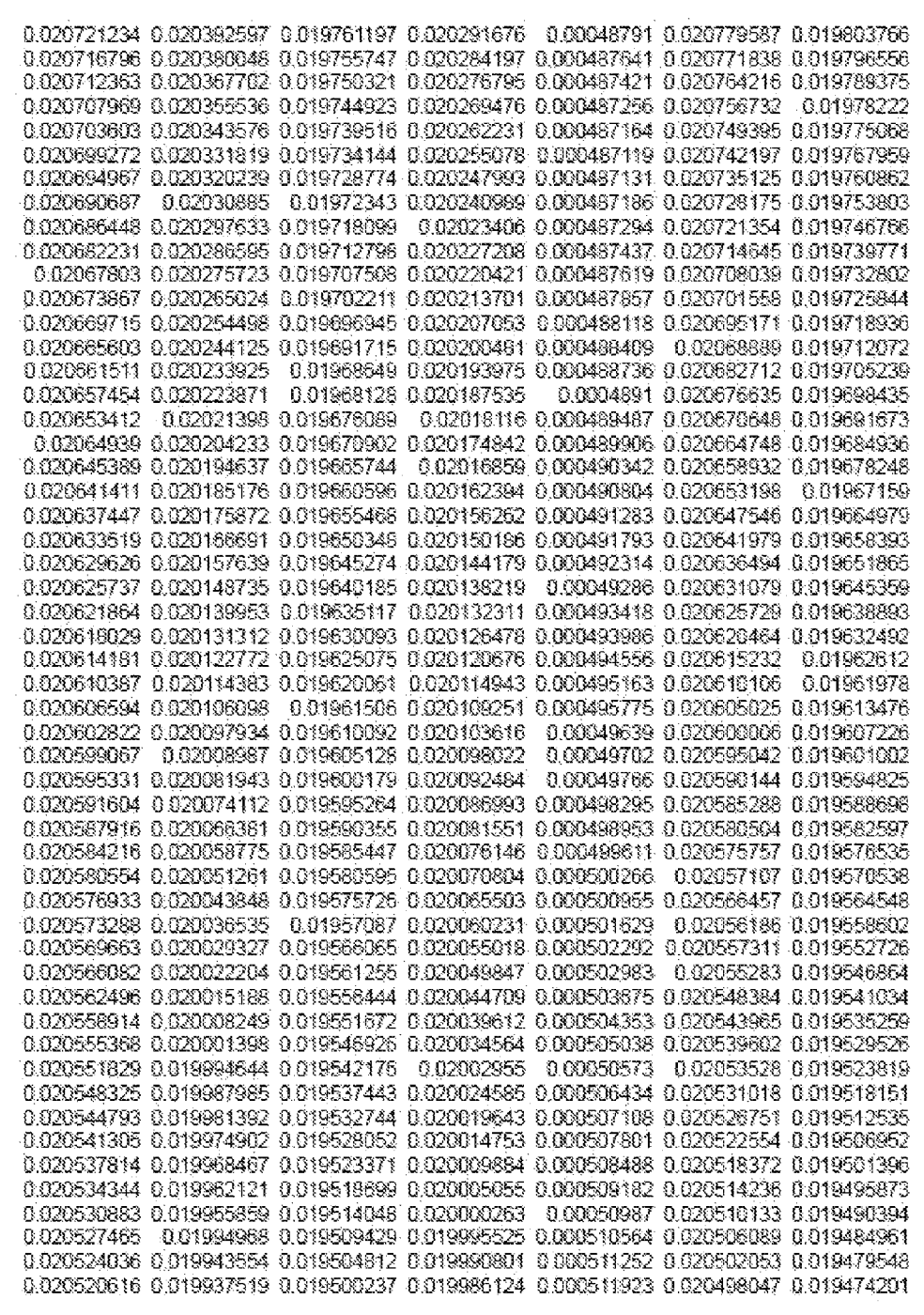
Figure 14:
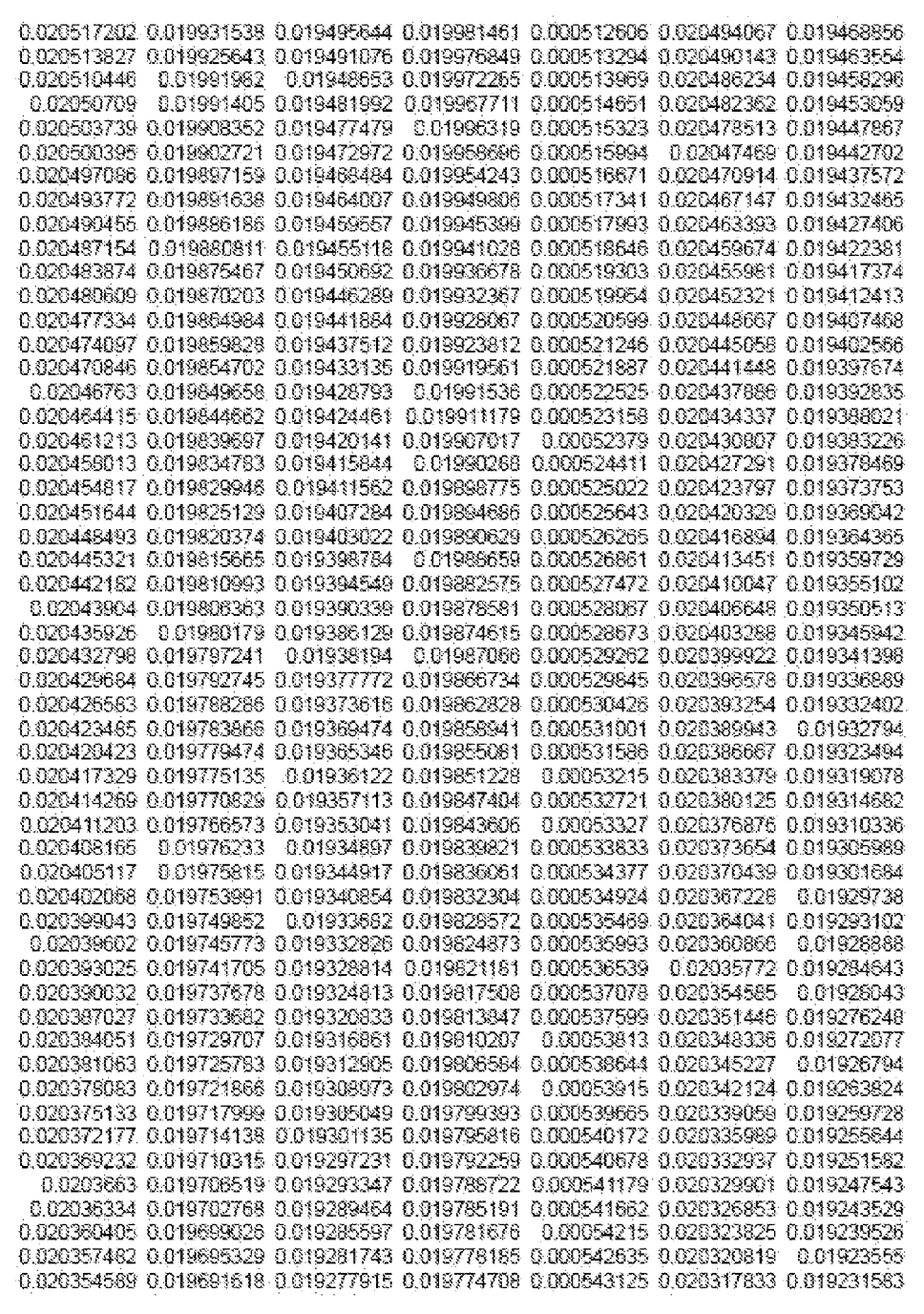
Figure 14:
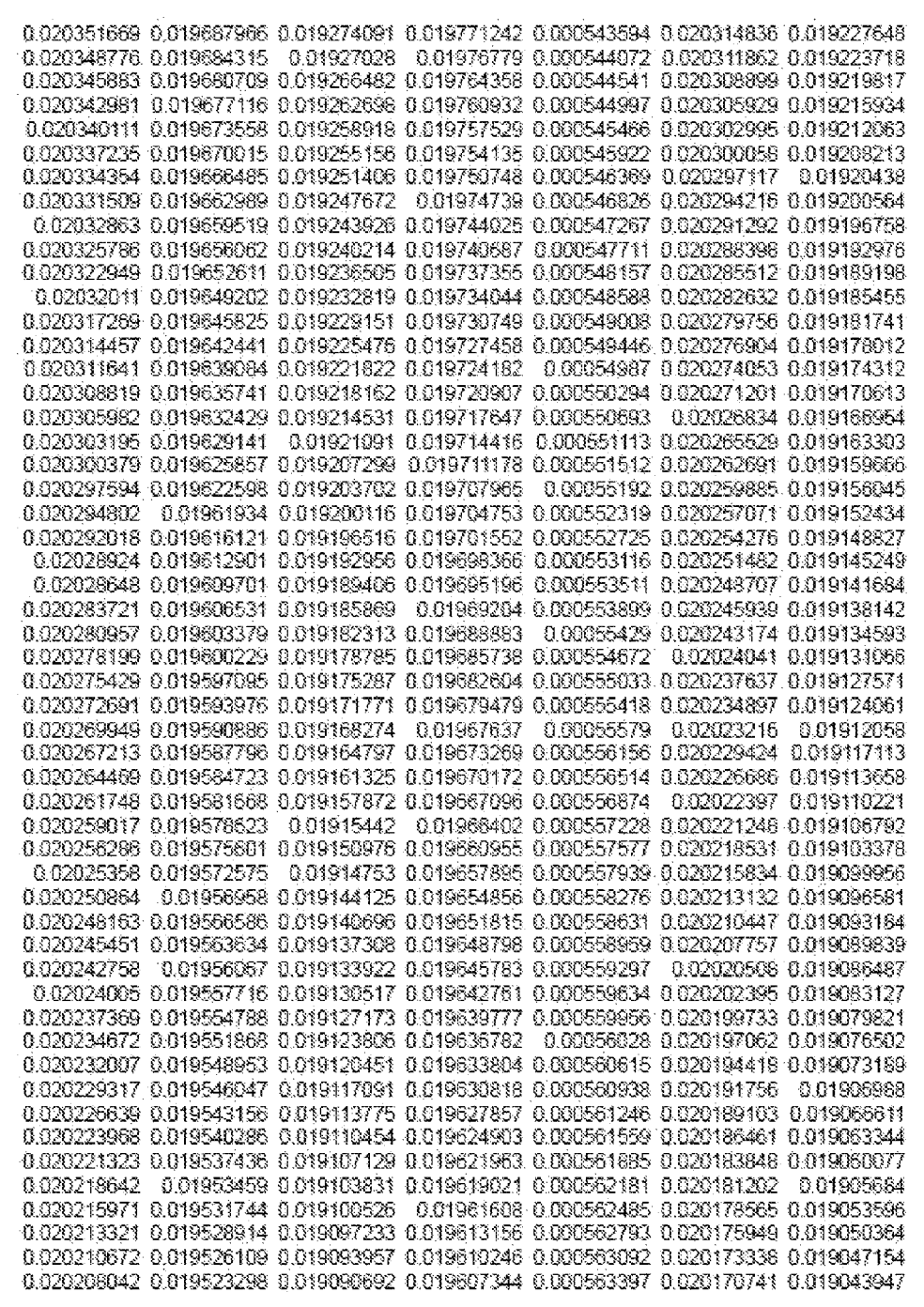
Figure 14:
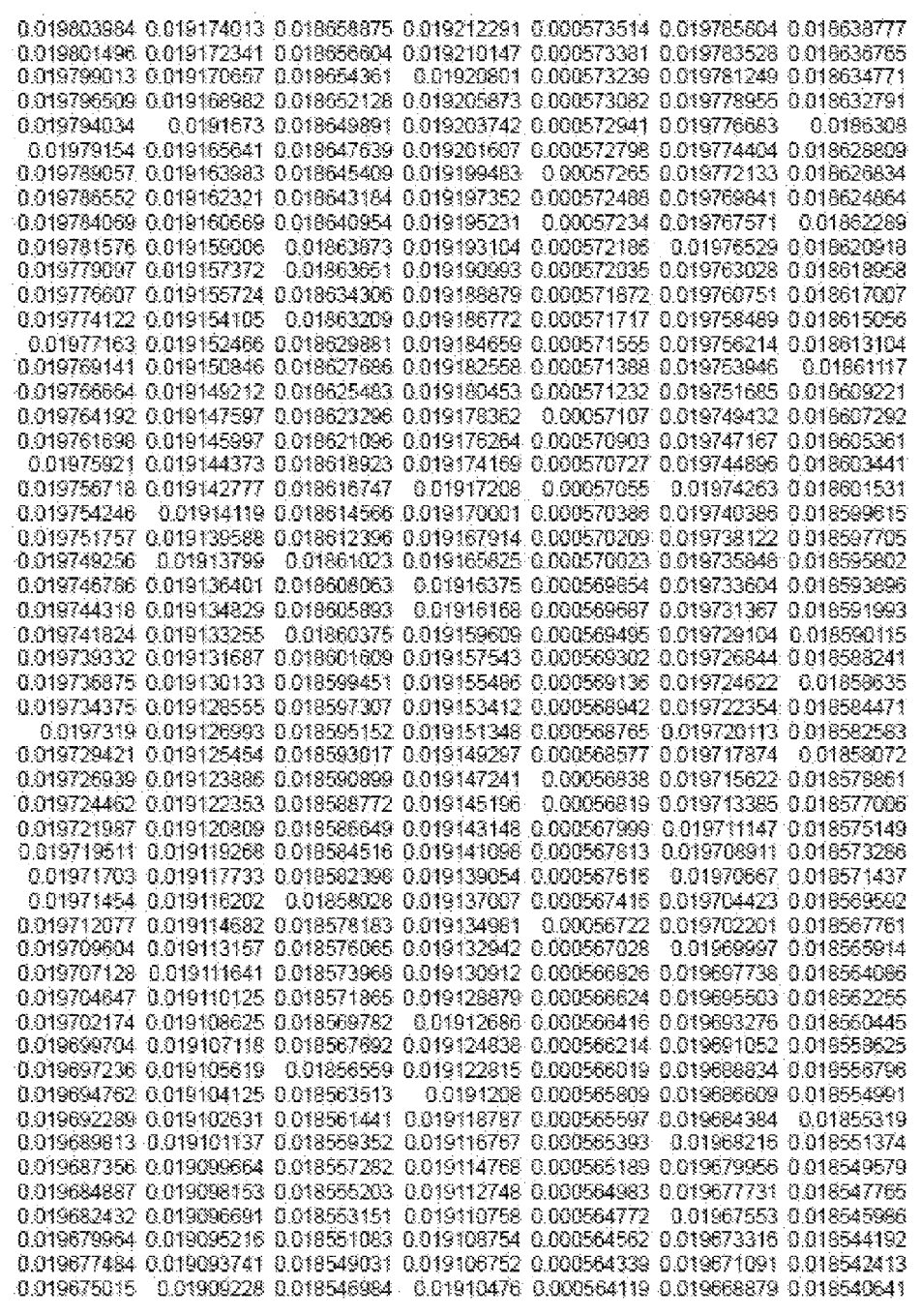
Figure 14:
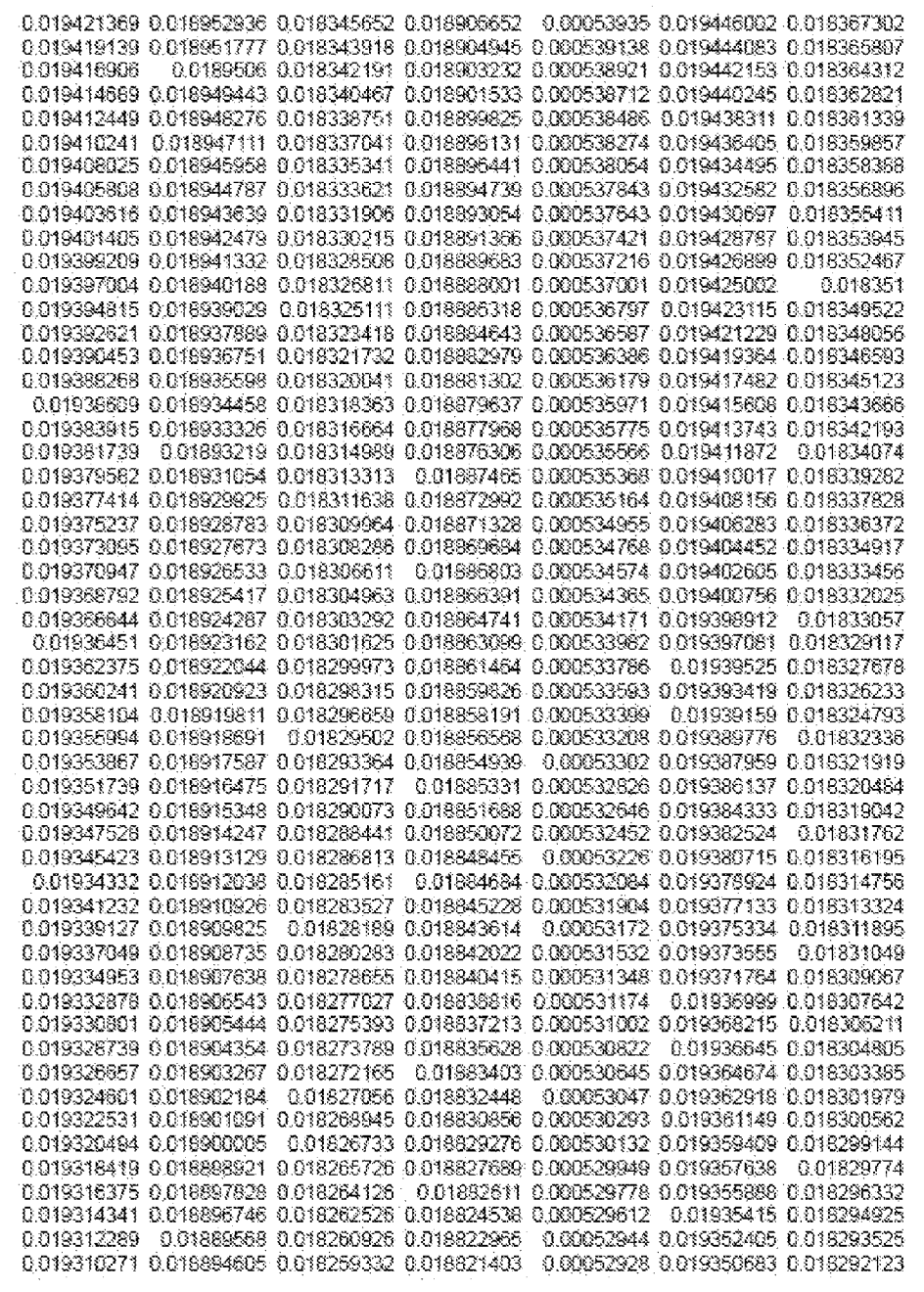
Figure 14:
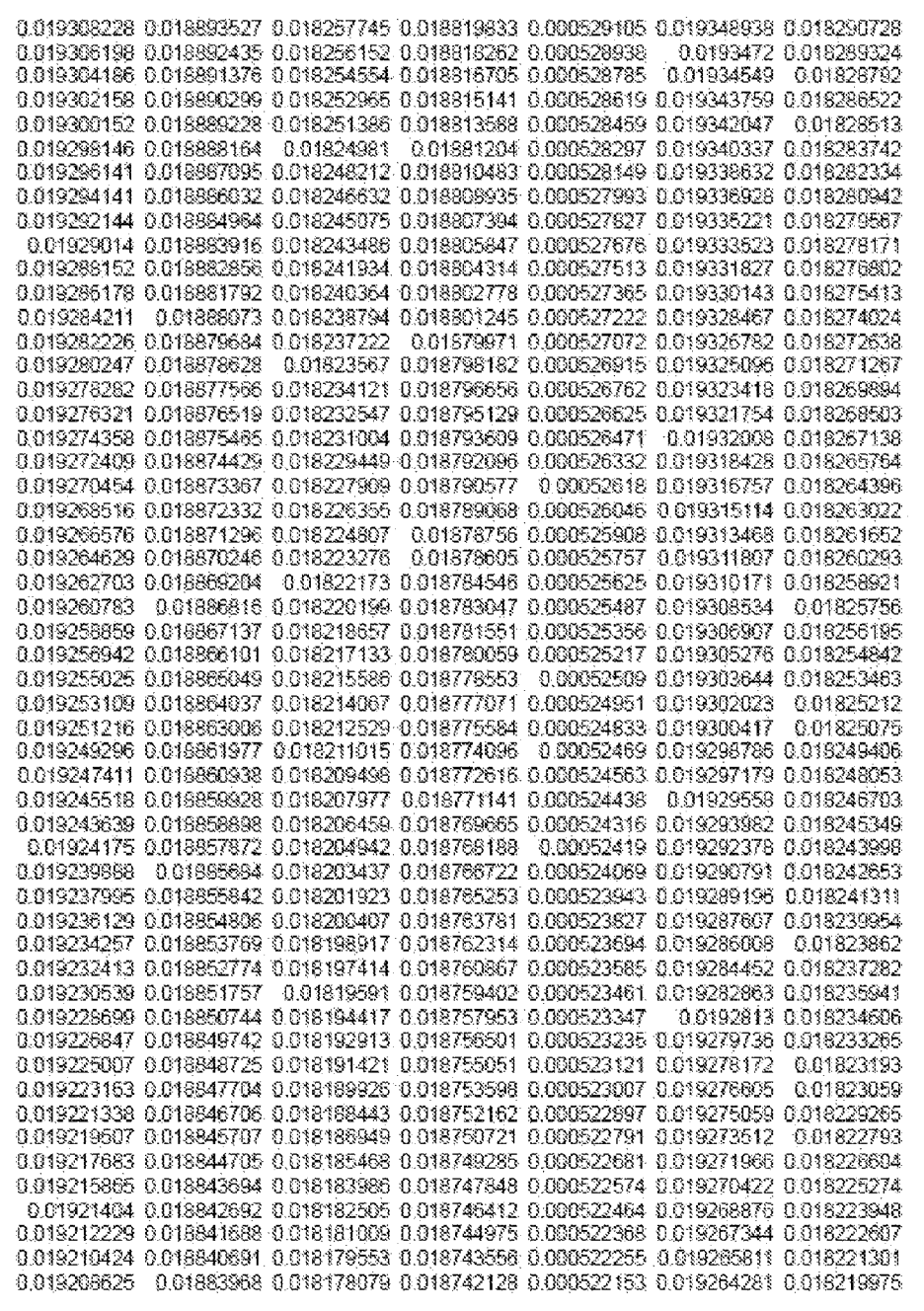
Figure 14:
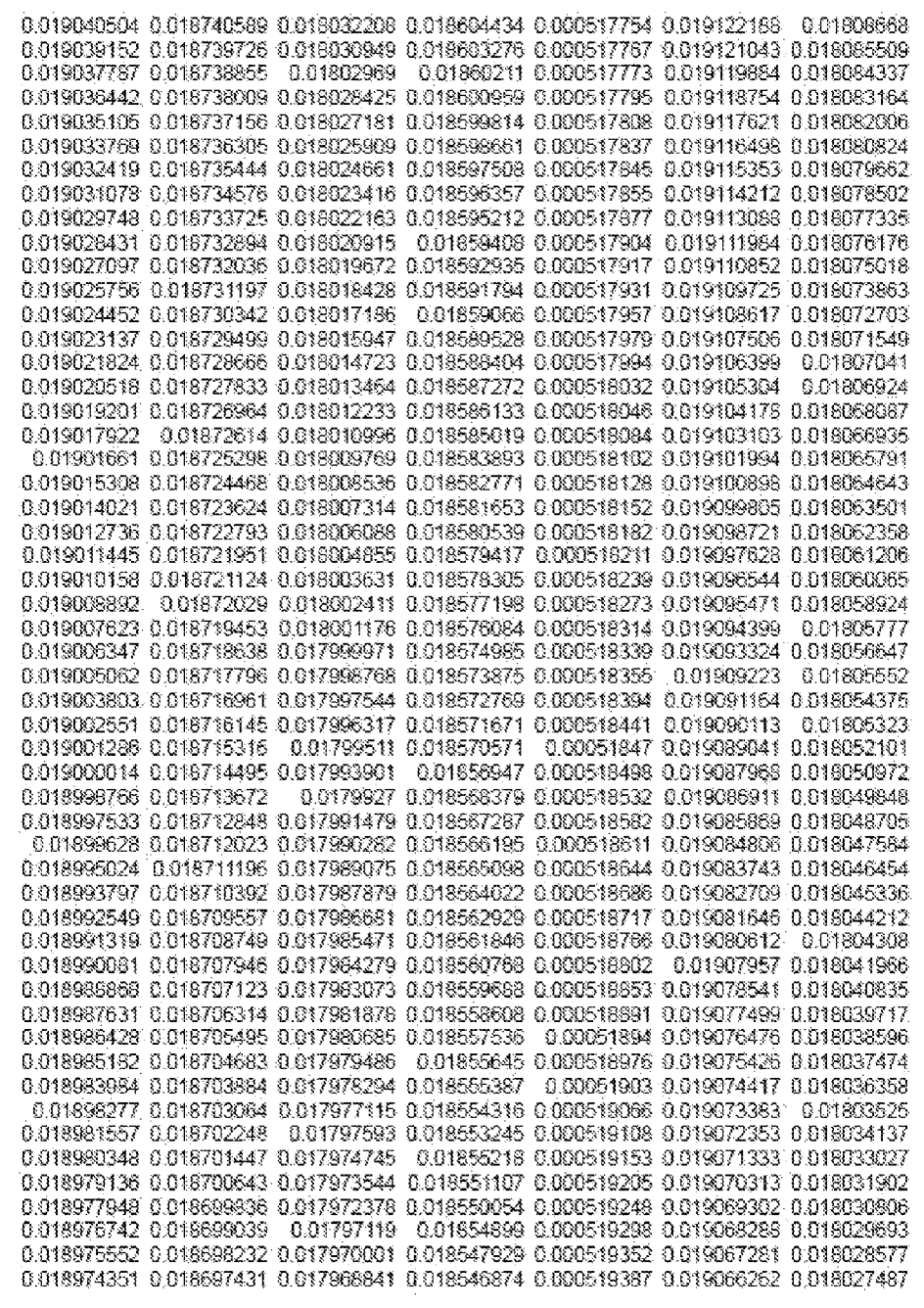
Figure 14:
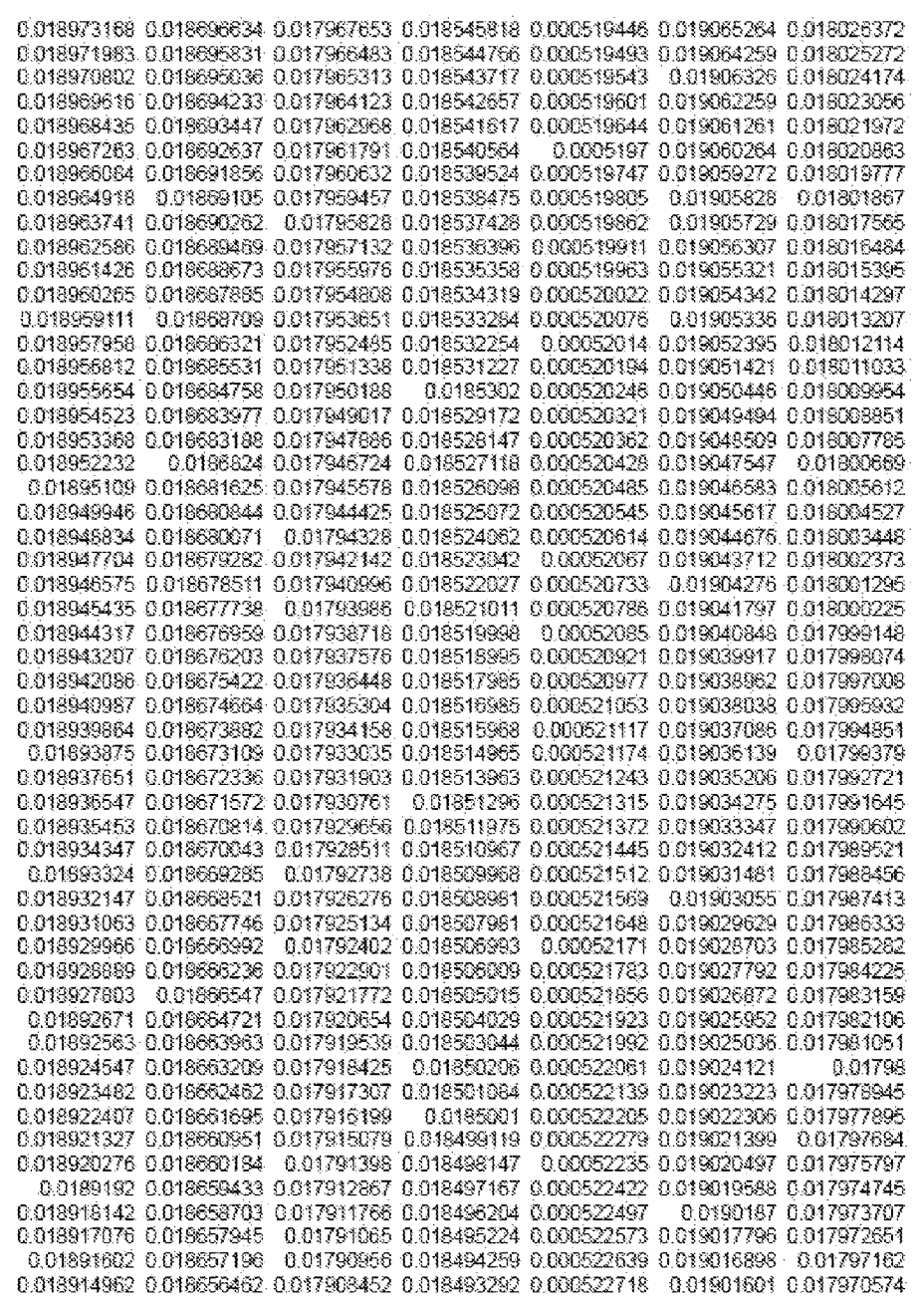
Figure 14:
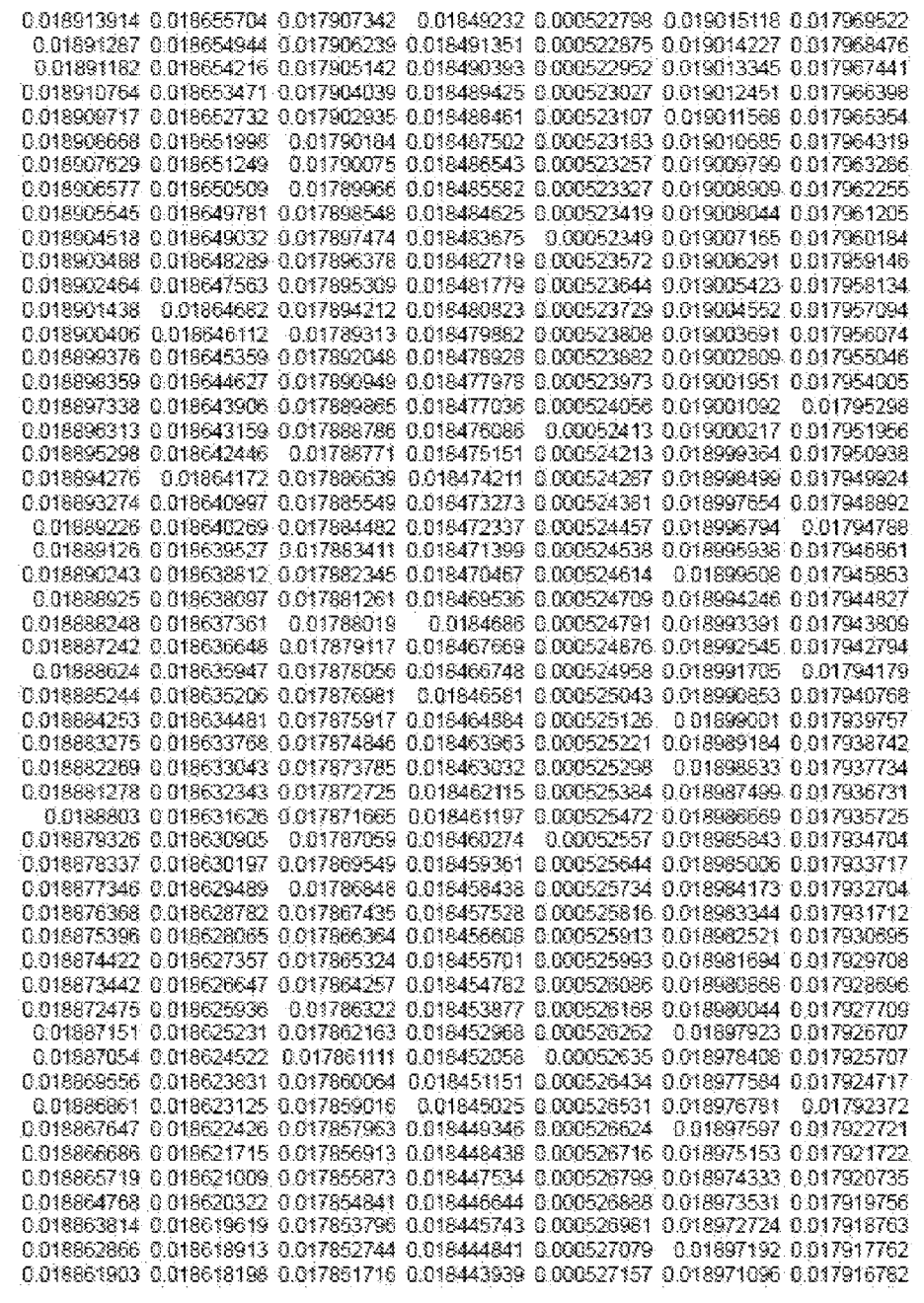
Figure 14:
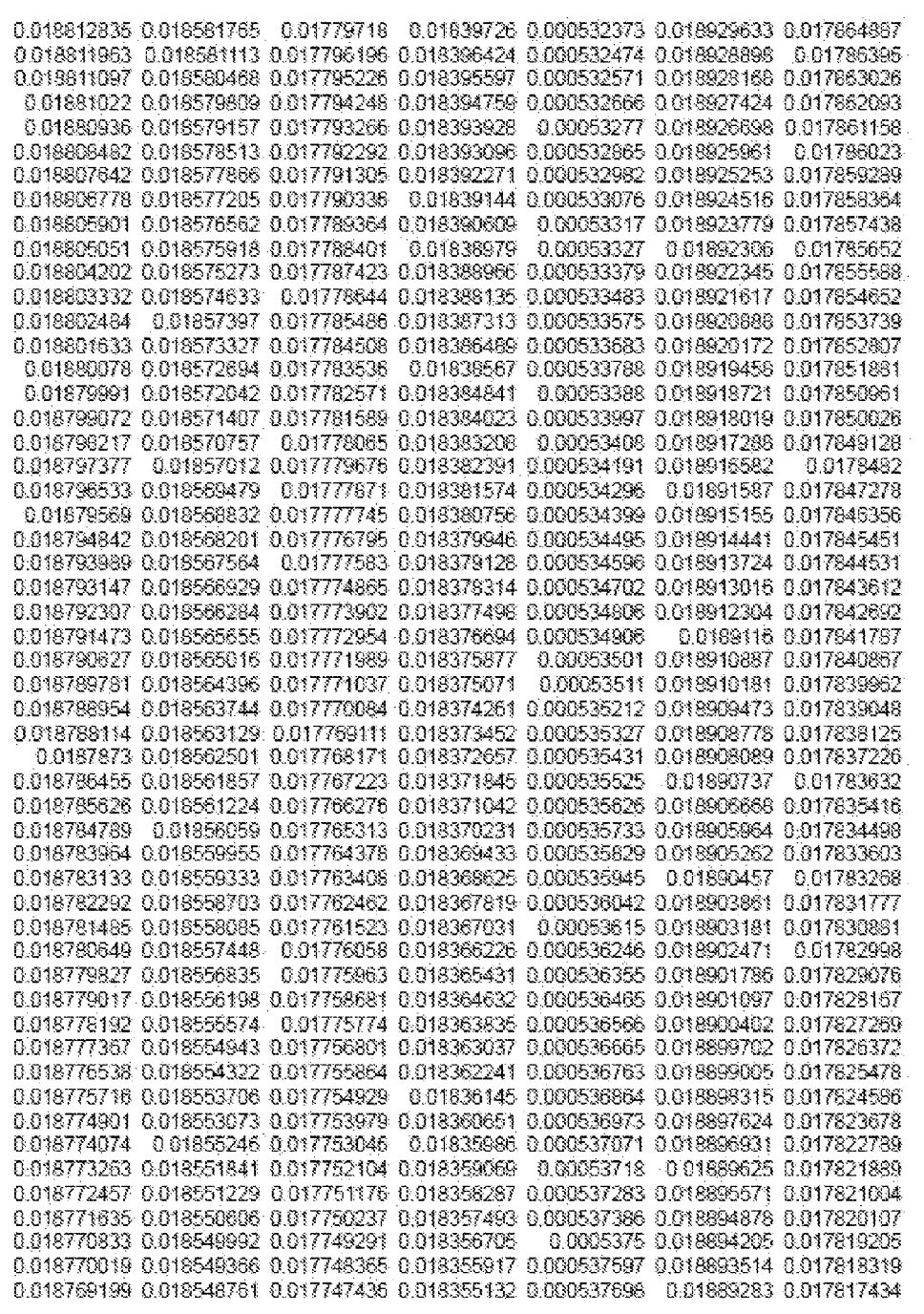
Figure 14:
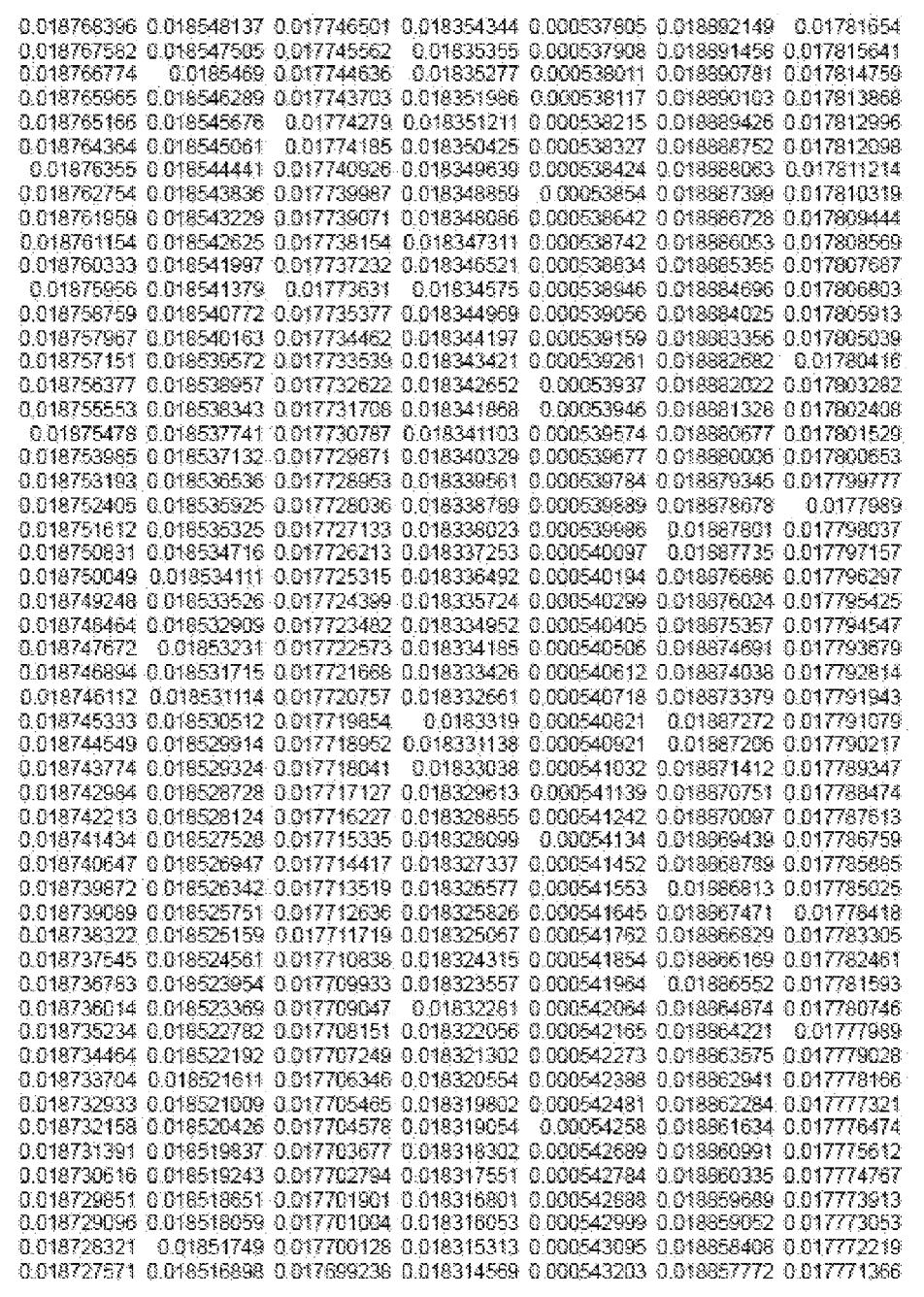

FIGS. 11-14 are graphs and charts that are generated when inputs are processed through the developed breadboards.

FIG. 15A-15B are a series of exemplary partial screen shots of the 'Output' sheet of an application of the present invention in Microsoft Excel®.

FIG. 16A-16D are a series of exemplary screen shots of the 'Comparison' sheet of an application of the present invention in Microsoft Excel®.

FIG. 17A-17D are a series of exemplary screen shots of an application of the present invention in Microsoft Excel®.

DETAILED DESCRIPTION

Figure 1:
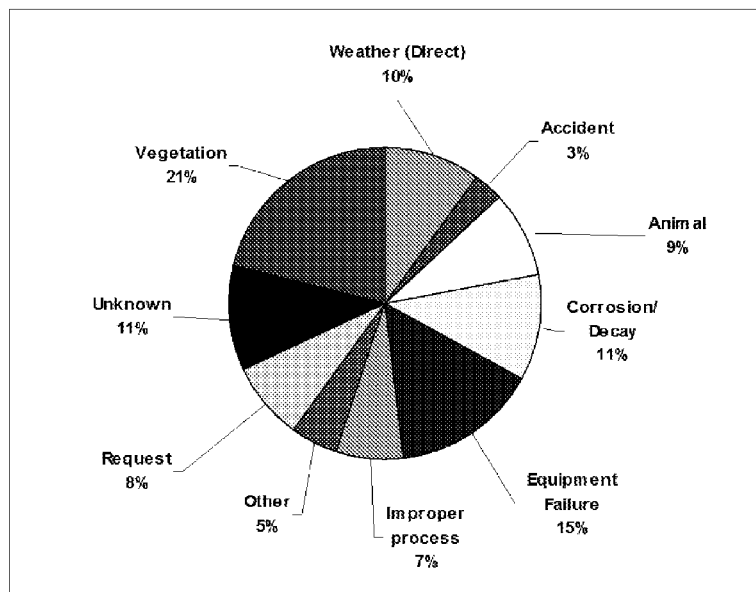
FIG. 1 is a pie chart that shows the distribution of reported causes of interruptions for the region under study during the period of study.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Power interruption data was provided by a utility company and weather data from the National Climatic Data Center (NCDC) was used for creation and testing of the present invention. The NCDC weather data is reported by 886 Automated Surface Observation Stations (ASOSs) located at airports around the country.

By modeling the daily common weather data received from the NCDC, the total daily number of interruptions can be consistently stochastically predicted with an $R^2$ value as high as 50% in simulations using actual interruption data as the target value (see A. Domijan, Jr., A. Islam, W. S. Wilcox, R. K. Matavalam, J. R. Diaz, L. Davis, and J. D'Agostini, "Modeling the Effect of Weather Parameters on Power Distribution Interruptions" presented at the $7^{th}$ TASTED Int. Conf. Power and Energy Systems, Clearwater Beach, Fl, USA, November 2004; which is incorporated herein by reference). This indicates weather invisibly affects other interruption causes.

Aside from the obvious culprit for interruptions, lightning and ground or line-to-line faults caused by vegetation and/or wind, the effects of common weather conditions on power reliability events has rarely been addressed. When such effects have been studied, only broad attention has been given to common weather conditions. Previous studies have been limited to a few factors such as cold temperatures, wind, or rain. Tests performed on contaminated insulators have shown the electrical characteristics of the insulators are altered when exposed to natural wetting, such as humidity or rain. Coronal effects are more pronounced with lower barometric pressure and can affect flashover rates. Other weather or environmental phenomenon may also contribute to power reliability events in ways that have not been considered.

Because the interruption data used to generate the existing methods included all interruptions described by all interruption causes for an entire day and the weather data used was daily maximums or averages collected from point sources not usually central to the area being studied, the existing methods were created based on relatively inaccurate data. The fact that the results were consistently good indicates that there is a hidden weather component in many of the interruption causes other than weather and those hidden components can be modeled more precisely by decreasing the period during which the weather data is collected from daily to hourly and by improving the location of the point weather source.

The present invention translated NCDC data and the utility company interruption data into the proper shapes and findings to create a method of predicting the reliability of power distribution systems, including predicting the number of interruption in a system over the course of a shift or day and assessing the risk of interruption, in real-time, in a given region.

Analysis and Processing

The utility company provided reliability data for three consecutive years. The NCDC provides daily, hourly, and half-hourly weather data. The NCDC collects its data from ASOSs located at airports around the country, Weather Observation Stations (AWOSs), and smaller weather observation stations.

FIG. 1 is a pie graph of reported interruption causes. The graph shows that direct weather, such as lightning, has been determined to be the cause of 10% of the interruptions. However, the inventors have found that, by considering daily weather variables in the modeling function, the resulting forecasts of the daily number of interruptions can be stochastically predicted with an $R^2$ value in the neighborhood of 50% in simulations using actual interruption data as the target value. This indicates that there is a weather component in most, if not all, of the interruption causes illustrated in FIG. 1. Additionally, many of the interruption causes are directly affected by weather, such as vegetation growth, corrosion, equipment failure, etc. Time-series analyses have shown promise for the use of daily weather data to predict vegetation related interruptions.

The present inventions improves reliability assessments first by using hourly (or half-hourly) weather data, and reorganizing the interruption data that is reported by substations into datasets that are geographically centered on ASOSs.

The daily summary data used in developing and testing the method often created files with up to 40 columns and 14,000 rows for analysis. The inclusion of hourly reporting and the use of interruption data from additional sources increased the amount of data that required archiving and correlation tremendously. Therefore, a database was created that could manage the large amount of data. Additionally, the weather data available from the NCDC is in ASCII format and was not readily importable to the analysis software. Custom software was created to extract the daily weather information from the NCDC files and format it properly. Additional software was also created to handle the hourly and half-hourly NCDC data, the weather data provided by the utility company's weather stations, and all other required data.

Load flow prediction that involves the use of temperature and humidity to calculate the comfort zone is a mature technology that was of use in this project and these studies were not repeated. The probability of flashover due to ice buildup has been studied extensively and was also of use. However, load flow prediction does not address power reliability directly, and the studies of flashovers due to ice buildup are geographically and causally specific.

Validation of the present method was done by producing significantly accurate predictions of the number and frequency of interruptions through simulations using actual weather and interruption data. The predictions are probabilistic rather than deterministic, and provide a means of risk assessment rather than a fixed value for the number of interruptions that can be expected. This provides a real capability to determine risk. The $R^2$ value of the predictions will be a statistic of interest for daily and by shift predictions. Narrower periods include hourly risk probability assessments.

Simulation for Prediction

The invention was developed using three years of daily interruption and weather data. The analysis that led to the development of the methods was performed with statistical and neural network software.

Three years of daily weather and interruption data from five Management Areas (MAs) in the utility company's area of operations was compiled, for approximately 5400 exemplars. Initial analysis was done by multivariable regression, using the total number of daily interruptions as the target value and the average temperature, the total daily rainfall, the maximum two-minute sustained wind-gust speed, and the total daily number of lightning strikes as regressors. Secondary analysis was done using a back-propagation neural network with one hidden layer for function approximation. Both analyses were done using the same training data sets to develop, in the case of the multi-variable regression, a regression equation, and in the case of the neural network, a trained network. Both the regression equation and the trained network were then applied to the same sets of test data to prevent over fitting and to simulate actual application. The actual numbers of interruptions in the test data were then used as target values in single variable linear regressions with the number of interruptions predicted by the multi-variable regression equation and the trained neural network as regressors. The statistic of interest was the $R^2$ value. The trained neural network consistently returned a higher $R^2$ value, which indicated that there were hidden effects that could be accounted for by taking into account the weather data.

Methods for modeling rain, wind, and temperature were developed. These methods were based on suspected effects, such as vegetative saturation (which would weaken tree limbs) and soil saturation (which would weaken the support of root balls), and known effects, such as the third-order equation that describes the power of wind and the quadratic load/temperature curve (this curve can also be seen in interruption/temperature plots), and further analysis of the weather and interruption data. The results were that rain was categorized as a piecewise variable, wind as a cubic variable, temperature as a quadratic variable and lightning as a linear variable.

Figure 19:
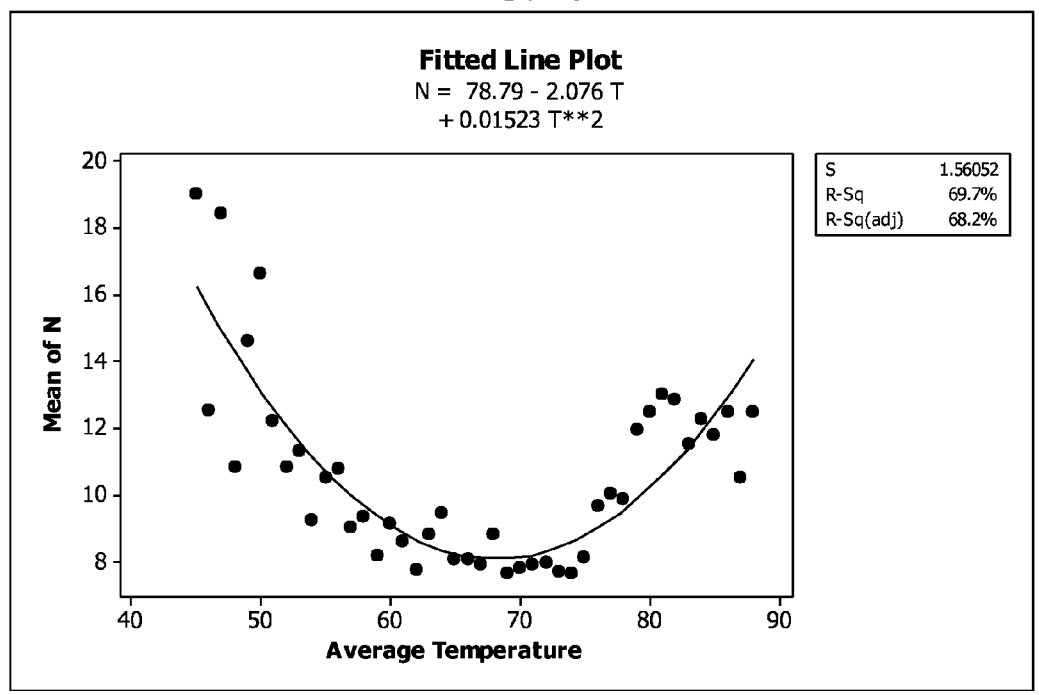
FIG. 19 is a fitted line plot of the variation of mean N verses average temperature.
Figure 20:
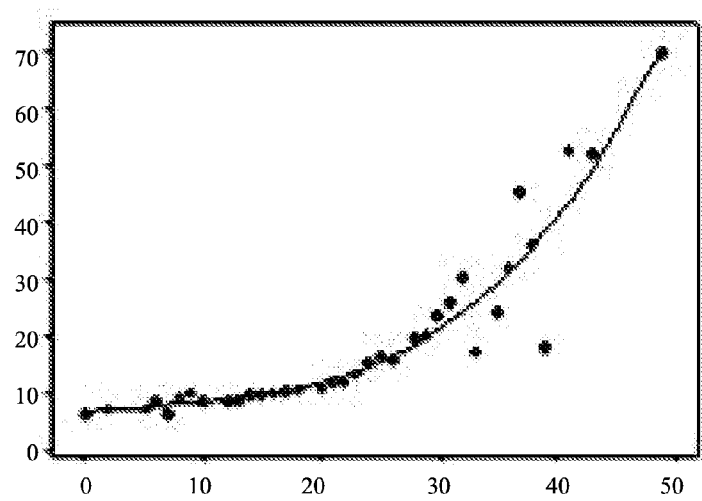
FIG. 20 is a fitted line plot of the variation of mean of N verses wind.

The average temperature shows a quadratic relationship with the mean of the number of interruptions, N. The increase in N at low and at high temperatures can be attributed to the increase in power demand due to the heating and cooling requirements of the customers. The relationship between the average temperature and the mean of N can be expressed as a regression equation drawn from the fitted line plot of FIG. 19. The equation is $N_{avg}=78.79-2.076T+0.01523T^2$, where $N_{avg}$ is the mean number of interruptions and T is the average temperature.

The temperature at which the minimum number of interruptions occurs is found by taking the derivative of the equation and setting it equal to zero. By then solving for T, a temperature of 68.15° F. The data has integer values for temperature, so the optimal temperature (OT) was considered 68°.

Because the demand for power varies with temperature, the effect of ambient temperature movement away from the optimum temperature (OT=68) was modeled. Two parameters were defined, heating degrees (HD) and cooling degrees (CD). These parameters are available with the ASOS data; however, they are fixed with an OT of 65°, so it is desirable to recalculate using local conditions. HD is defined as the number of degrees below the OT existing on a particular day, and CD is defined as the number of degrees above the OT.

This model will also have second order terms for HD and CD, as the relationship between the average temperature and N is quadratic. The model equation for average temperature is $N=Y_1+A_1HD+A_2HD^2+A_3CD+A_4CD^2$, where $A_1, A_2, A_3$ and $A_4$ are the coefficients and are not equal to zero.

FIG. 1 shows the relationship between wind speed and the mean number of interruptions in the region under study for the period spanned by the data. The scattering seen above 32 miles per hour in FIG. 30 is due to the sparse data at those speeds.

The cubic relationship between wind speed and the mean number of interruptions allow for an equation for the effect of wind on total number of interruptions as $N_{avg}=Y_3+B_1S+B_2S^2+B_3S^3$, where S is the two-minute maximum sustained gust.

The effect of rain on the mean of N showed a regression distribution, which has a piece-wise relationship. This may be due to saturation effects on the vegetation. The total range of rainfall was divided into three segments: R1=0"≤Rain<1" and 0 elsewhere, R2=1"≤Rain<2" and 0 elsewhere, and R3=2"≤Rain and 0 elsewhere. The complete dataset of rain was segmented accordingly and the regression analyses was done using the following equation for rain: $N_{avg}=Y_3+C_1R1+C_2R2+C_3R3$.

Because lightning tends to occur in storm cells that may be localized and pass over a sparsely populated area, or a heavily populated one where the majority of power lines are buried, LS can have a random, though important, effect on N. Lightning also has a combined effect as it is generally accompanied by high winds and rain. Because there was no more evidence for a narrow time-frame model of the effects of lightning, it was used as a linear predictor and represented by the equation $N_{avg}=Y_4+D_1LS$, where LS is the daily total number of lightning strikes.

The equations for temperature, wind, rain, and lightening were combined to give a composite equation for the effect of weather on N: $N=Y_6+A_1HD+A_2HD^2+A_3CD+A_4CD^2+B_1S+B_2S^2+B_3S^3+C_1R1+C_2R2+C_3R3+D_1LS$. The results were then compared with the results of a combined equation for the raw weather data, $N=Y_5+A\times T+B\times R+C\times S+D\times LS$, and the results of each of the individual temperature, wind, rain, and lightening equations.

Regression analyses were performed on each of the five MAs individually using the equations for average temperature, wind speed, rain, lightening, the combined raw weather data, and the combined modeled data. Because the $R^2$ value of the regression equation, called the multiple coefficient of determination, describes the proportion of the total variation accounted for by the predictor variables, that value was chosen as the statistic of interest.

Figure 21:
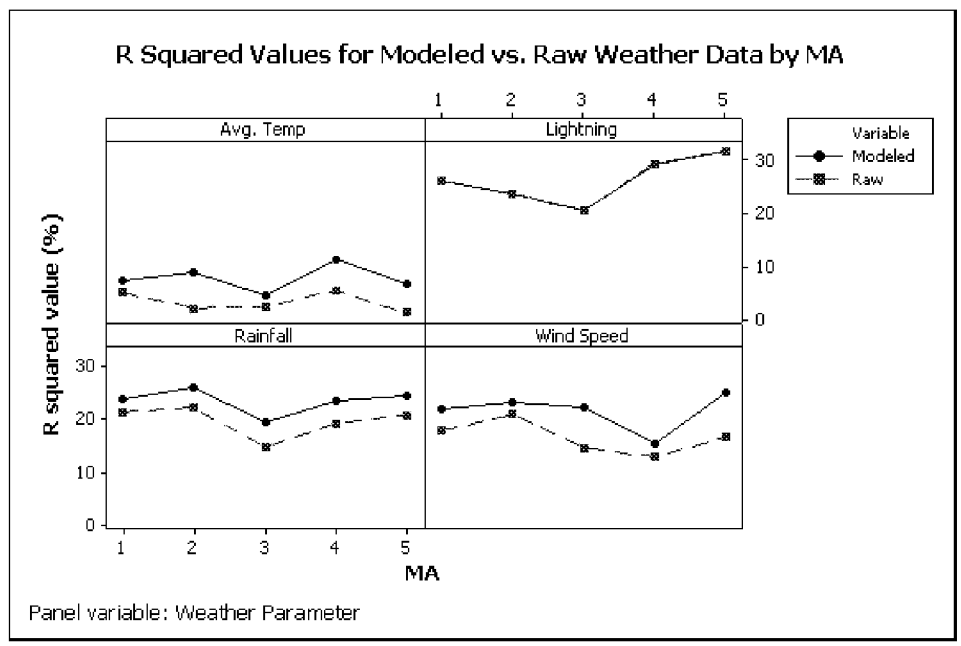
FIG. 21 is a series of four plots showing the $R^2$ values of modeled verses raw weather data by MA and by weather parameter.
Figure 22:
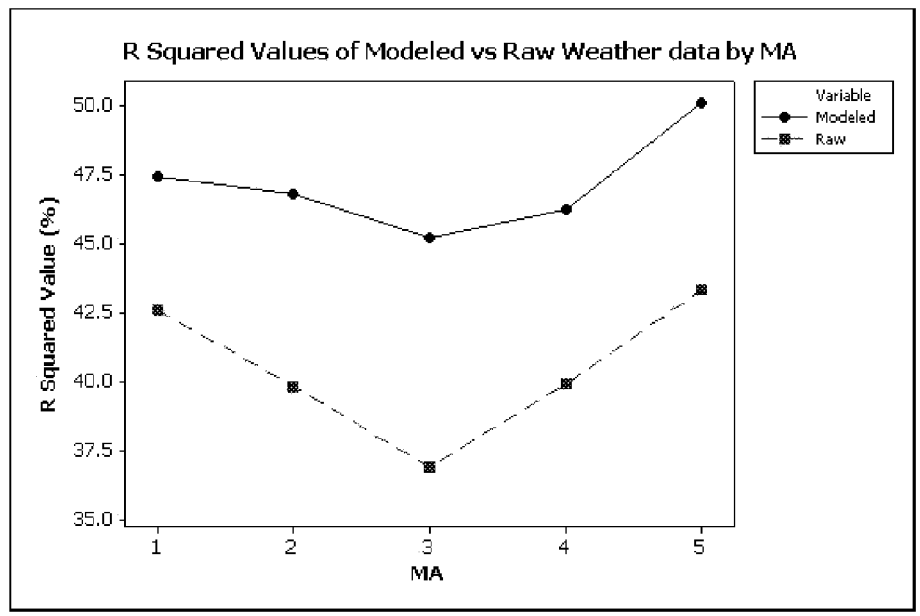
FIG. 22 is a scatter plot comparing $R^2$ values of modeled vs. raw weather data by MA.

The regression analysis on weather and N data with the raw data showed $R^2$ values ranging from 36.9% to 43.3% for different MA's. The regression analysis on weather and N data with the modeled equation showed values ranging between 45.2% and 50.1% for different MA's. Similar results occurred when applying the regression to individual weather parameters. FIGS. 21 and 22 chart the results.

To determine whether the association between the response and the predictor(s) in the equation is statistically significant, it is necessary to set an a level and compare the p-value for each predictor against the a level. The usually accepted a level is 0.050, and if the p-value is larger than this, the predictor is considered statistically insignificant. The table in FIG. 23 lists the p-values for each predictor by MA.

Figures 23, 24:
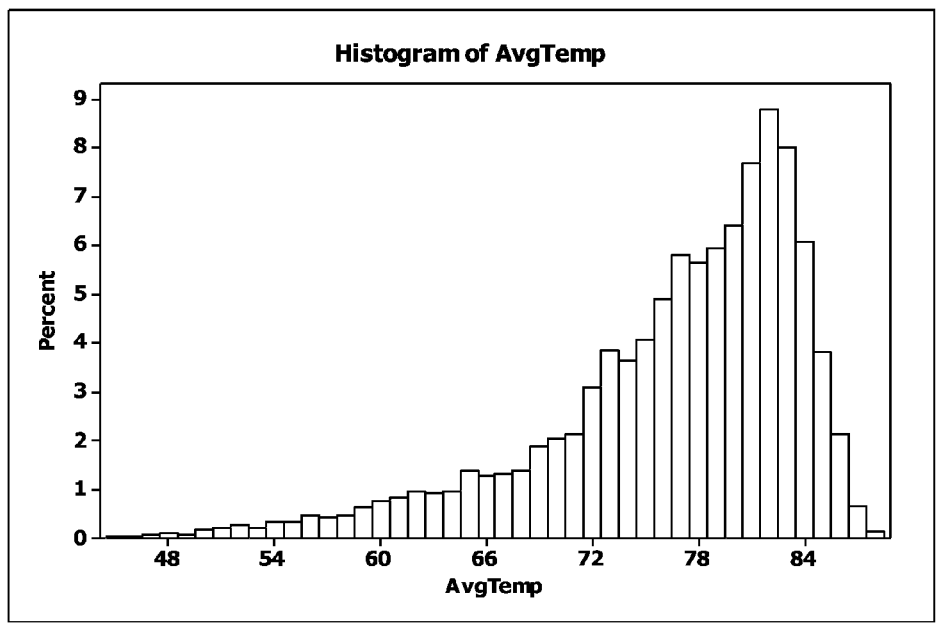
FIG. 23 is a table of p-values by predictor and by MA.
FIG. 24 is histogram of the percentage of occurrences of average temperatures.

FIGS. 22 and 23 show that the equations return a consistently higher $R^2$ value than equations that rely on raw weather data, and consequently, account for a larger percentage of the variance from the mean number of daily interruptions.

Although lightning seems to have a dominant role, there is no single weather parameter that is a primary cause. Since the $R^2$ value of the combined equation is not the sum of the $R^2$ values of its components, it is apparent that there are some combinatorial effects. For example, lightning rarely occurs unaccompanied by wind and rain, but high winds and rain occur often without lightning, so the role of lightning may be overstated by the fact that it has the largest $R^2$ value (FIG. 31) of the weather parameters in the model. Also, it appears from the $R^2$ values for average temperatures, that it does not play a significant role in N. However, the histogram of the temperatures of one region shown in FIG. 24 shows a relatively narrow range of commonly occurring temperatures, with 95% of the average temperatures ranging from 60 to 86 degrees, a 27-degree spread, which may not be true for other regions.

Explanations for large p-values can be either very small coefficients, or uncommon occurrences of that variable in the dataset. In addition, when variables have large p-values, their contribution to the $R^2$ value is marginal.

Although HD and $HD^2$ rates rejection as model predictors four out of ten times in the table in FIG. 23, FIG. 24 shows that there may not have been enough days below the OT to consider them significant. CD, however does not seem to be significant in any of the MAs. This may be due to the dominance of the second order $CD^2$ term in the heavily skewed FIG. 24. The two times that $CD^2$ is rejected, neither HD or $HD^2$ is rejected, lending support to the belief that the actual distribution of heating and cooling days among the MAs is quite different than FIG. 24 suggests.

Regardless of the possible combinatorial effects of the weather parameters, or the occasionally large p-values, the consistent improvement of the $R^2$ values, whether in isolation or in combination, in the modeled equations shows that the method is valid.

The inclusion of barometric pressure as a weather variable and recent daily interruption data as a system variable that reflects the weather trend increased the simulated $R^2$ values to an average of 50%. However, despite repeated simulations involving data sets from 14 different regions within the utility company's area of operation, and multiple year sets, the $R^2$ value ceased improving beyond 50% (average) except in occasional instances, indicating that additional variables and more precise data was needed.

Figure 2A:
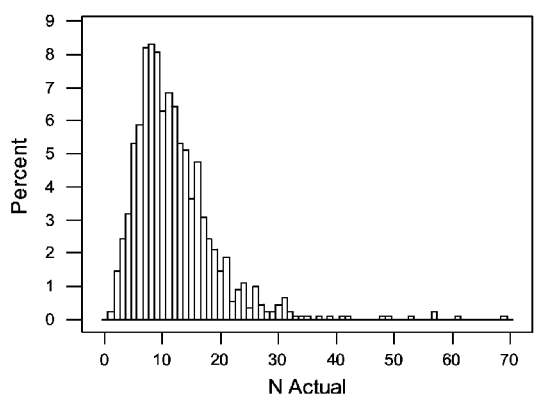
FIG. 2A is a set of histograms representing the actual number of interruptions for 1,458 days combined from several adjacent Management Areas (MAs) of the utility company.
Figure 2B:
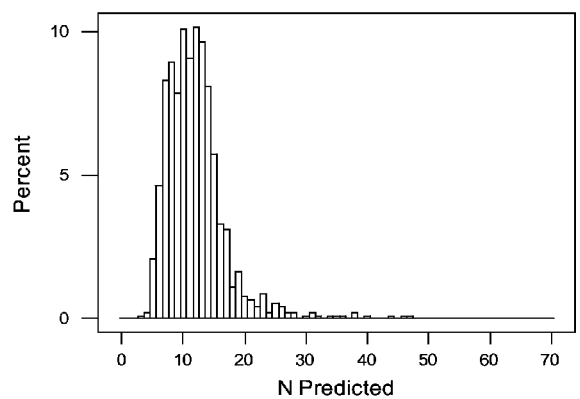
FIG. 2B is a histogram representing the predicted number of interruptions for 1,458 days combined from several adjacent MAs of the utility company.

One consistency throughout all of the simulations can be seen in the histograms of FIG. 2. FIG. 2A is a histogram actual number of daily interruptions and FIG. 2B is a histogram of the predicted number of daily interruptions. The histograms of FIG. 2 represent the predicted and actual number of interruptions for 1,458 days combined from several adjacent MAs within the utility company's area of operation. It can be seen that, although the distribution is similar, the number of lower valued predictions is much less than the number of actual lower values. This has occurred in all of the simulations. It becomes less pronounced the larger the data set becomes, as in this case, and simulations with smaller data sets will not usually predict values below five interruptions. This indicated that the model was incomplete. Either there were variables missing from the overall model that would have a negative impact on the predictions, or one or more single variable models need to be reconsidered, or both. However, the $R^2$ value for this particular simulation was 61.3%. This was much better than usual and it has been seen that increasing the size of the data set has a positive effect on the accuracy of the predictions.

Figures 3, 4:
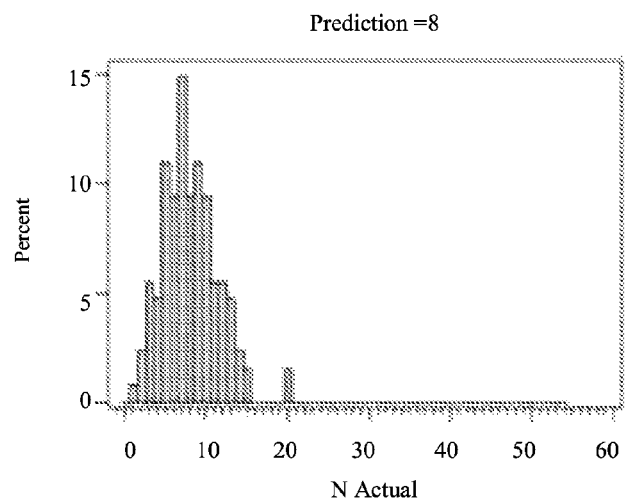
FIG. 3 is a histogram of the actual number (as a percentage) of interruptions, N, that occurred for the days when the prediction given by an embodiment of the present method was eight interruptions.
FIG. 4 is a table listing, on the left side, the cumulative probability, based on the actual number of interruptions, of N or less interruptions occurring and, on the right side, the cumulative probability of N or more interruptions occurring.

The histogram of FIG. 3 and the table of FIG. 4 were created with neural network function approximation using the same data as was used for FIG. 2 and show the probabilistic risk assessment for a prediction of eight interruptions. The histogram in FIG. 3 shows the actual number (as a percentage) of interruptions that occurred during this simulation for the days when the prediction was eight interruptions. The left side of the table of FIG. 4 lists the cumulative probability, based on the actual number of interruptions, of up to N interruptions occurring. From the table, it can be seen that, for this region, if the prediction was eight interruptions, there is a 90% confidence level that the actual number of interruptions will not be greater than 12.

The predicted value can be linked to the confidence level that is defined for a utility service area. For example, if a specific service area requires an 86% confidence level for any predicted interruption value, then, from the table of FIG. 4, it can be seen that for a predicted value of 9 interruptions, the actual value of interruptions will be anywhere between 5 and 12. Such charts (histogram and table combinations) have been developed after exhaustive studies for each service territory and the mapping is done for each predicted value. These charts then act as a lookup table for management to make a decision on each prediction for the day.

Expansion of these analyses to include hourly weather and interruption data provide information on weather variables that are not available in daily summaries such as humidity, dew point, and rain rate. As the time frame for which the modeling is performed narrows, the range over which the probability assessments shown in the table of FIG. 4 will also narrow. Additionally, real-time interruption risk assessments can be implemented based on immediate weather conditions.

Figure 5:
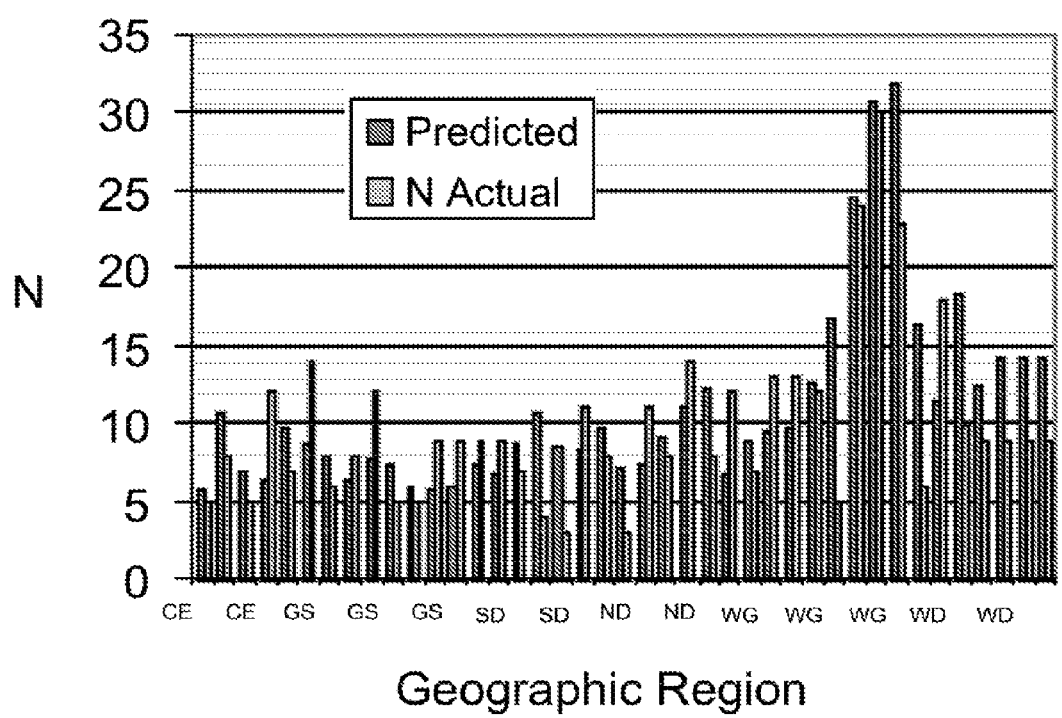
FIG. 5 is a bar graph of predicted values verses actual number of interruptions, N, for six MAs for one week in 2008.

Simulation of a neural network model using combined weather data from more than 10 management areas was also completed. The results showed that the predictor method was able to predict number of interruption for this large area analysis with a good level of accuracy. It was seen that as the geographic area increases and tries to predict the number of interruptions for the whole region, the accuracy of the system decreases. However, the accuracy of the system was improved by increasing the number of rows of data and by reducing the duration of the data collected. FIG. 5 shows a snapshot of actual and the predicted values from six MAs for one week of 2008. For the region of study, the MA's are grouped together to form a service area (SA).

Practical Application

To put the prediction method to work, a customized software program was created. The function of the program is demonstrated using the Microsoft Excel® spreadsheets shown in FIGS. 6, 7, and 15-18. The program utilizes six sheets, each labeled according to its function: Introduction, Input, Output, Storage, Comparison, and Data.

Figure 6:
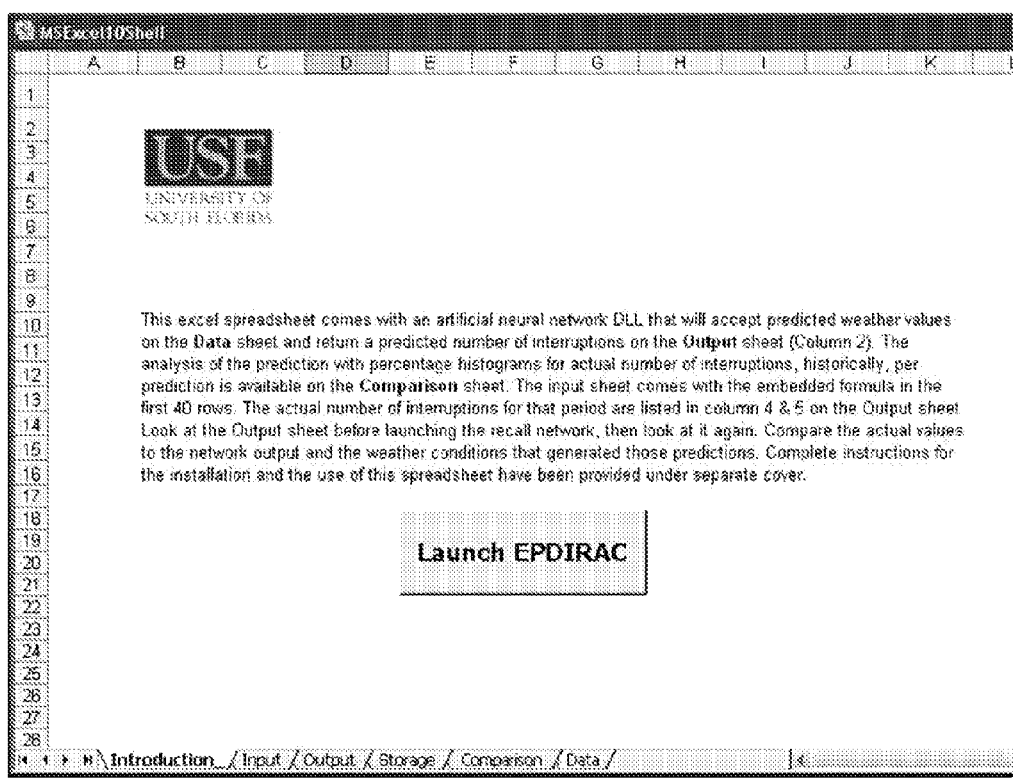
FIG. 6 is a screen shot of an exemplary 'Introduction' sheet of an application of the present invention in Microsoft Excel®.

As shown in FIG. 6, the 'Introduction' sheet gives a short explanation of the program itself and the predictor is launched from here. The 'Input' sheet is a programmed sheet, which is unchangeable by the user.

Figure 7:
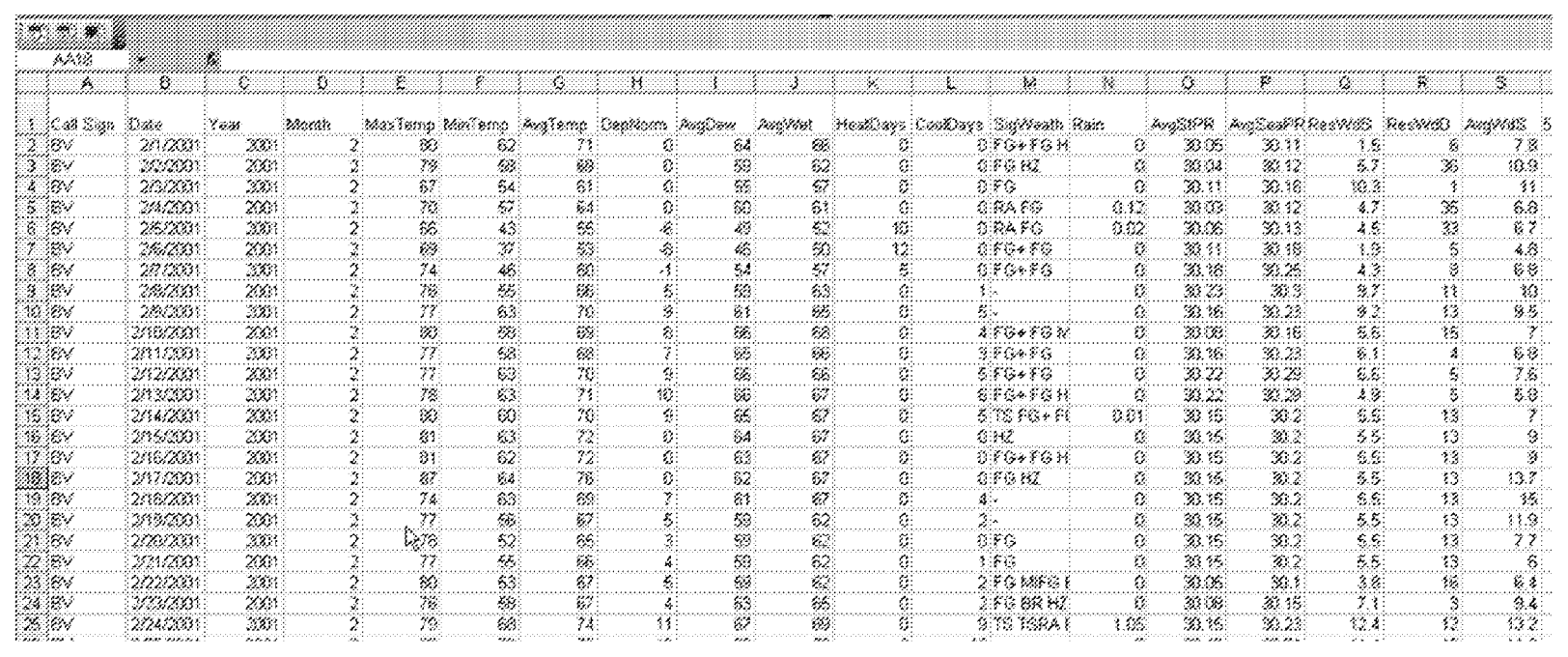

The 'Data' sheet is where the user inputs the weather data, such as maximum, minimum, and average temperature, lightning strikes, and amount of rain. A screen shot of a portion of a sample 'Data' sheet is shown in FIG. 7. A list of input variable and their descriptions is shown in the table of FIG. 8.

Figure 9:
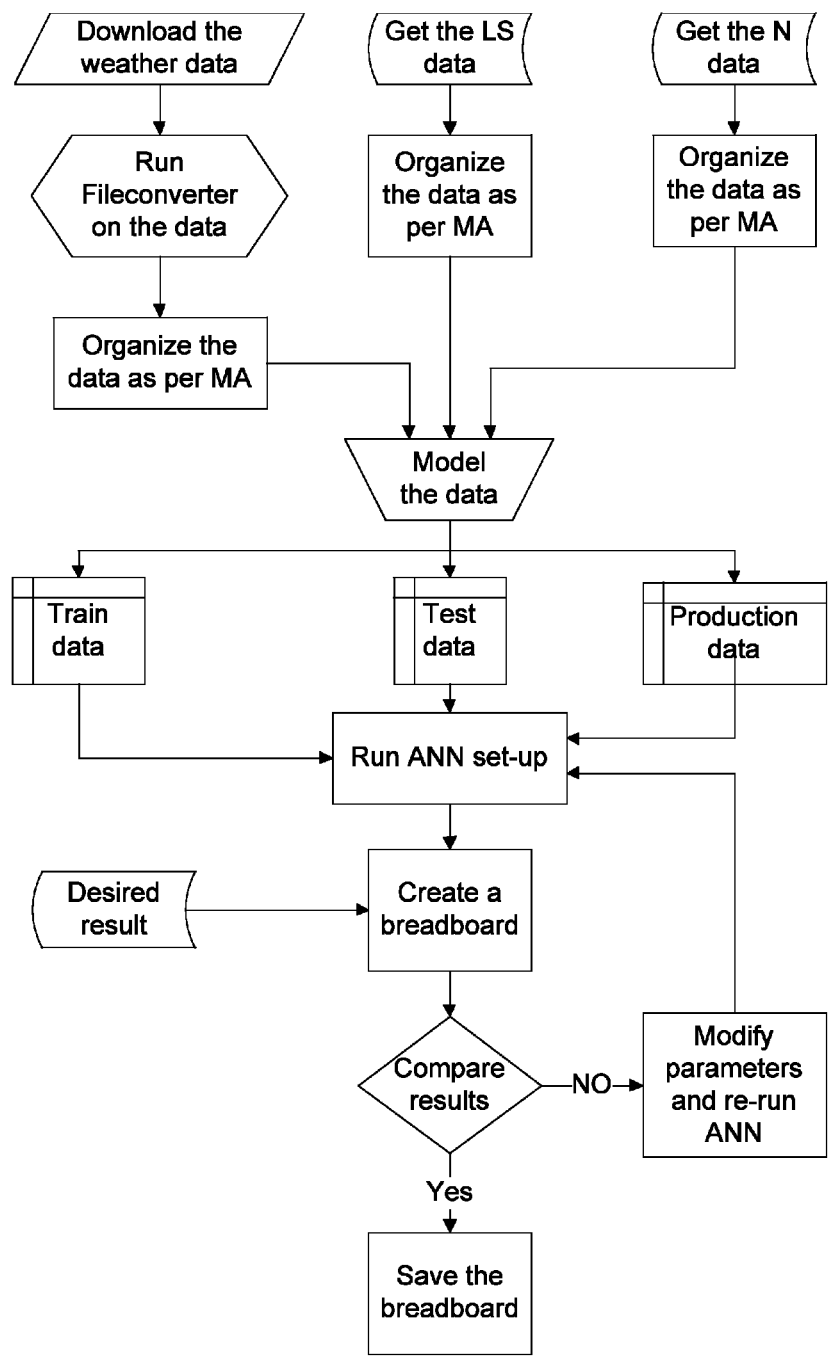
FIG. 9 is a flowchart of the predictor method according to an embodiment of the present invention.
Figures 11A, 11B:
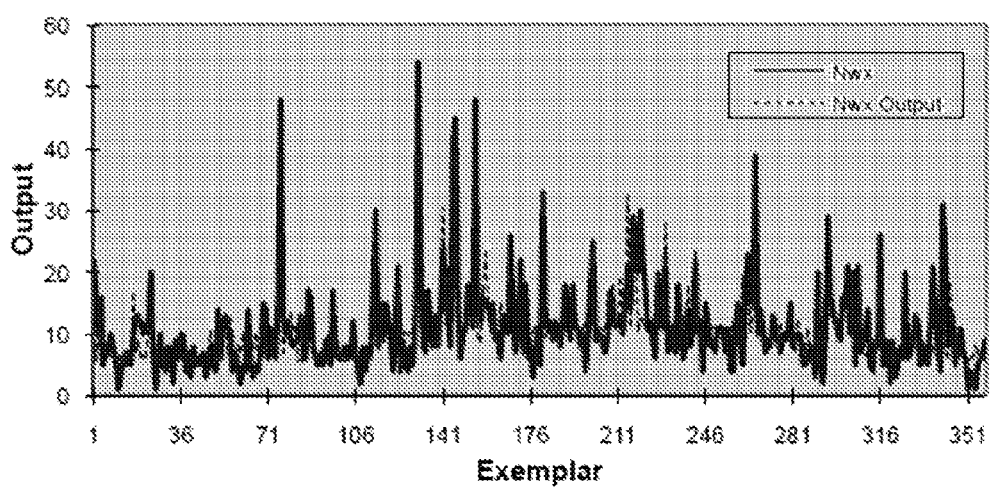
Figures 13A, 13B, 13C:
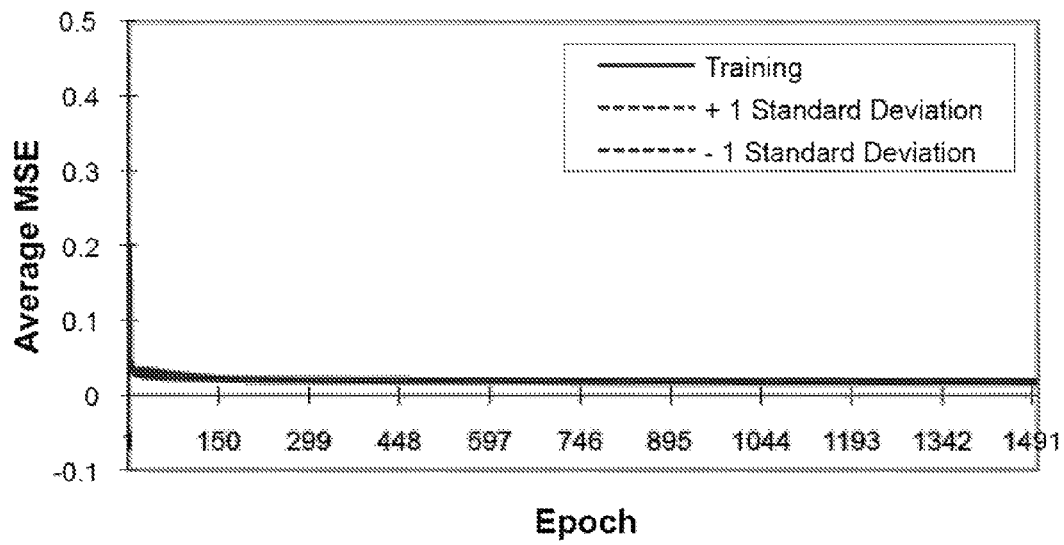
Figure 13D:
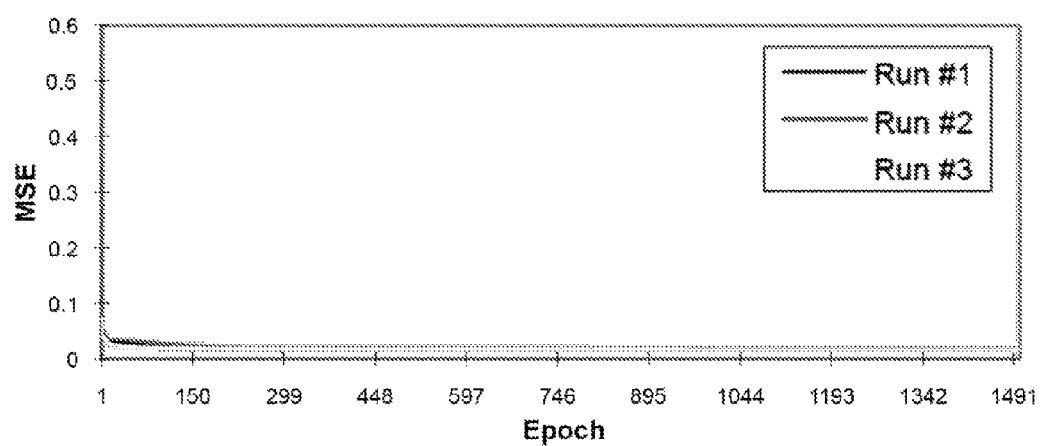

FIG. 9 is a flowchart of an embodiment of the predictor method.

FIGS. 10A-10D are charts showing an exemplary set of equations used to develop the breadboard (shown in the flowchart of FIG. 9) of an embodiment of the predictor method. The input variables shown in FIG. 9 are used to develop these breadboards. This process is independent of a neural network. Any other non-linear technique will also work.

FIGS. 11-14 show reports that are generated when the inputs are processed through the developed breadboards.

The inputs (FIG. 8) are fed into the system wherein the various weights are defined and the complex non-linear relationship of all the variables are identified. The equations (FIG. 10A-10D) and its coefficients define the weights for the formation of the breadboard. The system is then optimized and fine-tuned to achieve the lowest error process. The stabilized system is formed and saved as the product that can be installed in the service station to predict number of power interruptions in a MA.

Figure 15B:
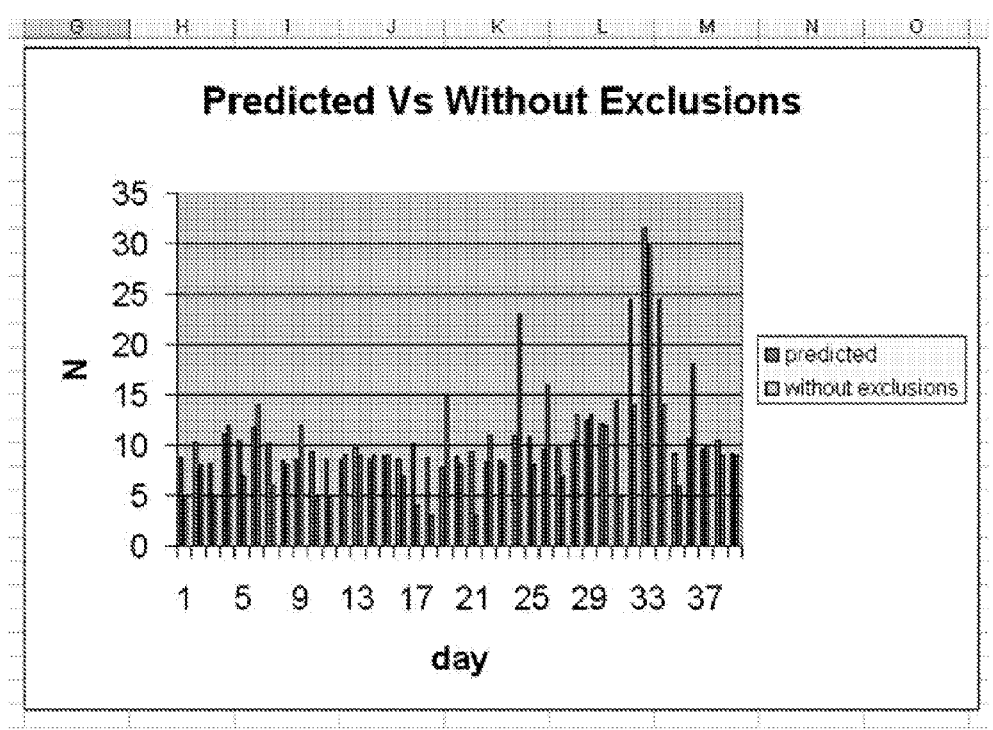

The 'Output' sheet displays the results of the predictor. An example of the 'Output' sheet are shown in FIGS. 15A and 15B. The program implements an artificial neural network DLL that will accept predicted weather values entered on the 'Data' sheet and returns a predicted number of interruptions in column 2 (FIG. 15A) of the 'Output' sheet. The actual number of interruptions (without and with exclusions) is shown in the third and forth columns (FIG. 15A). To demonstrate its accuracy, the program also creates bar graphs, like the one shown in FIG. 15B, comparing the predicted number of interruptions with the actual number of interruptions.

The 'Storage' sheet allows the user to store results.

Figure 16A:
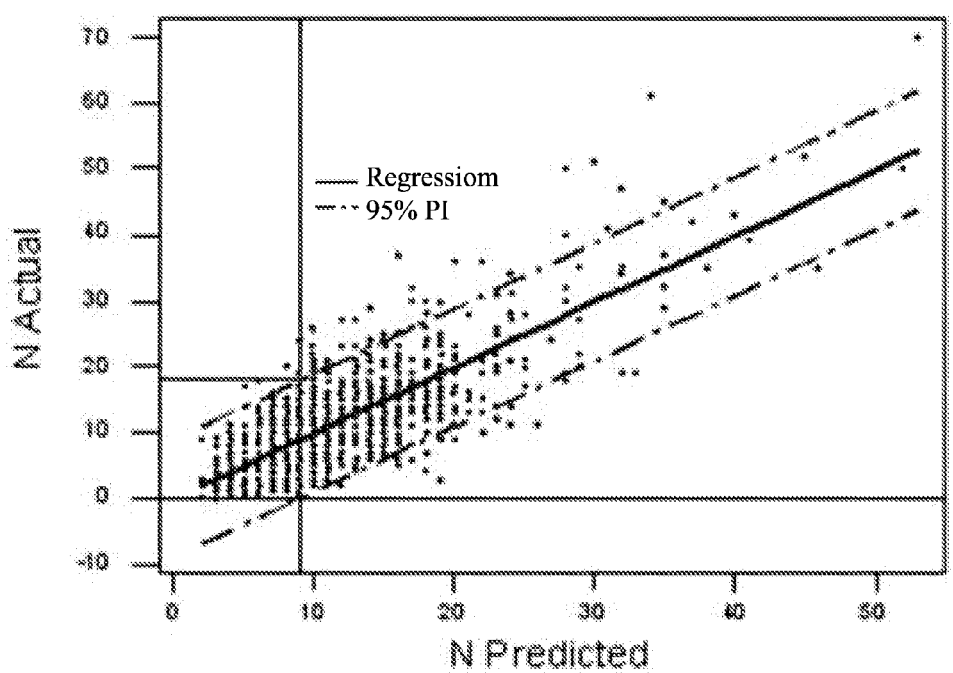
Figure 16B:
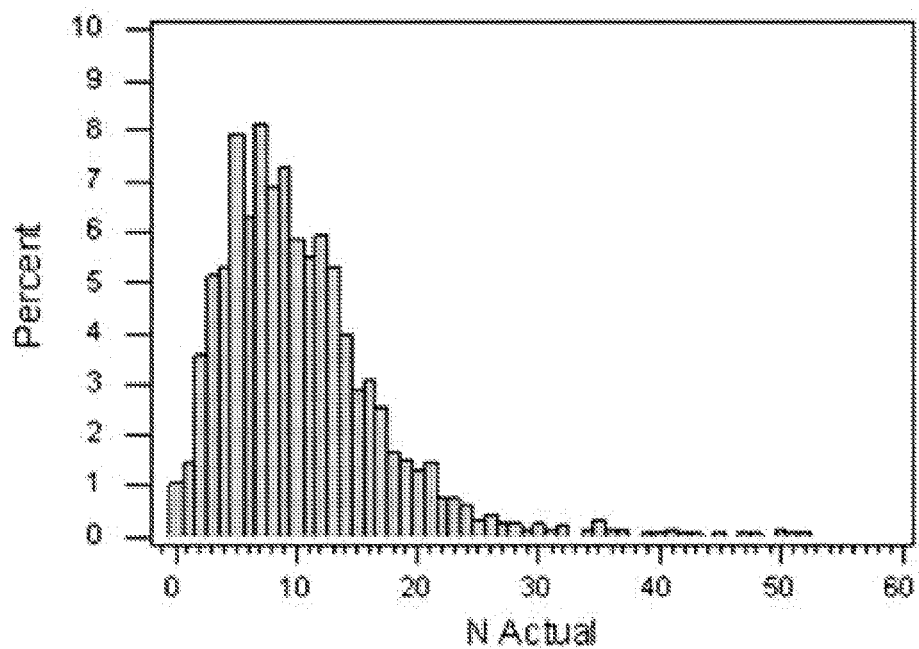
Figure 16C:
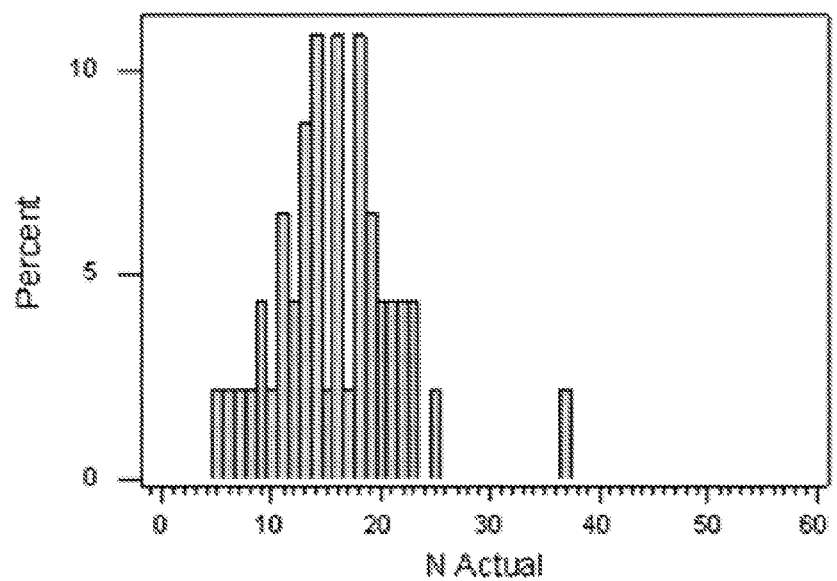

The analysis of the prediction with percentage histograms for actual number interruptions, historically, per prediction is available on the 'Comparison' sheet. Examples of graphs and tables displayed on the 'Comparison' sheet are shown in FIG. 16. FIG. 16A shows a regression plot of the actual verses predicted number of interruptions with 95% prediction intervals. The percentage of occurrences of actual values is also displayed on this sheet. For example, as shown in FIG. 16B, only 1% of the days entered on the input sheet had no interruptions, while 8% of the days had seven interruptions. The sheet also includes a graph showing the chance of having N interruptions provided a certain predicted value. For example, as shown in FIG. 16C where the prediction for that day was 16 interruptions, the chance of having 10 interruptions is just above 2% and the chance of having 18 interruptions is just above 10%. The sheet also provides tables that give the risk of N or more interruptions and N or less interruptions occurring for a certain predicted value. For example, as shown in FIG. 16D, when the predicted number of interruptions is 16, the chance of having 10 or fewer interruptions is 15.22% and the chance of having 18 or more interruptions is 39.13%.

FIG. 17 is another example of the input and resulting analysis of the program. FIG. 17A shows the weather data for management area 'BV' on Feb. 1, 2001 used as input on the 'Input' data sheet. The resulting output that would be displayed on the 'Output' sheet is shown in FIG. 17B. 'Exemplar' represents the date and 'output1' is the predicted N, or the predicted number of occurrences for that date. Once the predicted N is known for the date in question, the 'Comparison' sheet is used to assess the risk of that predicted number of occurrences actually occurring. As shown in FIG. 17C, when the predicted number of occurrences is 10, 90% of the time the actual number of interruptions was between 5 and 17. The table in FIG. 17D gives the risk of N or fewer and the risk of N or greater interruption actually occurring when the predicted number was 10.

Figure 18:
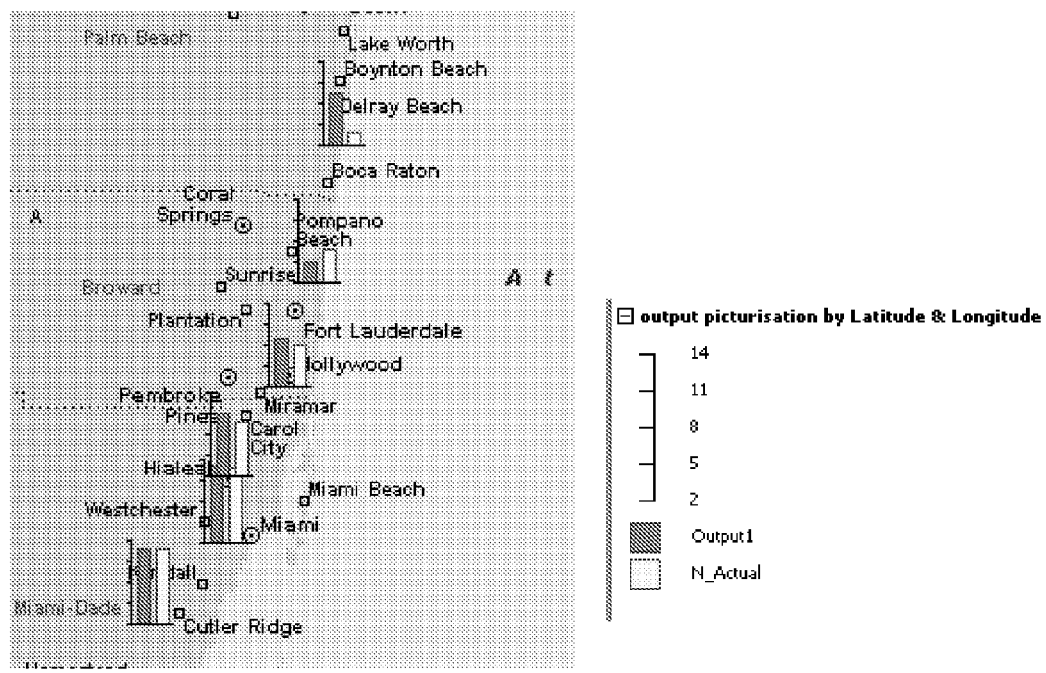
FIG. 18 is an exemplary mapping of six different locations and a comparison of their respective predicted and actual numbers of interruptions.

FIG. 18 demonstrates the accuracy of the predicted number of interruptions at six different locations in Florida by displaying a map including the locations with bar graphs displaying both the actual and predicted number of interruptions.

CONCLUSION

Several methods exist for modeling and predicting extreme weather condition failure rates, and there are methods that account for the baseline failure rates due to aging and other causes of equipment failure. Interruptions as a function of common weather conditions comprise a gap between those models, and the present invention will bridge that gap.

Figure 25:
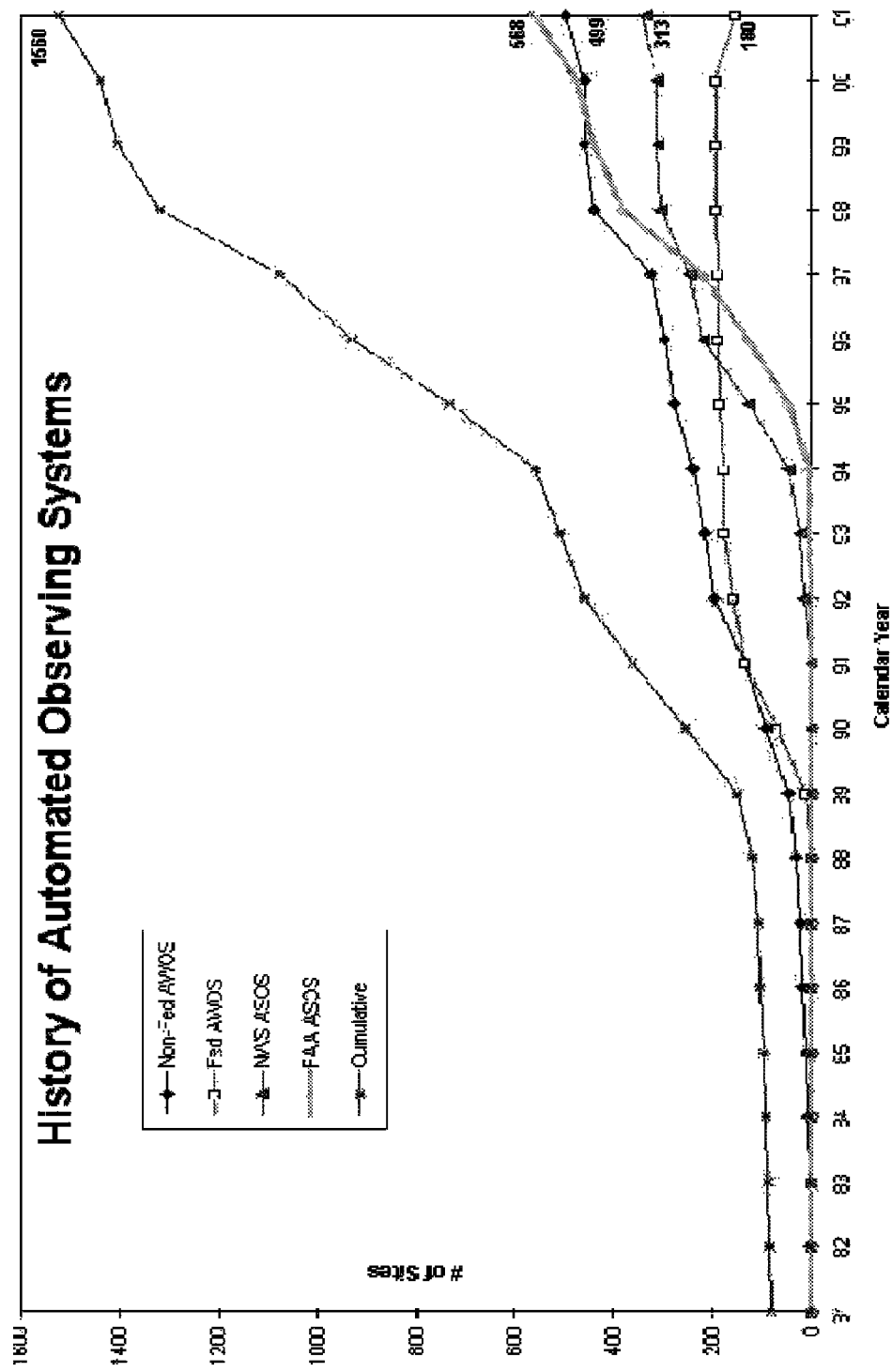
FIG. 25 is a line graph of the history of automated observing systems.

As can be seen from FIG. 25, the same number of ASOSs were available as there are today, for both FAA and NWS stations. Although other types of weather stations provide data for a limited number of weather parameters, the ASOS is the station of choice due to the comprehensive surface weather data it collects. This type of research was not possible before the expansion of the network to today's size; consequently, the field of reliability research has not enjoyed access to data that can significantly affect both the direction and value of future research.

There is a hidden weather component, in most, if not all of the traditionally defined causes of interruptions as shown in FIG. 1. Additionally, the hidden component is amenable to stochastic analysis and the prediction of interruptions similar to that shown in FIG. 2. This novel method of reliability analysis can be applied to a broad range of environmental and climatic conditions.

The predictor method provides the power industry with an opportunity to reduce the downtime of power interruptions by proper distribution of the service work force. This will, in turn, improve short-term planning and optimize manpower. It can also help identify circuits and systems prone to failures due to common weather conditions. The model offers an economical tool with negligible maintenance costs to utility companies to improve its SAIFI and increase its power transmission.

Short-term benefits to the power industry include efficient deployment of service staff, improved maintenance scheduling, and optimization of the number of staff members per shift and per region. Long-term benefits include an improved ability to explain to management and share holder about failures, improved SAIDI, efficient selection of equipment and manpower, improved predictions on whether new investment will bring the desired result, and elimination of dependency on annual average calculations for finding the number of interruptions. Until now, no other method was capable of assessing the probability of a specific range of interruptions for a region during common weather conditions.

This method can also be used for research into the relative reliability of a system under different weather conditions or at different times. Actual weather and interruption data can be used to train the predictor models and then theoretical weather data can be entered into the trained models. The predictions can be used to rate the robustness of a system to common weather conditions. In addition, this process can be repeated at intervals before and after maintenance or reliability enhancement programs are implemented. This will enable researchers to determine whether these programs are producing the desired results.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A computer program product for enabling a computer to predict power interruptions, comprising:
    software instructions for enabling the computer to perform predetermined operations; and
    a computer readable medium bearing the software instructions;
    the predetermined operations including:
        compiling common weather data comprising a plurality of weather variables for a predetermined historical period, compiling the number of historical interruptions for the predetermined historical period, establishing a model equation for the average value of a first weather variable, establishing a model equation for the average value of a second weather variable, establishing a composite model equation by combining the model equation for the average value of the first variable and the model equation for the average value of the second variable, and establishing a plurality of interruption prediction values for a predetermined future period by performing regression analysis using the composite model equation, wherein the computer predict power interruptions.

2. The computer program product of claim 1, wherein the first and second weather variables are selected from the group consisting of rain, wind, temperature, lightning, humidity, dew point, barometric pressure, snow, and ice.

3. The computer program product of claim 2, wherein at least one variable selected from the plurality of weather variables is temperature.

4. The computer program product of claim 3, wherein the predetermined operations further comprise:

establishing an optimal temperature value;

establishing a heating degrees value; and establishing a cooling degrees value.

5. The computer program product of claim 4, wherein the optimal temperature value is the temperature at which the lowest number of interruptions occurred during the predetermined period; wherein the heating degrees value is the number of degrees below the optimal temperature value on a predetermined day; and wherein the cooling degrees value is the number of degrees below the optimal temperature value on a predetermined day.

6. The computer program product of claim 5, wherein the model equation for the average value of temperature is expressed as:

$$N=Y_1+A_1HD+A_2HD^2+A_3CD+A_4CD^2;$$

wherein N=daily total number of interruptions;
wherein A=is a coefficient that is not equal to zero;
wherein HD=heating degrees; and
wherein CD=cooling degrees.

7. The computer program product of claim 2, wherein at least one variable selected the plurality of weather variables is wind speed and the model equation for the average value of wind speed is expressed as:

$$N=Y_3+B_1S+B_2S^2+B_3S^3;$$

wherein N=daily total number of interruptions;
wherein B=is a coefficient that is not equal to zero; and
wherein S=two minute maximum sustained wind gust.

8. The computer program product of claim 2, wherein at least one variable selected from the plurality of weather variables is rainfall and the model equation for the average value of rainfall is expressed as:

$$N=Y_3+C_1R1+C_2R2+C_3R3;$$

wherein N=daily total number of interruptions;
wherein C=is a coefficient that is not equal to zero;
wherein R1=rainfall that is greater than or equal to zero inches, but less than 1 inch and zero elsewhere;
wherein R2=rainfall that is greater than or equal to 1 inch, but less than 2 inches and zero elsewhere; and
wherein R3=rainfall that is greater than or equal to 2 inches and zero elsewhere.

9. The computer program product of claim 2, wherein at least one variable selected from the plurality of weather variables is lightning and the model equation for the average value of lightning is expressed as:

$$N=Y_4+D_1LS;$$

wherein N=daily total number of interruptions;
wherein D=is a coefficient that is not equal to zero; and
wherein LS=daily total number of lightning strikes.

10. The computer program product of claim 1, wherein the composite model equation is expressed as:

$$N=Y_6+A_1HD+A_2HD^2+A_3CD+A_4CD^2+B_1S+B_2S^2+B_3S^3+C_1R1+C_2R2+C_3R3+D_1LS;$$

wherein N=daily total number of interruptions;
wherein A=is a coefficient that is not equal to zero;
wherein B=is a coefficient that is not equal to zero;
wherein C=is a coefficient that is not equal to zero;
wherein D=is a coefficient that is not equal to zero;
wherein HD=heating degrees;
wherein CD=cooling degrees;
wherein S=two minute maximum sustained wind gust;
wherein R1=rainfall that is greater than or equal to zero inches, but less than 1 inch and zero elsewhere;
wherein R2=rainfall that is greater than or equal to 1 inch, but less than 2 inches and zero elsewhere;
wherein R3=rainfall that is greater than or equal to 2 inches and zero elsewhere; and
wherein LS=daily total number of lightning strikes.

11. The computer program product of claim 1, wherein at least one of the plurality of interruption prediction values is selected from plurality of interruption prediction values from a probability density function of interruptions based on at least one of common weather data for the predetermined historical period and the number of historical interruptions for the predetermined historical period.

12. The computer program product of claim 11, wherein the predetermined operations further comprise:

calculating the probability of experiencing the number of interruptions equal to the interruption prediction value or more.

13. A computer system adapted to predict power interruptions comprising:

a processor; and a memory including software instructions that cause the computer system to perform:

compiling common weather data comprising a plurality of weather variables for a predetermined historical period, compiling the number of historical interruptions for the predetermined historical period, establishing a model equation for the average value of a first weather variable, establishing a model equation for the average value of a second weather variable, establishing a composite model equation by combining the model equation for the average value of the first variable and the model equation for the average value of the second variable, and establishing a plurality of interruption prediction values for a predetermined future period by performing regression analysis using the composite model equation, wherein the computer predicts power interruptions.

14. The computer system of claim 13, wherein the first and second weather variables are selected from the group consisting of rain, wind, temperature, lightning, humidity, dew point, barometric pressure, snow, and ice.

15. The computer system of claim 14, wherein at least one variable selected from the plurality of weather variables is temperature.

16. The computer system of claim 15, wherein the memory further includes software instructions that cause the computer system to perform:
- establishing an optimal temperature value;
- establishing a heating degrees value; and
- establishing a cooling degrees value.

17. The computer system of claim 16, wherein the optimal temperature value is the temperature at which the lowest number of interruptions occurred during the predetermined period; wherein the heating degrees value is the number of degrees below the optimal temperature value on a predetermined day; and wherein the cooling degrees value is the number of degrees below the optimal temperature value on a predetermined day.

18. The computer system of claim 17, wherein the model equation for the average value of temperature is expressed as:

$$N=Y_1+A_1HD+A_2HD^2+A_3CD+A_4CD^2;$$

wherein N=daily total number of interruptions;
wherein A=is a coefficient that is not equal to zero;
wherein HD=heating degrees; and
wherein CD=cooling degrees.

19. The computer system of claim 14, wherein at least one variable selected the plurality of weather variables is wind speed and the model equation for the average value of wind speed is expressed as:

$$N=Y_3+B_1S+B_2S^2+B_3S^3;$$

wherein N=daily total number of interruptions;
wherein B=is a coefficient that is not equal to zero; and
wherein S=two minute maximum sustained wind gust.

20. The computer system of claim 14, wherein at least one variable selected from the plurality of weather variables is rainfall and the model equation for the average value of rainfall is expressed as:

$$N=Y_3+C_1R1+C_2R2+C_3R3;$$

wherein N=daily total number of interruptions;
wherein C=is a coefficient that is not equal to zero;
wherein R1=rainfall that is greater than or equal to zero inches, but less than 1 inch and zero elsewhere;
wherein R2=rainfall that is greater than or equal to 1 inch, but less than 2 inches and zero elsewhere; and
wherein R3=rainfall that is greater than or equal to 2 inches and zero elsewhere.

21. The computer system of claim 14, wherein at least one variable selected from the plurality of weather variables is lightning and the model equation for the average value of lightning is expressed as:

$$N=Y_4+D_1LS;$$

wherein N=daily total number of interruptions;
wherein D=is a coefficient that is not equal to zero; and
wherein LS=daily total number of lightning strikes.

22. The computer system of claim 13, wherein the composite model equation is expressed as:

$$N=Y_6+A_1HD+A_2HD^2+A_3CD+A_4CD^2+B_1S+B_2S^2+B_3S^3+C_1R1+C_2R2+C_3R3+D_1LS;$$

wherein N=daily total number of interruptions;
wherein A=is a coefficient that is not equal to zero;
wherein B=is a coefficient that is not equal to zero;
wherein C=is a coefficient that is not equal to zero;
wherein D=is a coefficient that is not equal to zero;
wherein HD=heating degrees;
wherein CD=cooling degrees;
wherein S=two minute maximum sustained wind gust;
wherein R1=rainfall that is greater than or equal to zero inches, but less than 1 inch and zero elsewhere;
wherein R2=rainfall that is greater than or equal to 1 inch, but less than 2 inches and zero elsewhere;
wherein R3=rainfall that is greater than or equal to 2 inches and zero elsewhere; and
wherein LS=daily total number of lightning strikes.

23. The computer system of claim 13, wherein at least one of the plurality of interruption prediction values is selected from plurality of interruption prediction values from a probability density function of interruptions based on at least one of common weather data for the predetermined historical period and the number of historical interruptions for the predetermined historical period.

24. The computer system of claim 23, wherein the memory further includes software instructions that cause the computer system to perform:
- calculating the probability of experiencing the number of interruptions equal to the interruption prediction value or more.

* * * * *